(12) United States Patent
Suzuki et al.

(10) Patent No.: US 12,321,657 B2
(45) Date of Patent: Jun. 3, 2025

(54) COMMUNICATION SYSTEM, INFORMATION PROCESSING SYSTEM, AND INFORMATION PROCESSING METHOD FOR DISPLAYING LANGUAGE INFORMATION CONVERTED FROM SPEECH DATA

(71) Applicants: Yuuki Suzuki, Kanagawa (JP); Yuki Hori, Aichi (JP); Eri Watanabe, Shizuoka (JP); Hiroaki Tanaka, Tokyo (JP); Terunori Koyama, Tokyo (JP); Takuroh Naitoh, Tokyo (JP)

(72) Inventors: Yuuki Suzuki, Kanagawa (JP); Yuki Hori, Aichi (JP); Eri Watanabe, Shizuoka (JP); Hiroaki Tanaka, Tokyo (JP); Terunori Koyama, Tokyo (JP); Takuroh Naitoh, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 51 days.

(21) Appl. No.: 18/319,639

(22) Filed: May 18, 2023

(65) Prior Publication Data
US 2023/0376265 A1    Nov. 23, 2023

(30) Foreign Application Priority Data

May 19, 2022   (JP) ................... 2022-082411
Mar. 23, 2023  (JP) ................... 2023-047032

(51) Int. Cl.
G06F 3/048      (2013.01)
G06F 3/0482     (2013.01)
(Continued)

(52) U.S. Cl.
CPC .......... *G06F 3/1454* (2013.01); *G06F 3/0482* (2013.01); *G06F 3/04855* (2013.01);
(Continued)

(58) Field of Classification Search
CPC ...... G06F 3/1454; G06F 16/538; G06F 40/58; G06F 3/0482; G06F 3/04855; G06F 3/167; G10L 15/26
See application file for complete search history.

(56) References Cited

U.S. PATENT DOCUMENTS 9,326,267 B1 *   4/2016  Fujisaki ............... H04W 4/023
12,204,602 B2 *  1/2025  Chen ..................... G06F 3/0482
(Continued)

FOREIGN PATENT DOCUMENTS

| JP | 2017-004270 | 1/2017 |
|----|-------------|--------|
| JP | 2022-064243 | 4/2022 |
| JP | 2022-064301 | 4/2022 |

*Primary Examiner* — David Phantana-angkool
(74) *Attorney, Agent, or Firm* — IPUSA, PLLC

(57) ABSTRACT

A communication system for controlling communication between a terminal apparatus and a counterpart terminal apparatus, includes circuitry that: converts speech data into language information, the speech data representing speech input to the terminal apparatus or speech input to the counterpart terminal apparatus; displays the language information that is converted on an information display screen at the terminal apparatus in a chronological order; displays, on the information display screen, content based on a user operation on the language information displayed in the first area of the information display screen; and transmits information on the content displayed on the information display screen to a counterpart terminal apparatus, to cause the counterpart terminal apparatus to display the content.

20 Claims, 38 Drawing Sheets

(51) Int. Cl.
  *G06F 3/04855* (2022.01)
  *G06F 3/14* (2006.01)
  *G06F 3/16* (2006.01)
  *G06F 16/538* (2019.01)
  *G06F 40/58* (2020.01)
  *G10L 15/26* (2006.01)

(52) U.S. Cl.
  CPC ............ *G06F 3/167* (2013.01); *G06F 16/538* (2019.01); *G06F 40/58* (2020.01); *G10L 15/26* (2013.01)

(56) References Cited

U.S. PATENT DOCUMENTS

| | | | |
|---|---|---|---|
| 2018/0095653 A1* | 4/2018 | Hasek | G06F 3/04883 |
| 2019/0087154 A1* | 3/2019 | Hirukawa | G10L 15/08 |
| 2020/0177838 A1* | 6/2020 | Yoshida | H04N 7/147 |
| 2022/0100457 A1* | 3/2022 | Yamasako | G06T 11/60 |
| 2022/0114367 A1* | 4/2022 | Hori | G06F 16/53 |
| 2022/0115020 A1* | 4/2022 | Bradley | G06F 40/166 |
| 2023/0376265 A1* | 11/2023 | Suzuki | G06F 40/35 |
| 2024/0184989 A1* | 6/2024 | Mann | G06F 40/166 |
| 2024/0202739 A1* | 6/2024 | Sethi | G06Q 30/016 |

* cited by examiner

FIG. 5

CONVERSATION TABLE

| LANGUAGE ID | LANGUAGE INFORMATION | INPUT TIME | SPEAKER | NUMBER OF LIKES |
|---|---|---|---|---|
| ... | ... | ... | ... | ... |
| t00n | Well, I think it is more important that a newcomer can feel relaxed. | 20xx/8/16 10:10:00 | u001 | 1 |
| t00n+1 | If so, face-to-face communication is better. Or, may be not. | 20xx/8/16 10:10:30 | u002 | 2 |
| t00n+2 | It depends on how the meeting goes. | 20xx/8/16 10:11:00 | u003 | 0 |
| ... | ... | ... | ... | ... |

FIG. 6

CONTENT TABLE

| CONTENT ID | TYPE | PAGE | COORDINATE | SIZE | FONT SIZE | ARRANGEMENT TIME | LANGUAGE ID |
|---|---|---|---|---|---|---|---|
| 1 | HAND DRAFTED | 1 | x1,y1 | W1,H1 | ... | 20xx/08/16 9:10:12 | – |
| 2 | LANGUAGE INFORMATION | 1 | x2,y2 | W2,H2 | 20 | 20xx/08/16 9:11:30 | t0n1 |
| 3 | SQUARE | 1 | x3,y3 | W3,H3 | ... | 20xx/08/16 9:11:55 | – |
| 4 | ILLUSTRATION | 1 | x4,y4 | W4,H4 | ... | 20xx/08/16 9:13:45 | t0n2 |
| 5 | TRIANGLE | 1 | x5,y5 | W5,H5 | ... | 20xx/08/16 9:15:20 | – |
| 6 | LANGUAGE INFORMATION | 1 | x6,y6 | W6,H6 | 20 | 20xx/08/16 9:18:32 | t0n4 |
| 7 | ILLUSTRATION | 1 | x7,y7 | W7,H7 | ... | 20xx/08/16 9:23:19 | t0n5 |
| ... | ... | ... | ... | ... | ... | ... | ... |

FIG. 7

ILLUSTRATION TABLE

| KEYWORD | ID | FILE NAME |
|---|---|---|
| "factory", "forklift", "vehicle" | 101 | forklift1.bmp |
| "bus", "public transportation", "vehicle" | 102 | bus1.bmp |
| "taxi", "public transportation", "vehicle" | 103 | taxi1.bmp |
| ... | ... | ... |
| "person", "standing" | 201 | human1.bmp |
| "person", "sitting" | 202 | human2.bmp |
| ... | ... | ... |
| "animal", "dog" | 301 | dog1.bmp |
| "animal", "cat" | 302 | cat1.bmp |
| ... | ... | ... |

FIG. 8

MEETING MANAGEMENT TABLE

| MEETING ID | PARTICIPANT | TITLE | START DATE/TIME | END DATE/TIME | PLACE | PASSWORD |
|---|---|---|---|---|---|---|
| 001 | U001 U002 | ABC MEETING | 20XX/1/5 10:00 | 20XX/1/5 11:00 | MEETING ROOM A | **** |
| 002 | U001 U003 | DEF MEETING | 20XX/1/5 9:00 | 20XX/1/5 10:00 | MEETING ROOM B | Y*** |
| 003 | U001 U008 U009 | GHI MEETING | 20XX/1/6 14:00 | 20XX/1/6 15:00 | MEETING ROOM A | Z**× |
| ... | ... | ... | ... | ... | ... | ... |

FIG. 9A

| FIG. 9 | FIG. 9A |
|---|---|
|  | FIG. 9B |

CONTENT LOG TABLE

| STATUS ID | CONVERSATION LOG AREA STATUS | WHITEBOARD WORK AREA STATUS | | | | | | | |
|---|---|---|---|---|---|---|---|---|---|
| | | CONTENT ID | TYPE | PAGE | COORDINATE | SIZE | FONT SIZE | ARRANGEMENT TIME | LANGUAGE ID |
| s001 | t001-t002 | 1 | HAND DRAFTED | 1 | x1,y1 | W1,H1 | ... | 20xx/08/16 9:10:12 | - |
| s002 | t001-t003 | 1 | HAND DRAFTED | 1 | x1,y1 | W1,H1 | ... | 20xx/08/16 9:10:12 | - |
| | | 2 | LANGUAGE INFORMATION | 1 | x2,y2 | W2,H2 | 20 | 20xx/08/16 9:11:30 | t0n1 |
| s003 | t001-t004 | 1 | HAND DRAFTED | 1 | x1,y1 | W1,H1 | ... | 20xx/08/16 9:10:12 | - |
| | | 2 | LANGUAGE INFORMATION | 1 | x2,y2 | W2,H2 | 20 | 20xx/08/16 9:11:30 | t0n1 |
| | | 3 | SQUARE | 1 | x3,y3 | W3,H3 | ... | 20xx/08/16 9:11:55 | - |

FIG. 9B

| | | CONTENT ID | TYPE | PAGE | COORDINATE | SIZE | FONT SIZE | ARRANGEMENT TIME | LANGUAGE ID |
|---|---|---|---|---|---|---|---|---|---|
| s004 | t002–t005 | 1 | HAND DRAFTED | 1 | x1,y1 | W1,H1 | ... | 20xx/08/16 9:10:12 | – |
| | | 2 | LANGUAGE INFORMATION | 1 | x2,y2 | W2,H2 | 20 | 20xx/08/16 9:11:30 | t0n1 |
| | | 3 | SQUARE | 1 | x3,y3 | W3,H3 | ... | 20xx/08/16 9:11:55 | – |
| | | 4 | ILLUSTRATION | 1 | x4,y4 | W4,H4 | ... | 20xx/08/16 9:13:45 | t0n2 |
| s005 | t003–t006 | 1 | HAND DRAFTED | 1 | x1,y1 | W1,H1 | ... | 20xx/08/16 9:10:12 | – |
| | | 2 | LANGUAGE INFORMATION | 1 | x2,y2 | W2,H2 | 20 | 20xx/08/16 9:11:30 | t0n1 |
| | | 3 | SQUARE | 1 | x3,y3 | W3,H3 | ... | 20xx/08/16 9:11:55 | – |
| | | 4 | ILLUSTRATION | 1 | x4,y4 | W4,H4 | ... | 20xx/08/16 9:13:45 | t0n2 |
| | | 5 | TRIANGLE | 1 | x5,y5 | W5,H5 | ... | 20xx/08/16 9:15:20 | – |
| | | 6 | LANGUAGE INFORMATION | 1 | x6,y6 | W6,H6 | 20 | 20xx/08/16 9:18:32 | t0n4 |
| ... | | | | | | | | | |

FIG. 10

PREFERRED LANGUAGE
INFORMATION TABLE

| LANGUAGE ID |
|---|
| t004 |
| t006 |
| t012 |
| ... |

COMMUNICATION SYSTEM, INFORMATION PROCESSING SYSTEM, AND INFORMATION PROCESSING METHOD FOR DISPLAYING LANGUAGE INFORMATION CONVERTED FROM SPEECH DATA

CROSS-REFERENCE TO RELATED APPLICATIONS

This patent application is based on and claims priority pursuant to 35 U.S.C. § 119(a) to Japanese Patent Application Nos. 2022-082411, filed on May 19, 2022, and 2023-047032, filed on Mar. 23, 2023, in the Japan Patent Office, the entire disclosure of which is hereby incorporated by reference herein.

BACKGROUND

Technical Field

The present invention relates to a communication system, an information processing system, and an information processing method.

Related Art

Communication using language information alone may not be sufficient to efficiently convey information especially in a short time. For example, in a meeting to discuss a new plan or idea, use of visual information would be more effective in communication.

SUMMARY

Example embodiments include a communication system for controlling communication between a terminal apparatus and a counterpart terminal apparatus, which includes circuitry that: converts speech data into language information, the speech data representing speech input to the terminal apparatus or speech input to the counterpart terminal apparatus; displays the language information that is converted on an information display screen at the terminal apparatus in a chronological order; displays, on the information display screen, content based on a user operation on the language information displayed on the information display screen; and transmits information on the content displayed on the information display screen to a counterpart terminal apparatus, to cause the counterpart terminal apparatus to display the content.

Example embodiments include an information processing system including circuitry that: converts speech data into language information, the speech data representing speech input to a terminal apparatus or speech input to a counterpart terminal apparatus, the terminal apparatus and the counterpart terminal apparatus being configured to communicate via a network; displays the language information that is converted on an information display screen of the terminal apparatus in a chronological order; and in response to a user operation on the language information displayed on the information display screen, transmits information on content displayed based on the user operation to the counterpart terminal apparatus, to cause the counterpart terminal apparatus to display the content.

Example embodiments include an information processing method including: converting speech data into language information, the speech data representing speech input to a terminal apparatus or speech input to a counterpart terminal apparatus, the terminal apparatus and the counterpart terminal apparatus being configured to communicate via a network; displaying the language information that is converted on an information display screen of the terminal apparatus in a chronological order; and in response to a user operation on the language information displayed on the information display screen, transmitting information on content displayed based on the user operation to the counterpart terminal apparatus, to cause the counterpart terminal apparatus to display the content.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein:

FIG. 5 is a conceptual diagram illustrating an example of conversation table;

FIG. 6 is a conceptual diagram illustrating an example of content table;

FIG. 7 is a conceptual diagram illustrating an example of illustration table;

FIG. 8 is a conceptual diagram illustrating an example of meeting management table;

FIGS. 9A and 9B are a conceptual diagram illustrating an example of content log table;

FIG. 10 is a conceptual diagram illustrating an example of preferred language information table;

Figure 1:
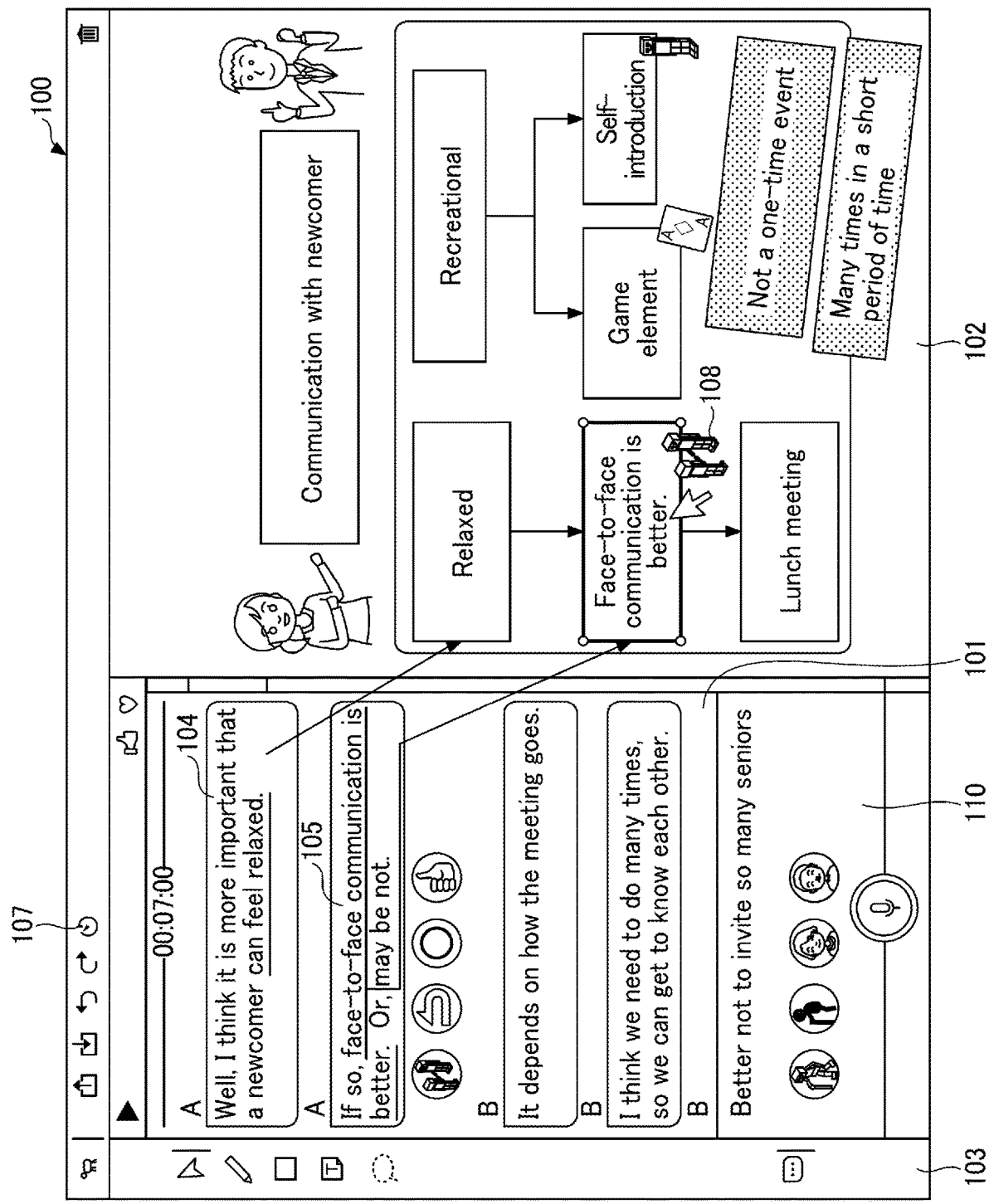
FIG. 1 is an example of an information display screen displayed by a terminal apparatus during a meeting.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

DETAILED DESCRIPTION

Hereinafter, as an example of an embodiment for carrying out the present invention, a visual communication system and an information processing method performed by the visual communication system will be described with reference to the drawings.

<Outline of Operation>

Communication using language information alone may not be sufficient to efficiently convey information in a short time. For example, in a meeting to discuss a new plan or idea, use of visual information would be more effective in communication. Although the user may draw some illustrations to describe idea to visualize, it may not be easy for some users to illustrate what he or she thinks from the scratch. In view of this, a visual communication system is provided, which converts language information into visual information such as an illustration, to efficiently convey the information that the user is trying to describe using the language information.

Referring to FIG. 1, an overview of processing performed by the visual communication system is described according to one or more exemplary embodiments. FIG. 1 illustrates an information display screen 100 displayed by a terminal apparatus during a meeting. As illustrated in FIG. 1, the information display screen 100 includes a conversation log area 101 (an example of a first area) and a whiteboard work area 102 (an example of a second area). The whiteboard work area 102 is a display area of a touch panel, and is an area that allows a meeting participant ("participant") to display hand-drafted data, language information that is directly input, or various images, substantially in the same manner as a display area of the known electronic whiteboard. The conversation log area 101 is an area, which displays a log of language information, having been converted from contents of speech of the participant through speech recognition. The whiteboard work area 102 does not have to be implemented by a touch panel, such that any display capable of displaying, without the touch panel, may be used. For example, the user may input hand-drafted data using such as a mouse.

As described above, the whiteboard work area 102 and the conversation log area 101 are displayed on the same screen. The participant is able to relocate the language information displayed in the conversation log area 101, in the whiteboard work area 102, by clicking or dragging the language information. In FIG. 1, a character string 104 "relaxed" and a character string 105 "face-to-face communication is better" are displayed in the whiteboard work area 102.

In addition, the participant is able to place an illustration in the whiteboard work area 102 based on the language information in the conversation log area 101 or the whiteboard work area 102. In FIG. 1, an illustration 108 based on the character string 105 "face-to-face communication is better" is displayed in the whiteboard work area 102.

As described above, the visual communication system 5 according to the embodiment can display visual information such as an illustration in the whiteboard work area 102 based on language information converted from speech. The user can easily visualize the communication during the meeting, as the illustration is automatically displayed. That is, the user does not have to convert the contents of conversation (contents of speech) into an illustration, draw the illustration in the whiteboard work area 102, or acquire the illustration from a network. Since the whiteboard work area 102 and the conversation log area 101 are displayed on the same screen, the user is able to instantly know a flow of communication in which each content in the whiteboard work area 102 is produced.

Terminology

The language information is made up of words in any desired language such as Japanese or English. In this embodiment, the language information includes not only information obtained by speech recognition of utterance by a speaker but also information input from such as a keyboard. The language information includes information that can be displayed by a computer based on character codes, such as characters, figures or shapes, numbers, and alphabets.

Processing of "storing or accumulating language information in a chorological order" means that the language information is displayed in the order of utterance. The language information, which is accumulated, can be viewed any time.

The work area is an area on a computer screen where the user can edit arrangement or contents of the language information, or arrangement or contents of any other content. As an example work area, there is an area that can be used by the user, such as a display area of an electronic whiteboard. The electronic whiteboard is a device, which allows a user to write hand-drafted data using a touch panel in a similar manner as the conventional whiteboard, while displaying a screen or data available from any device such as a PC. The whiteboard may be referred to as an electronic blackboard, an electronic information board, or an electronic whiteboard, etc.

The content is a display object displayed in the work area. The content may be any object that can be displayed by a computer and visually recognized by a user, such as language information, illustrations, figures, tables, any other data such as screen data that can be processed by the computer, or data on the Internet.

Example of System Configuration

Figure 2:
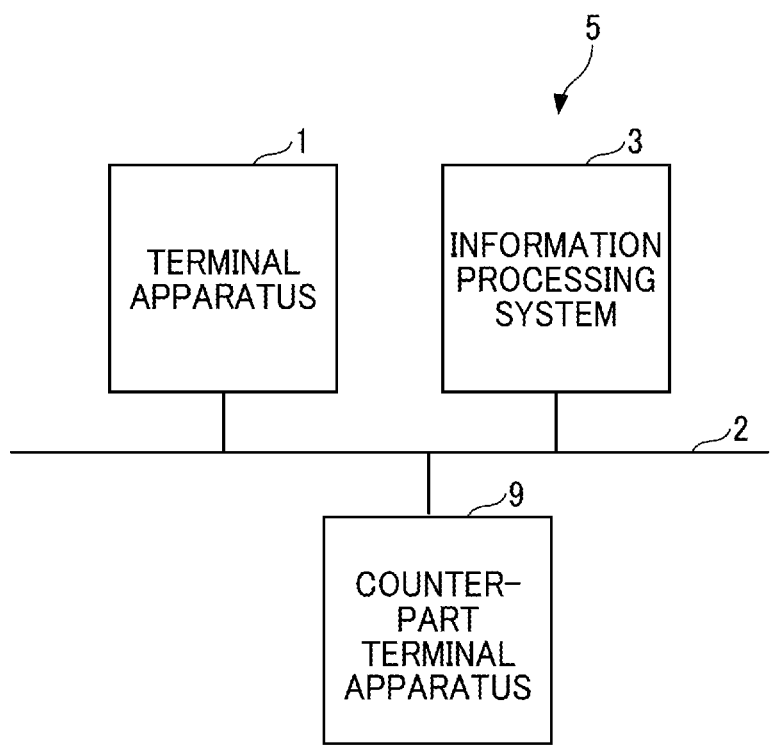
FIG. 2 is a diagram illustrating a configuration of a visual communication system, according to an exemplary embodiment.

FIG. 2 is a diagram illustrating a configuration of the visual communication system 5, according to the exemplary embodiment. The visual communication system 5 includes a terminal apparatus 1 and an information processing system 3 communicably connected with each other via a network 2.

As described in the following, a number of terminal apparatus 1 is not limited to one, such that any number of terminal apparatus may be connected to the network 2 to establish communication. In the following, it is assumed that the terminal apparatus 1 communicates with another terminal apparatus, which is referred to as a counterpart terminal apparatus 9. While the counterpart terminal apparatus 9 is substantially similar to the terminal apparatus 1 in operation, it is referred to as the counterpart terminal apparatus 9 for the descriptive purpose.

The network 2 may be implemented by any one or more of the Internet, a mobile communication network, a local area network (LAN), for example. The network 2 may include a wired communication network and a wireless communication network. The wireless communication network may be based on a wireless communication standard such as third generation (3G), fourth generation (4G), fifth generation (5G), Wireless Fidelity (Wi-Fi®), Worldwide Interoperability for Microwave Access (WiMAX), or Long Term Evolution (LTE).

The terminal apparatus 1 is an information processing apparatus operated by a user such as the participant. The terminal apparatus 1 transmits speech data representing utterances of the participant to the information processing system 3. The terminal apparatus 1 receives the language information, which is obtained by converting the speech data into text data at the server, and displays the language information in the conversation log area. The terminal apparatus 1 repeats this processing, for example, during the meeting. Specifically, the terminal apparatuses respectively operated by a plurality of participants who participate in the meeting (including the terminal apparatus 1 and the counterpart terminal apparatus 9) are connected to the network 2. The terminal apparatuses each performs the above-described processing, so that the language information input by each participant is displayed in the conversation log area 101 in a chronological order.

The terminal apparatus 1 may be, for example, a desktop personal computer (PC), a notebook PC, a smartphone, a tablet terminal, or the like, which operates on the general OS such as Windows®, MAC® OS, Android®, or iOS®. In addition, the terminal apparatus 1 may be any apparatus on which an application such as a web browser can operate.

The terminal apparatus 1 may be an electronic whiteboard, an output device such as digital signage, a head-up display (HUD) device, an industrial machine, a medical device, a network home appliance, a connected car, a mobile phone (such as a WAP or 3G-compliant phone), a smartphone, a tablet terminal, a game machine, a personal digital assistant (PDA), or the like.

The information processing system 3 is, for example, an example of information processing apparatus having a function of providing information or a processing result in response to a request from the terminal apparatus 1. The information processing system 3 may be called an information processing server, or simply a server, which may be implemented by one or more information processing apparatuses. In the visual communication system 5 of the embodiment, the information processing system 3 may provide an image such as an illustration corresponding to language information to the terminal apparatus 1 in addition to performing the above-described speech recognition. The speech recognition may alternatively be performed by the terminal apparatus 1.

The information processing system 3 preferably has a function of a Web server. The Web server transmits various kinds of information such as an HTML document existing on the Web server, which is specified by a URL instructed from a Web browser as a client, according to HTTP used for connection with the terminal apparatus 1. Web application is executed, based on communication between the Web browser and the Web server. Specifically, the Web application is an application that is executed, as a program on the Web browser and a program on the Web server operate in cooperation. The program on the Web browser may be a program written in a programming language for Web browser such as JavaScript®. In this disclosure, an application, which is not executed unless installed in the terminal apparatus 1, is referred to as a native application.

The information processing system 3 may support cloud computing. The "cloud computing" refers to Internet-based computing where resources on a network are used or accessed without identifying specific hardware resources. For example, the web server function, the speech recognition function, and the illustration search function, of the information processing system 3, may be separately implemented by a plurality of servers.

Example of Hardware Configuration

Figure 3:
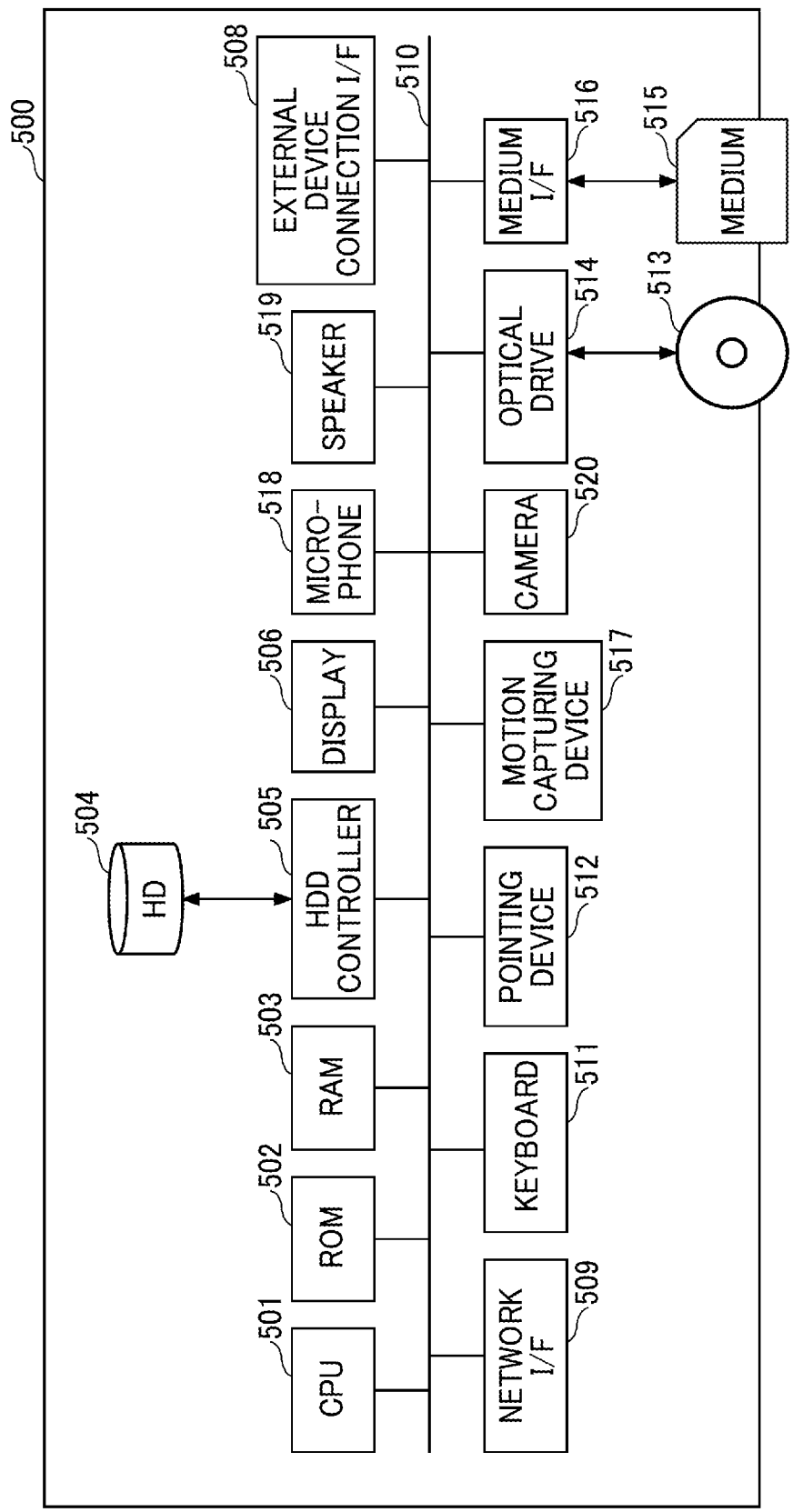
FIG. 3 is a block diagram illustrating a hardware configuration of a computer according to an exemplary embodiment.

FIG. 3 is a diagram illustrating a hardware configuration of the terminal apparatus 1 and the information processing system 3. The terminal apparatus 1 and the information processing system 3 each have a hardware configuration of a computer 500 as illustrated in FIG. 3.

As illustrated in FIG. 3, the computer 500 includes a central processing unit (CPU) 501, a read only memory (ROM) 502, a random access memory (RAM) 503, a hard disk (HD) 504, a hard disk drive (HDD) controller 505, a display 506, an external device connection interface (I/F) 508, a network I/F 509, a bus line 510, a keyboard 511, a pointing device 512, an optical drive 514, a medium I/F 516, a motion capturing device 517, a microphone 518, a speaker 519, and a camera 520.

The CPU 501 controls entire operation of the computer 500. The CPU 501 may be implemented by any desired or any number of processor. The ROM 502 stores a program for controlling the CPU 501, such as an initial program loader (IPL). The RAM 503 is used as a work area for the CPU 501. The RAM 503 may be implemented by any desired volatile or non-volatile memory. The HD 504 stores various data such as a program. The HD 504, which may be referred as a hard disk drive, may be implemented by any desired non-volatile memory capable of storing a large amount of data. The HD 504 may be provided externally as long as the HD 504 is accessible. The HDD controller 505 controls reading and writing of various data from and to the HD 504 under control of the CPU 501. The display 506, as an example of displaying means, displays various information such as a cursor, menu, window, character, or image. The external device connection I/F 508 is an interface that connects the computer 500 to various extraneous sources. Examples of the external device include, but not limited to, a universal serial bus (USB) memory and a printer. The network I/F 509 is an interface for communicating data via the network 2. The bus line 510 is an address bus, a data bus, or the like for electrically connecting the components such as the CPU 501 illustrated in FIG. 3.

The keyboard 511 is an example of an input device provided with a plurality of keys for allowing a user to enter characters, numerical values, or various instructions. The pointing device 512 is an example of an input device that allows a user to select or execute a specific instruction, select a target for processing, or move a cursor being displayed. The optical drive 514 controls reading or writing of various kinds of data from or to an optical recording medium 513 that is an example of a removable recording medium. The optical drive 514 may be a compact disc (CD), a digital versatile disc (DVD), a Blu-Ray®, or the like. The medium I/F 516 controls reading and writing (storing) of data from and to a recording medium 515 such as a flash memory.

The motion capturing device 517, which is an example of input means, is a circuit that detects a user's motion and converts the detected motion into an electrical signal. The motion of the user may be detected by any one of an optical system that detects reflection of light, a magnetic sensor attached to the user body, a mechanical sensor, a system that uses a detection result of a magnetic sensor, a system that analyzes an image of the user, and the like, or a combination thereof.

The microphone 518 is a built-in circuit that converts sound into an electric signal. The speaker 519 is a built-in circuit that generates sound such as music or voice by converting an electric signal into physical vibration. The microphone 518 and the speaker 519 may be built-in or provided separately.

The speaker 519 is a built-in circuit that generates sound such as music or voice by converting an electric signal into physical vibration.

The camera 520 is an example of built-in imaging device capable of capturing a target to obtain captured image data.

In case of the computer 500 operating as the information processing system 3, the HDD controller 505 controls the HD 504 to store the program. In case of the computer 500 operating as the terminal apparatus 1, the program is downloaded from the information processing system 3 via the network 2 and stored in the HD 504. The CPU 501 then reads the program from the HD 504 to execute so as to deploy the functional configuration of FIG. 4 in the RAM 503, collectively at the time of compilation or sequentially in accordance with the progress of processing. Further, in case of the computer 500 operating as the information processing system 3, the CPU 501 executes the program so as to deploy the functional configuration of FIG. 4 in the RAM 503, collectively at the time of compilation or in accordance with the progress of processing.

For the computer 500 operating as the information processing system 3, the configuration related to the user interface may be omitted. For example, at least one of the display 506, the keyboard 511, the pointing device 512, and the motion capturing device 517 may be omitted.

Functional Configuration of Visual Communication System

Figure 4:
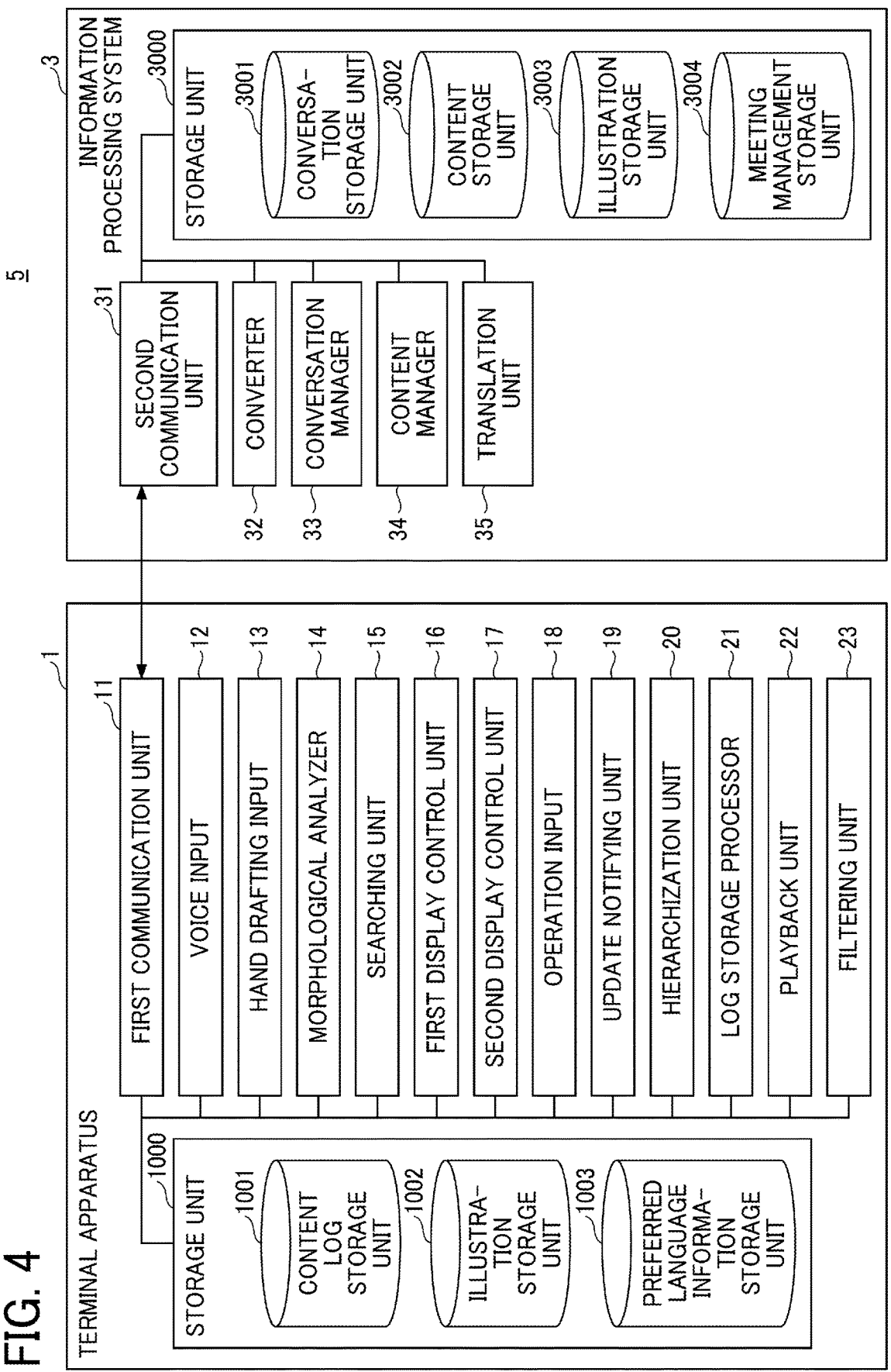
FIG. 4 is a block diagram illustrating a functional configuration of the visual communication system according to an exemplary embodiment.

Next, referring to FIGS. 4 to 10, a functional configuration of the visual communication system is described according to embodiments. FIG. 4 is a block diagram illustrating a functional configuration of the visual communication system 5, according to the exemplary embodiment.

Functional Configuration of Information Processing System

As illustrated in FIG. 4, the information processing system 3 includes a second communication unit 31, a converter 32, a conversation manager 33, a content manager 34, and a translation unit 35. These units of the information processing system 3 are functions or means implemented by or caused to function by operating one or more hardware components illustrated in FIG. 3 in cooperation with instructions of the CPU 501 according to the program loaded from the HD 504 to the RAM 503. The information processing system 3 also includes a storage unit 3000 implemented by the RAM 503 and HD 504 illustrated in FIG. 3.

The second communication unit 31 communicates with the terminal apparatus 1 via the network 2. The second communication unit 31 receives speech data or hand-drafted data from the terminal apparatus 1, and transmits language information converted from the speech data or hand-drafted data to the terminal apparatus 1.

The converter 32 performs recognition processing on speech data representing utterances by the user, or one or more pieces of stroke data (example of hand-drafted data) drafted by the user, to convert such speech data or hand-drafted data into language information.

The substance of the language information is a character code. Such recognition includes character recognition. Specifically, the converter 32 recognizes characters (multiple languages such as not only Japanese but also English), numbers, symbols (%, $, &, and the like), figures or shapes (line, circle, triangle, and the like), etc., concurrently with the user's utterance or the user's input operation (such as using a pen). Although various algorithms have been proposed for the recognition method, a detailed description is omitted, as any desired known technique can be used in the present embodiment. Further, more than one algorithm may be used, such that there may be the algorithm suitable to recognition of speech data, and the algorithm suitable to recognition of hand-drafted data. In this example, the converter 32 performs recognition processing on speech data indicating speech information based on utterance made by the user, and/or performs recognition processing on one or more pieces of stroke data (example of hand-drafted data) drafted by the user, to convert such speech data or hand-drafted data into language information. In the present embodiment, the user's utterance is referred to as "speech" and data obtained by converting the speech is referred to as "speech data" for distinction. They are not strictly distinguished from each other for the description purpose unless such distinction is necessary.

The conversion by the converter 32 may be alternatively performed at the terminal apparatus 1. The converter 32 may be provided in another server independent of the information processing system 3.

The conversation manager 33 stores the language information, which is converted from the speech data obtained from each terminal apparatus 1 by the converter 32, in the conversation storage unit 3001. The conversation storage unit 3001 stores a log of conversations in a chorological order.

The content manager 34 manages content, that is, language information, illustrations, and the like, displayed in the whiteboard work area 102. The content is stored in a content storage unit 3002 described later. Since the whiteboard work area 102 is shared between the terminal apparatus 1 and the counterpart terminal apparatus 9, the content storage unit 3002 includes a plurality of contents to be placed (arranged), or have been placed (arranged), by a user of each terminal apparatus 1.

When the language used by the terminal apparatus 1 is different from the language used by the counterpart terminal apparatus 9, the translation unit 35 translates the language information from the language used by the terminal apparatus 1 to the language used by the counterpart terminal apparatus 9. Similarly, the translation unit 35 translates the language information from the language used by the counterpart terminal apparatus 9 to the language used by the terminal apparatus 1.

Conversation Table

FIG. 5 is a conceptual diagram illustrating an example of conversation table. The storage unit 3000 includes the conversation storage unit 3001, implemented by a conversation table as illustrated in FIG. 5. The conversation table stores a plurality of items including language information ID ("language ID"), language information, input time, speaker, and number of likes, in association.

The language information ID item is an identifier of the language information displayed in the conversation log area 101. The conversation manager 33 assigns a unique number to each language information, as the identifier of the language information.

The language information item is language information displayed in the conversation log area 101, which is converted from speech data by the converter 32.

The input time item is a time when the language information is input, and is, for example, a time when the converter 32 completes converting from the speech data to the language information.

The speaker item is an identifier of a user who has uttered the language information as speech data. In the following, the identifier of the user may be referred to as a user ID. The identifier of the user is transmitted to the information processing system 3 together with the speech data.

The number of likes item is a number of times the "like" button is pressed for a particular language information. The "like" button means a favorable response, and the number of likes is the number of favorable responses.

Content Table

FIG. 6 is a conceptual diagram illustrating an example of content table. The storage unit 3000 includes the content storage unit 3002, implemented by a content table as illustrated in FIG. 5. The content table stores a plurality of items including a content ID, a type, a page, coordinates, a size, a font size, an arrangement time, and language information ID ("language ID"), in association with one another.

The content ID item is identification information for identifying a content. The content manager 34 assigns a content ID to each content.

The type item indicates a type of content. Examples of type includes hand-drafted data, language information, a shape (square, triangle, or the like), an illustration, a table, and the like. "Hand drafted" indicates stroke data (coordinate point sequence). The language information indicates one or more characters, symbols, etc. (referred to as character codes) arranged in the whiteboard work area 102. Shape indicates a geometric shape, such as a triangle and a quadrangle, each of which is converted from the hand-drafted data or the language information. The illustration is image data in any desired data format such as JPEG, Png, or Tiff, which is retrieved using language information or directly placed by the user. The table is an example of content in one-dimensional table form or two-dimensional table form.

In this disclosure, one screen of the whiteboard work area 102 is referred to as one page. The page item indicates a page number of such page.

The coordinates item indicates a position of the content with respect to a predetermined origin of the whiteboard work area 102. The position of the content corresponds to, for example, the upper left vertex of the circumscribed rectangle of the content. The coordinates are expressed, for example, in units of pixel of the display.

The size item indicates a width and a height of the circumscribed rectangle of the content.

The font size item indicates a size of one character, which is a content whose type is language information. For the language information, in addition to the character size, any other property such as a color or a font may be set.

The arrangement time item is a date and time when the content is first placed in the whiteboard work area 102. The content may be placed by copying a content from the conversation log area 101, or by a user directly hand-drafting on the whiteboard work area 102. The arrangement time keeps the time when the content is firstly input, such that the arrangement time is not changed even when the language information is decomposed by the morphological analysis or the size of the illustration is changed. This is to maintain the relationship of the arrangement time with the input time of the language information in the conversation log area 101.

The language information ID item is the same as the language information ID of specific language information, when the language information or the illustration is derived from the specific language information in the conversation log area 101 (for example, when the illustration is copied or searched using the language information in the conversation log area 101). Through the language information ID in the content table, each content (in this example, language information or illustration) is associated with the language information in the conversation log area 101. The language information ID is not assigned to the content in the conversation log area 101, which is not derived from the language information in the conversation log area 101.

Illustration Table

FIG. 7 is a conceptual diagram illustrating an example of illustration table. The storage unit 3000 includes an illustration storage unit 3003, implemented by an illustration table as illustrated in FIG. 7. The illustration table stores a plurality of items including a keyword, an ID, and a file name in association with one another.

The keyword item is a character string to be searched for, which corresponds to a name or appellation of an illustration to be searched. In this example, the illustration having a file name, which is associated with a keyword at least partially matching the words (characters) included in the language information, is displayed at the terminal apparatus 1. The keyword may be represented by a word, phonogram, ideogram, sentence, number, or any combination thereof.

The ID item is identification information identifying the illustration.

The file name item is a name of an electronic file of the illustration.

The illustration table as illustrated in FIG. 7 is registered in advance in the information processing system 3 by a system administrator who manages the information processing system 3, for example. Alternatively, the searching unit 15 may search an illustration on the Internet without preparing the illustration table. Alternatively, the information processing system 3 may generate an illustration corresponding to a word included in language information using the technology such as a generative adversarial network (GAN).

The illustration may also include a 3D model or a three-dimensional illustration. The 3D model or the three-dimensional illustration is a virtual three-dimensional object in a three-dimensional space. The user can view the 3D model or the three-dimensional illustration from any arbitrary direction within 360 degrees. The information processing system 3 may also convert the 3D model or the three-dimensional illustration into an illustration on a two-dimensional plane.

Meeting Management Table

FIG. 8 is a conceptual diagram illustrating an example of meeting management table. The storage unit 3000 includes a meeting management storage unit 3004, implemented by a meeting management table as illustrated in FIG. 8. The meeting management table stores a plurality of items such as a participant, a title (meeting name), a start date and time, an end date and time, a place (location), and a password in association with a meeting ID of each meeting.

The participant item indicates a participant of the meeting.

The title item describes contents of the meeting, such as a name of the meeting or a topic of the meeting.

The start date and time item is a date and time when the meeting is scheduled to be started.

The end date and time item is a date and time when the meeting is scheduled to end.

The place item is a place where the meeting is held, which may be represented by, for example, a name of a meeting room, a name of a branch office, a name of a building, etc.

The password item is authentication information for allowing participation in the meeting, and is distributed to the meeting participants in advance.

Functional Configuration of Terminal Apparatus

Referring back to FIG. 4, a functional configuration of the terminal apparatus 1 is described according to the embodiment. The terminal apparatus 1 includes a first communication unit 11, a voice input unit (voice input) 12, a hand drafting input unit (hand drafting input) 13, a morphological analyzer 14, a searching unit 15, a first display control unit 16, a second display control unit 17, an operation input unit (operation input) 18, an update notifying unit 19, a hierarchization unit 20, a log storage processor 21, a playback unit 22, and a filtering unit 23. These units of the terminal apparatus 1 are functions or means implemented by or caused to function by operating one or more hardware components illustrated in FIG. 3 in cooperation with instructions of the CPU 501 according to the program loaded from the HD 504 to the RAM 503. The terminal apparatus 1 also includes a storage unit 1000 implemented by RAM 503 and HD 504 illustrated in FIG. 3.

The first communication unit 11 communicates with the information processing system 3 via a network. The first communication unit 11 transmits speech data or hand-drafted data to the information processing system 3, and receives language information converted from the speech data or hand-drafted data.

The voice input 12 receives input of speech collected at the microphone 518, and acquires speech data as speech information based on the received speech. That is, the voice input 12 performs pulse code modulation (PCM) on speech (that is, voice), which is an analog signal, and converts the speech into speech data which is digital data.

The hand drafting input 13 receives input of stroke data (a sequence of coordinate points), based on detected coordinates of a position where an input device such as a pen is made in contact with the touch panel. The hand drafting input 13 may receive input of stroke data (a sequence of coordinate points) in response to an operation with a mouse. The hand drafting input 13 connects a plurality of contact coordinates into a coordinate point sequence by interpolation, to generate stroke data. Stroke data is data displayed on a display based on a trajectory of coordinates of a stroke input with the input device. The stroke data may be interpolated appropriately. Hand drafted data is data having one or more pieces of stroke data.

The morphological analyzer 14 performs morphological analysis on language information with the information processing system 3, and decomposes the language information into words with parts of speech. The morphological analysis is a process of decomposing language information into meaningful minimum units and determining a meaning, a part of speech, etc.

The searching unit 15 searches an illustration storage unit 1002 using a character string of a word decomposed by the morphological analyzer 14. The searching unit 15 acquires an illustration matching the character string, which is searched, from the illustration storage unit 1002.

The first display control unit 16 displays language information, a list of illustrations, menu icons, etc., in the conversation log area 101 of the information display screen 100. The second display control unit 17 displays language information, a list of illustrations, illustrations, menu icons, etc., in the whiteboard work area 102 of the information display screen 100.

The operation input 18 receives various operations on the conversation log area 101 or the whiteboard work area 102. Examples of such operation include pressing a menu icon, selecting content, editing content, moving content, and deleting content.

When there is a change in content in the whiteboard work area 102, the update notifying unit 19 notifies the information processing system 3 of information related to the content in order to share the content with the counterpart terminal apparatus 9. The change in content is detected, when there is any change to be shared for a particular content, such as location, size, color, etc. of the content.

The hierarchization unit 20 determines the positional relationship of a plurality of contents placed on the whiteboard work area 102 according to a hierarchical structure, and arranges the respective contents in hierarchy.

The log storage processor 21 stores, in a content log storage unit 1001, the language information in the conversation log area 101 in association with the content in the whiteboard work area 102. That is, the language information displayed in the conversation log area 101 at a certain time is associated with the content of the whiteboard work area 102.

When the user requests to playback the language information in the conversation log area 101 in order to review the discussions in the meeting, the playback unit 22 displays (playbacks) the content displayed in the whiteboard work area 102 in accordance with the language information displayed in the conversation log area 101.

The filtering unit 23 filters the language information displayed in the conversation log area 101 by such as the user ID. This reduces the number of pieces of language information displayed in the conversation log area 101, thus allowing the user to easily search for language information of the user's interest.

Content Log Table

FIGS. 9A and 9B (FIG. 9) are a conceptual diagram illustrating an example of content log table. The storage unit 1000 includes a content log storage unit 1001, implemented by a content log table as illustrated in FIGS. 9A and 9B. The content log table stores a status of the conversation log area 101 and a status of the whiteboard work area 102 in a chronological order, each in association with a status ID.

The status ID item is identification information identifying a status of the conversation log area 101 and a status of the whiteboard work area 102, which are associated.

The status of the conversation log area 101 indicates which language information is displayed in the conversation log area 101 by a language information ID of specific language information being displayed. For example, in a case where the status ID is s001, the language information of t001 to t002 is displayed in the conversation log area 101. In the corresponding whiteboard work area 102, the content indicated in the whiteboard work area status field with the status ID s001 is displayed. Next, it is assumed that t003 is added to the conversation log area 101. Accordingly, in the whiteboard work area 102 having a status where the language information of t001 to t003 is displayed, the content indicated in the whiteboard work area status field identified with the status ID of s002 is displayed. In this way, the status of the conversation log area 101 and the status of the whiteboard work area 102 are associated with each other.

As described above, the content log table stores information regarding the previous statuses of the whiteboard work area 102. Therefore, the terminal apparatus 1 is able to playback the whiteboard work area 102 reflecting the previous status, in a similar manner as it were firstly displayed, rather than as an image such as a snapshot. However, the previous status of the whiteboard work area 102 may be stored as an image such as a snapshot. Further, the entire information display screen 100 may be recorded as a moving image.

The above-described information regarding the previous statuses, managed by the content log storage unit 1001, may be recorded at the information processing system 3 and transmitted to the terminal apparatus 1. However, there may be a case where the number of pieces of language information that can be displayed in the conversation log area 101 differs depending on the terminal apparatus 1. In such a case, it is preferable to store the pieces of language information for each terminal apparatus 1.

Illustration Table

The illustration storage unit 1002 included in the terminal apparatus 1 may have the same structure as the illustration storage unit 3003 included in the information processing system 3. In case the terminal apparatus 1 executes a Web application, information managed by the illustration storage unit 3003 of the information processing system 3 is downloaded from the information processing system 3 to the terminal apparatus 1 via the network, as information to be managed by the illustration storage unit 1002. In case the terminal apparatus 1 executes a native application, information to be managed by the illustration storage unit 1002 is stored at the native application in advance. When the terminal apparatus 1 executes the native application, information to be managed by the illustration storage unit 1002 may be downloaded.

Preferred Language Information Table

FIG. 10 is a conceptual diagram illustrating an example of preferred language information table. The storage unit 1000 includes a preferred language information storage unit 1003, which is implemented by a preferred language information table as illustrated in FIG. 10. The preferred language information table stores the language information preferred by the user, selected from among the language information, in the conversation log area 101. The preferred language information table stores a list of language information IDs each being selected as preferable by the user. The preferred language information table is often different for each terminal apparatus 1, as each terminal apparatus 1 is operated by a different user.

Example of Information Display Screen

Figure 11:
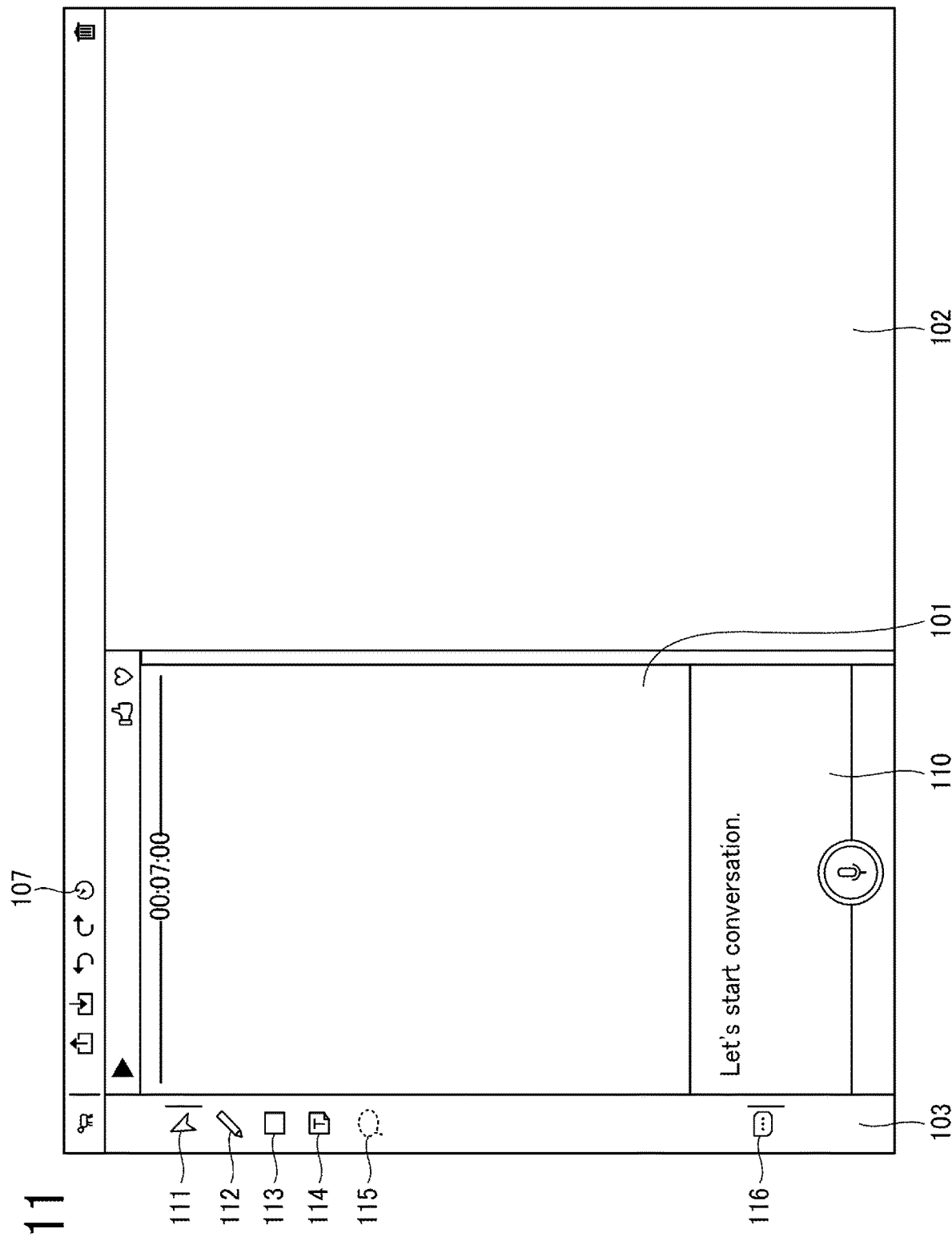
FIG. 11 is an illustration of an information display screen in an initial state, which is displayed by the terminal apparatus, according to an exemplary embodiment.

Next, referring to FIG. 11, an information display screen 100 displayed by the terminal apparatus 1 is described according to the embodiment. FIG. 11 is an information display screen 100 in an initial state, which is displayed by the terminal apparatus 1. The information display screen 100 may be displayed using a Web application or a native application.

The information display screen 100 includes a conversation log area 101, a whiteboard work area 102, a tool display field 103, and a speech recognition result display field 110.

The tool display field 103 displays various types of tools. The tools include a content selection tool 111, a pen tool 112 for hand-drafting input, a graphic tool 113 for drawing shapes, a text tool 114 for inputting characters, a lasso tool 115 for drawing a selection border, and the like. The above-described tools are just examples. The tools also include a display switch tool 116 for switching display or undisplay of the conversation log area 101. When the display switch tool 116 is pressed, the conversation log area 101 is closed, and the whiteboard work area 102 is displayed in larger size.

The conversation log area 101 displays the language information converted from the speech data in a chronological order.

When new language information is added to the conversation log area 101, the old language information moves from top to bottom. The language information that has reached the bottom of the conversation log area 101 is scrolled out. Even when scrolling out, the user can display the previous language information by operating the scroll bar.

The speech recognition result display field 110 displays, therein, language information converted from speech data acquired by the voice input 12 of the terminal apparatus 1 in real time. The language information displayed in the speech recognition result display field 110 may also be shared with the counterpart terminal apparatus 9. For the language information being displayed in the speech recognition result display field 110, an illustration is automatically displayed. For example, when the status where no speech is detected continues for a predetermined time period, the language information being displayed in the speech recognition result display field 110 is transmitted to the information processing system 3. The information processing system 3 transmits an instruction to display the converted language information in the conversation log area 101 to each terminal apparatus 1, such that the language information is shared between different terminal apparatuses.

The user can arbitrarily input content to the whiteboard work area 102. That is, the user can use the whiteboard work area 102, as an electronic whiteboard. Further, as will be described later, the user can copy the language information displayed in the conversation log area 101 to the whiteboard work area 102.

The user may adjust the positions or sizes of the conversation log area 101 and the whiteboard work area 102. For example, the user may switch the locations of the conversation log area 101 and the whiteboard work area 102, between left and right of the screen. When the user increases the display size of the whiteboard work area 102, the conversation log area 101 may be reduced in size accordingly. The same applies when the user changes the display size of the conversation log area 101. The whiteboard work area 102 may be larger than the display 506 in displayable size. In such case, the display 506 displays only a part of the whiteboard work area on the display 506 in response to an operation of the user.

Speech Recognition and Sharing of Language Information

Figure 12:
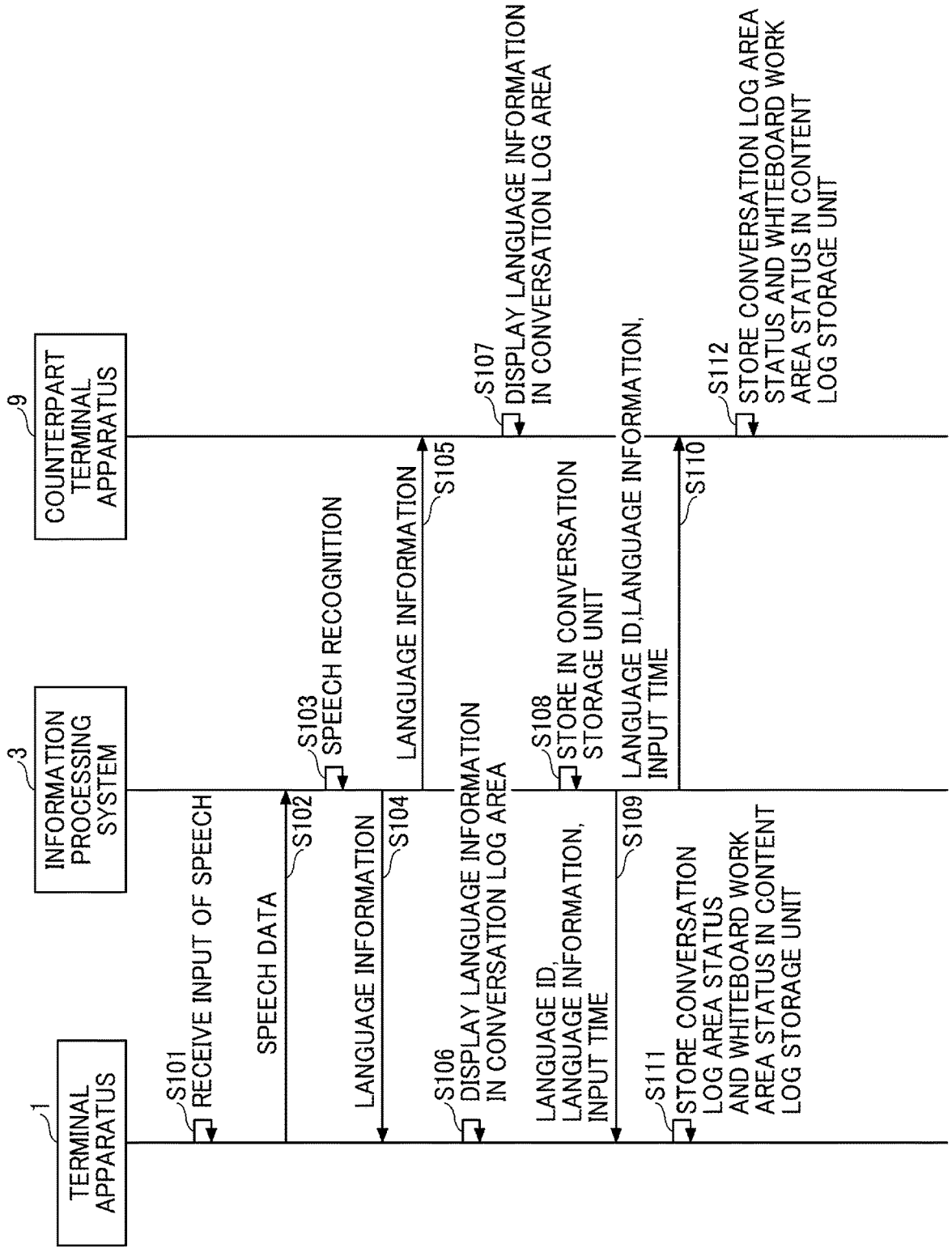
FIG. 12 is a sequence diagram illustrating processing of transmitting speech data from the terminal apparatus to the information processing system, and processing to share language information converted from the speech data at the information processing system with the counterpart terminal apparatus, according to an exemplary embodiment.

Next, referring to FIG. 12, operation of sharing language information converted from speech data, by each terminal apparatus 1 participating in a meeting, is described according to an embodiment. FIG. 12 is a sequence diagram illustrating processing of transmitting speech data from the terminal apparatus 1 to the information processing system 3, and processing to share language information converted from the speech data at the information processing system 3 with the counterpart terminal apparatus 9, according to the embodiment. The terminal apparatus 1 and the counterpart terminal apparatus 9 participate in the same meeting, for example, by each connecting to a URL transmitted by such as an e-mail invitation. The information processing system 3 manages the plurality of terminal apparatuses 1 participating in the same meeting using user IDs, IP addresses, or the like, of the participants. Alternatively, each user at the terminal apparatus 1 may select a particular meeting registered in the meeting management table and input a preset password, to participate in the same meeting. In such case, the information processing system 3 manages the plurality of terminal apparatuses 1 participating in the same meeting by using user IDs, IP addresses, etc. of the participants.

S101: The voice input 12 of the terminal apparatus 1 receives input of voices (speech) uttered by the user.

S102: The voice input 12 transmits speech data, which is digital data converted from voices, to the information processing system 3 via the first communication unit 11.

S103: The second communication unit 31 of the information processing system 3 receives the speech data. The converter 32 performs speech recognition on the speech data to convert the speech data into language information.

S104, S105: The second communication unit 31 transmits the language information to the terminal apparatus 1 and the counterpart terminal apparatus 9 participating in the meeting. Since the speech recognition is performed in real time, the content of the speech may not be determined at this time.

S106, S107: The first communication unit 11 of the terminal apparatus 1 and the first communication unit 11 of the counterpart terminal apparatus 9 each receive the language information. At each of the terminal apparatus 1 and the counterpart terminal apparatus 9, the first display control unit 16 displays the undetermined language information in the speech recognition result display field 110, as the language information is received.

S108: The conversation manager 33 stores the language information ID (newly assigned number), the language information, the input time, the speaker (the user who has logged in), and the number of likes (the initial value is 0) in the conversation table, based on a detection of a break of the utterance by the user. For example, the break time is detected when a period of time for not receiving any voices (time for silence) exceeds a preset value.

S109, S110: The second communication unit 31 transmits the language information ID, the language information, and the input time to the terminal apparatus 1 and the counterpart terminal apparatus 9.

S111, S112: The first communication unit 11 of the terminal apparatus 1 and the first communication unit 11 of the counterpart terminal apparatus 9 each receive the language information ID, the language information, and the input time. At each of the terminal apparatus 1 and the counterpart terminal apparatus 9, the first display control unit 16 additionally displays new language information in the conversation log area 101. In this example, the input time may not be transmitted. For example, the input time, when transmitted, is used for highlighting the language information corresponding to the content selected in the whiteboard work area 102 (see FIG. 24).

As display of the conversation log area 101 changes, the log storage processor 21 acquires the language information ID of the language information currently displayed in the conversation log area 101, as the status of the conversation log area 101. In addition, the log storage processor 21 acquires the content data being displayed in the whiteboard work area 102, as the status of the whiteboard work area 102. Information on such content data may be acquired from the information processing system 3 or may be acquired from the content being displayed on the terminal apparatus 1. The log storage processor 21 stores the status of the conversation log area 101 and the status of the whiteboard work area 102 in association with each other in the content log storage unit 1001.

Copying of Language Information from Conversation Log Area to Whiteboard Work Area Next, referring to FIGS. 13A to 13D, a display example of content in the whiteboard work area 102 using the language information in the conversation log area 101 is described according to the embodiment. FIGS. 13A to 13D are schematic diagrams illustrating processing of copying language information from the conversation log area 101 to the whiteboard work area 102, performed by the terminal apparatus 1, in response to a user operation, according to the embodiment.

Figure 13A:
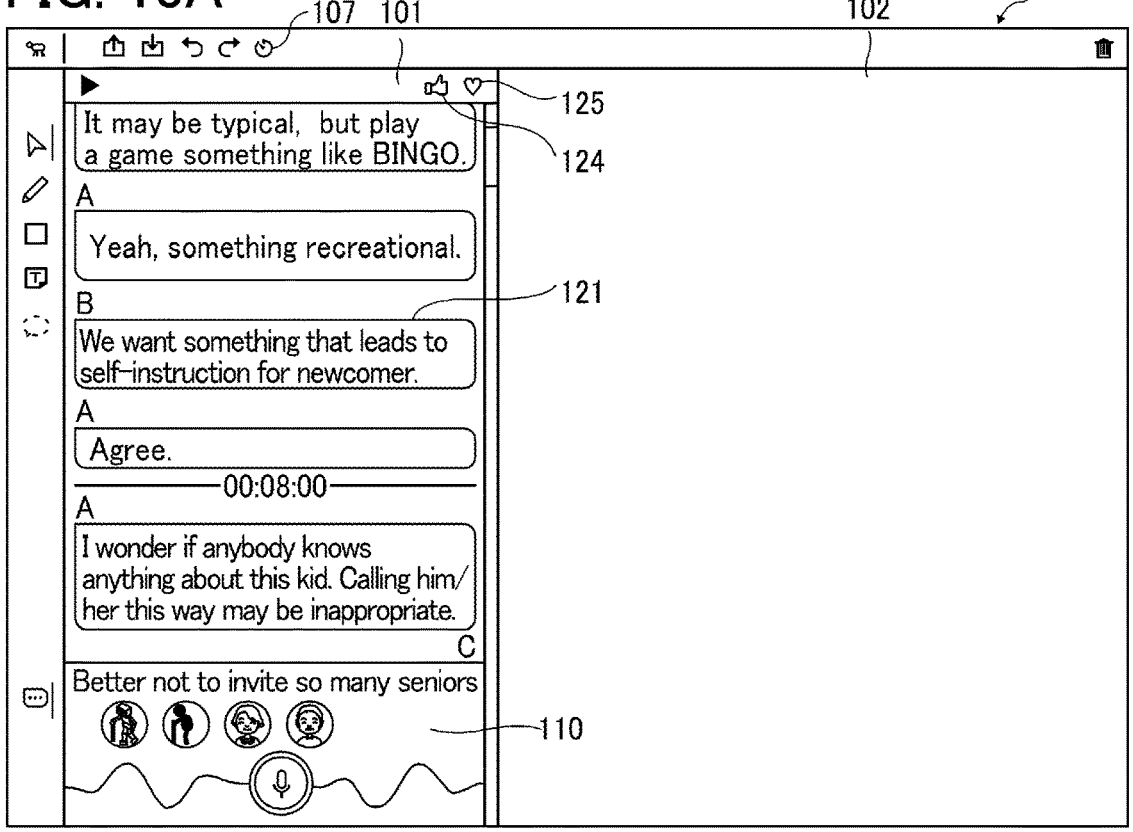
FIGS. 13A to 13D are schematic diagrams illustrating processing of copying language information from the conversation log area to the whiteboard work area, performed by the terminal apparatus, in response to a user operation, according to an exemplary embodiment.

FIG. 13A illustrates the conversation log area 101 displaying some language information. While the whiteboard work area 102 does not display any content in this example, the whiteboard work area 102 may display any content. The user selects (taps or clicks) any language information (for example, language information 121) in the conversation log area 101 for use in the whiteboard work area 102. The selected language information 121 is decomposed into character strings one by one by morphological analysis. The character strings correspond to morphemes based on user-defined rules. The language information 121 may be decomposed into characters, such as only Chinese characters, if the language information 121 is written in Japanese. The searching unit 15 searches the illustration storage unit 1002 using the decomposed character strings.

Figure 13B:
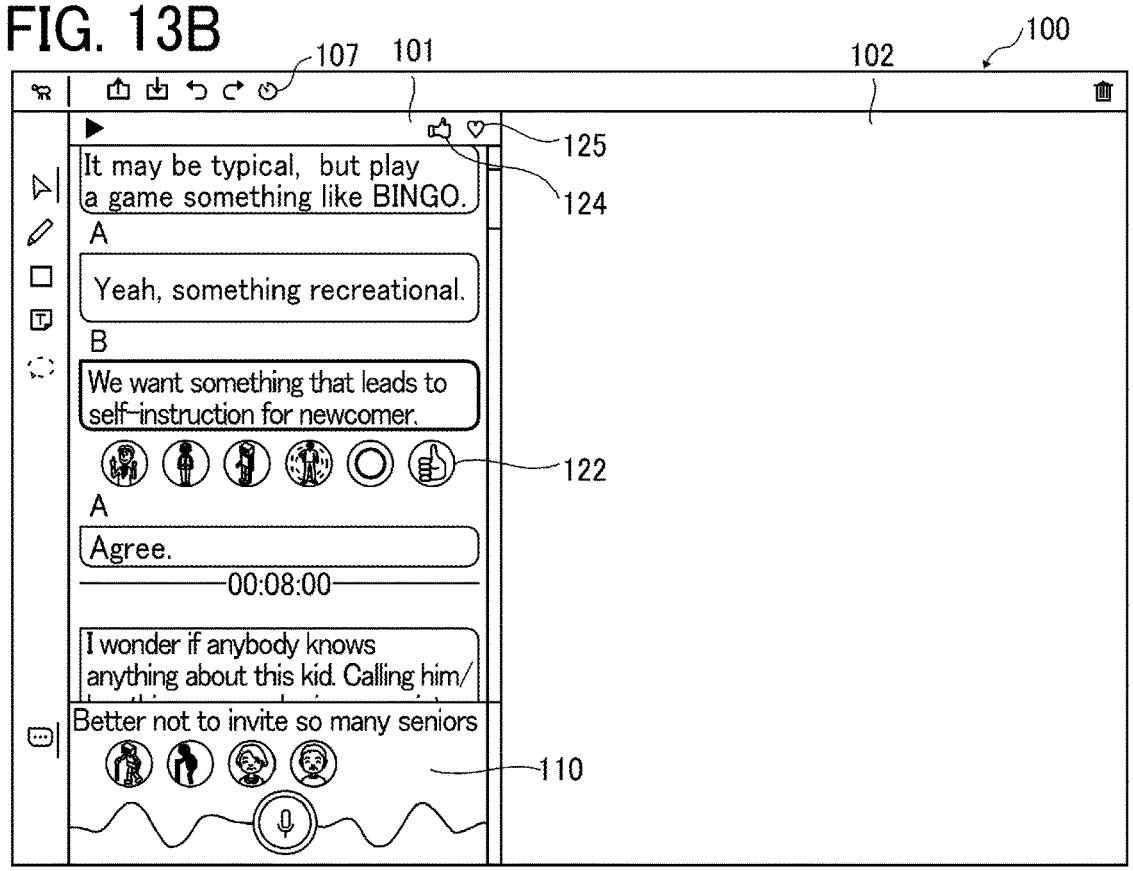

As illustrated in FIG. 13B, the first display control unit 16 displays a list 122 of illustrations (illustration list 122) related to the selected language information 121, near (in this example, below) the selected language information 121 in the conversation log area 101. The illustration list 122 lists thumbnails of a plurality of illustrations (there may be only one illustration). The user can select an illustration to be displayed in the whiteboard work area 102 from the illustration list 122. The user may drag and drop the selected illustration into the whiteboard work area 102. Alternatively, the user may simply select an illustration from the illustration list 122 to cause the selected illustration be displayed in the whiteboard work area 102.

The user may select an illustration from the illustration list 122, which is generated in response to a speech of another user, in addition to or in alternatively to the illustration list 122 generated based on the speech of the user himself or herself. With this selection, the other user knows that his or her speech has been referred to, and can feel that he or she actively participates in the meeting. It is assumed that the user does not select an illustration in FIG. 13B.

Further, the terminal apparatus 1 may store illustrations corresponding to the language information displayed in the speech recognition result display field 110 at least temporarily, and display the illustrations in the form of the illustration list 122. This can shorten a period of time from the time when the user selects the language information 121, to the time when the illustration list 122 is displayed.

Figure 13C:
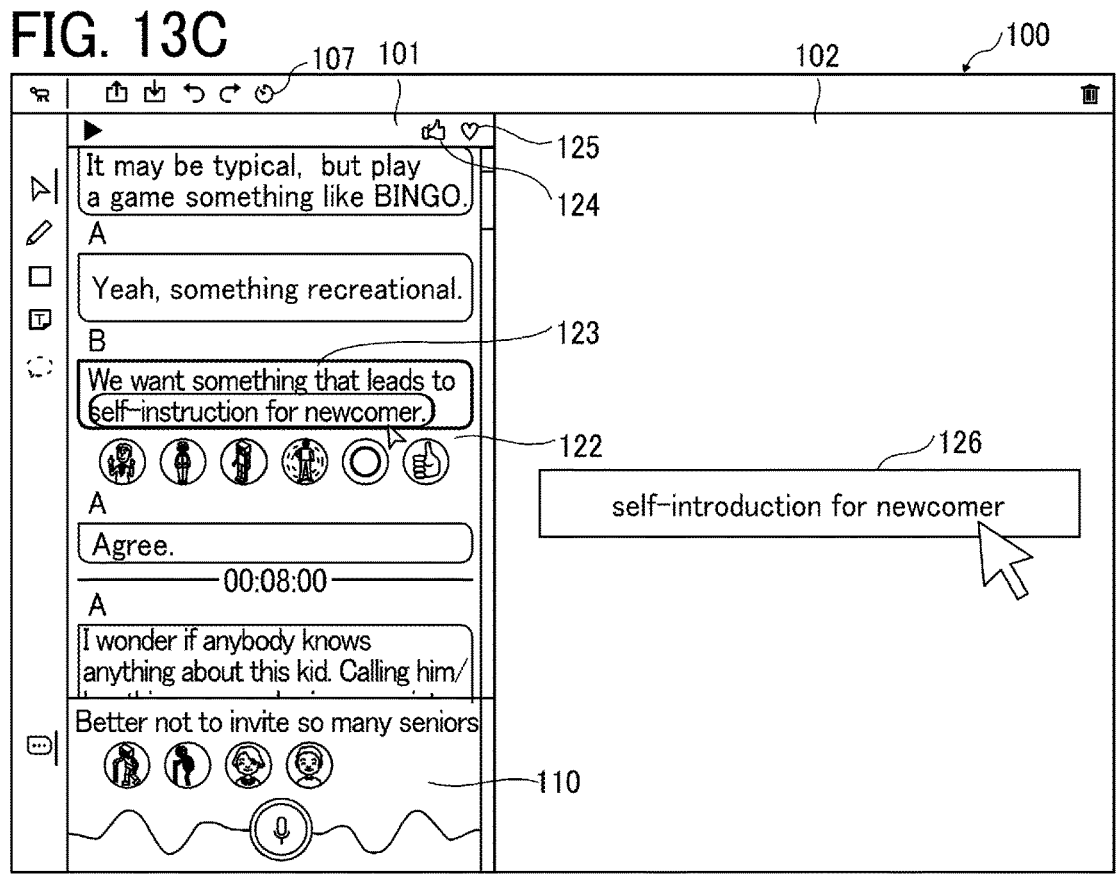
Figure 13D:
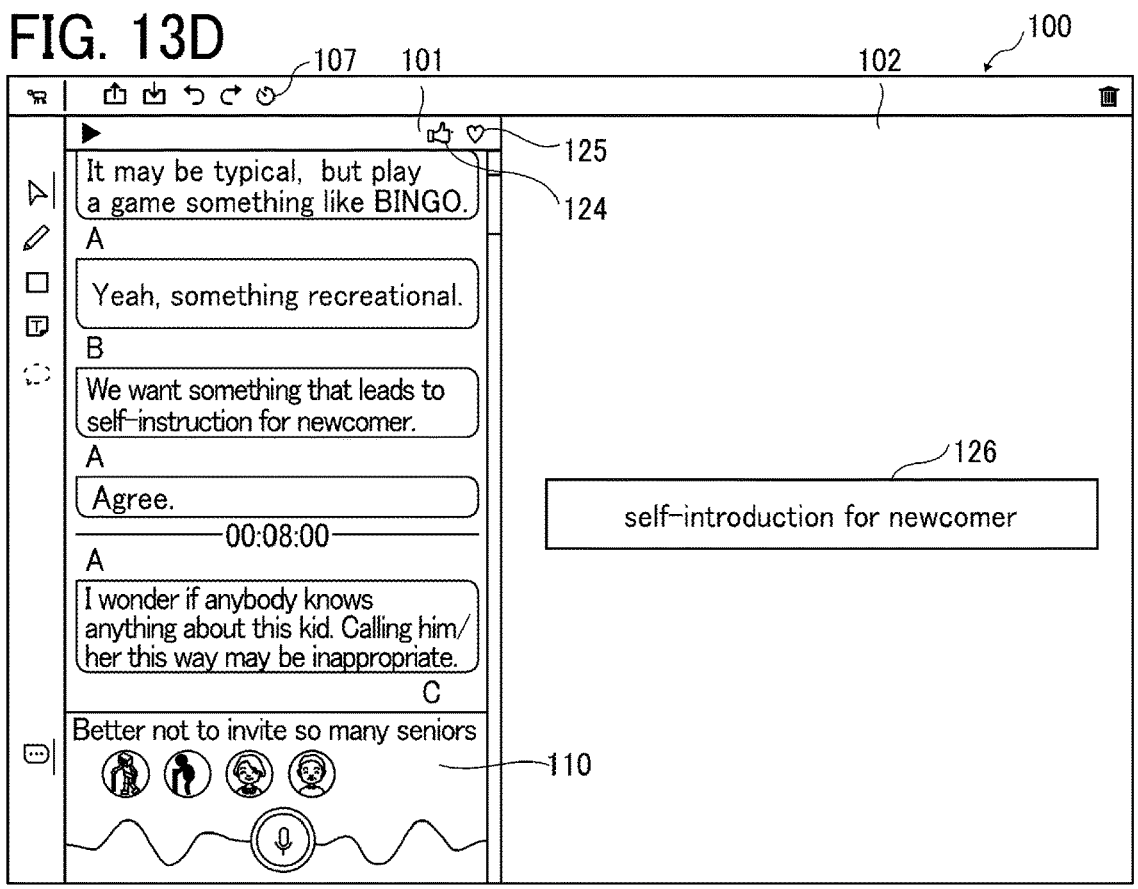

As illustrated in FIG. 13C, the user selects a character string 123 which is a part of the language information, and drags and drops a copy of the character string 123 (hereinafter referred to as a character string 126) from the conversation log area 101 to the whiteboard work area 102. FIG. 13D illustrates the character string 126 displayed in the whiteboard work area 102. Through this processing, the user can understand how his or her speech affects the content of the whiteboard work area 102.

The user can also cause the character string 123 to be displayed on the whiteboard work area 102, by clicking on a part of or entire character string 126 and then clicking on the whiteboard work area 102. The illustrations in the illustration list 122 may also be displayed in the whiteboard work area 102, by either dragging and dropping or clicking by the user.

As described above, input operation to the whiteboard work area 102 is reduced, as the user can use the language information in the conversation log area 101. The user can further move the character string 126 to a different position, or rotate the character string by an arbitrary angle.

As illustrated in FIG. 13A, a like button 124 and a favorite button 125 are displayed for each language information in the conversation log area 101. The like button 124 and the favorite button 125 may be displayed at all times, or may be displayed when the user selects particular language information or performs mouse-over operation on particular language information. When the user presses the like button 124, the language information ID and information indicating that the like button has been pressed are transmitted to the information processing system 3, and the number of likes in the conversation table is increased by one. When the user presses the favorite button 125, the language information ID is added to the preferred language information table of the terminal apparatus 1 operated by the user.

As illustrated in FIG. 13D, when content is added to the whiteboard work area 102, the update notifying unit 19 transmits the type, page, coordinates, size, font size, and language information ID of the content to the information processing system 3 via the first communication unit 11. Since the content manager 34 transmits one record of the content table, which is newly added, to the counterpart terminal apparatus 9, the terminal apparatus 1 can share the current status of the whiteboard work area 102 with the counterpart terminal apparatus 9.

When the illustration list 122 as illustrated in FIGS. 13A to 13D is displayed, the first display control unit 16 may determine a display order of the thumbnails of the illustration list 122, in accordance with the language information 121 from which each illustration is derived.

Figure 14B:
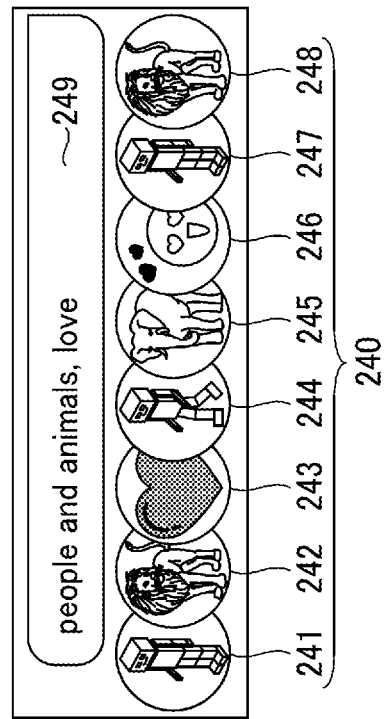
FIGS. 14A and 14B are diagrams for explaining the display order of thumbnails of illustrations, which are determined based on language information, according to an exemplary embodiment.
Figure 14A:
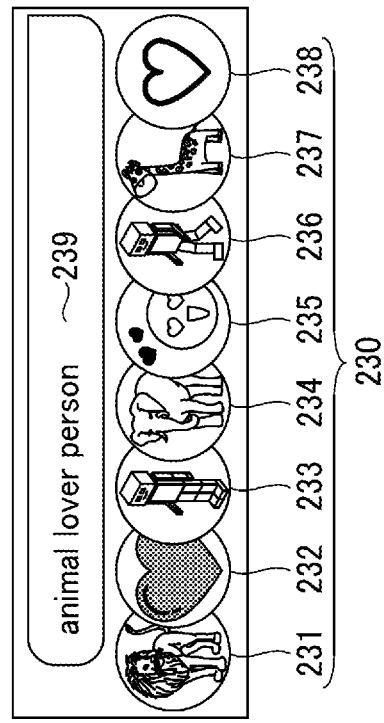

FIGS. 14A and 14B are diagrams for explaining the display order of thumbnails of illustrations, which are determined based on language information. FIGS. 14A and 14B illustrate how the display order of the thumbnails changes depending on different language information.

The first display control unit 16 performs morphological analysis on the language information, and searches the illustration table sequentially in an order from the first word to the last word, among a plurality of words obtained by the morphological analysis. Specifically, the first display control unit 16 extracts an illustration suitable to the searching word, and displays the illustration as an individual thumbnail image in the illustration list. Assuming that a plurality of illustrations each match one word in the illustration table, if the first display control unit 16 arranges thumbnails of all illustrations in the illustration list, a display area of the illustration list is filled with the thumbnails of the illustrations for only one word. In order to prevent this, the first display control unit 16 displays only one thumbnail of illustrations for one word, for one sentence of language information (one sentence being an example of language information in a predetermined unit). When one thumbnail of the illustration is displayed for one sentence, the first display control unit 16 returns to the beginning of the same sentence, and continues to display another set of thumbnails for the same words.

FIG. 14A illustrates a illustration list 230, displayed for language information 239 of "animal lover person (a person who loves animals)", uttered by the user. Words detected by the morphological analysis are "animal", "love(r)", and "person" in this order. Since the first display control unit 16 displays only one thumbnail for one word, in FIG. 14A, a thumbnail 231 corresponding to the word "animal", a thumbnail 232 corresponding to the word "love(r)", and a thumbnail 233 corresponding to the word "person" are displayed in this order. When the thumbnail of the illustration has been displayed for one sentence, the first display control unit 16 returns to the beginning of the same sentence, and continues to display another set of thumbnails for the same words. Therefore, in FIG. 14A, a thumbnail 234 corresponding to the word "animal", a thumbnail 235 corresponding to the word "love(r)", a thumbnail 236 corresponding to the word "person", are displayed in this order. Similarly, a thumbnail 237 corresponding to the word "animal", and a thumbnail 238 corresponding to the word "love(r)" are displayed in this order.

FIG. 14B illustrates an illustration list 240 of illustrations displayed for the language information 249 "people and animals, (I) love (I love people and animals)", uttered by the user. Words detected by the morphological analysis are "people", "animals", and "love" in this order. The order of appearance of words is different from that in FIG. 14A. Therefore, in FIG. 14B, a thumbnail 241 corresponding to the word "people", a thumbnail 242 corresponding to the word "animals", a thumbnail 243 corresponding to the word "love", a thumbnail 244 corresponding to the word "people", a thumbnail 245 corresponding to the word "animals", a thumbnail 246 corresponding to the word "love", a thumbnail 247 corresponding to the word "people", and a thumbnail 248 corresponding to the word "animals" are displayed in this order.

Figure 17A:
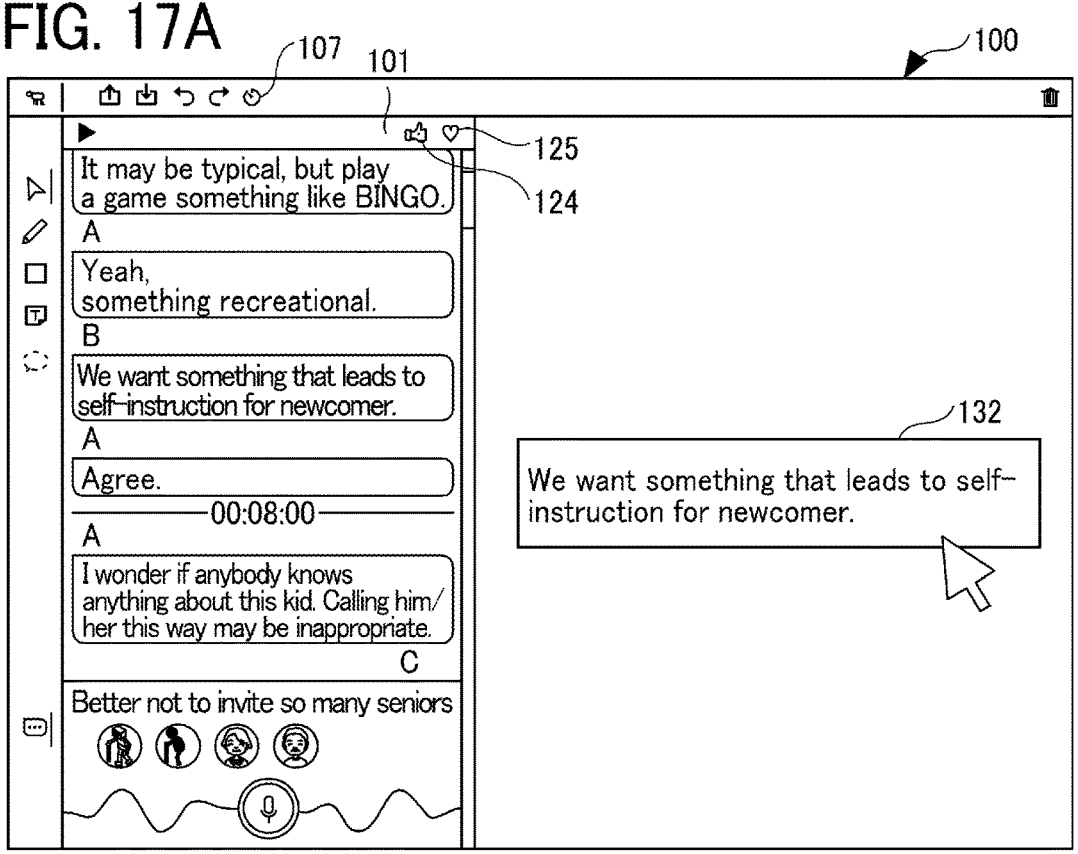
FIGS. 17A to 17C are diagrams illustrating a display example of an illustration, searched based on the language information copied to the whiteboard work area.
Figure 17B:
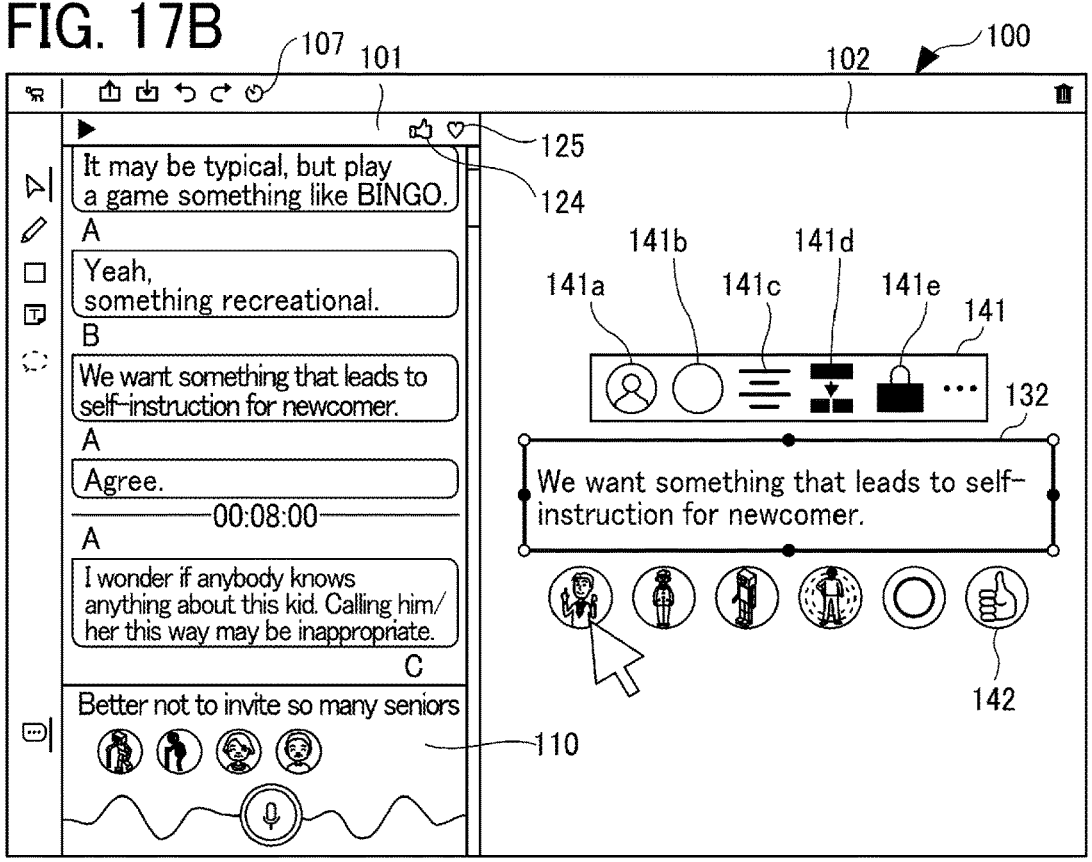

Display of thumbnails in the illustration list can also be controlled, in the case of displaying the words in the whiteboard work area 102, in a substantially similar manner (an illustration list 142 in FIG. 17B).

The first display control unit 16 may display a plurality of thumbnails for one word, if the display area of the illustration list is not filled with only thumbnails of illustrations for the single word. Further, morphological analysis may be collectively performed on a plurality of sentences (or a plurality of predetermined units for analysis), and only illustrations common to the words detected as a result of the analysis may be displayed.

Figure 15:
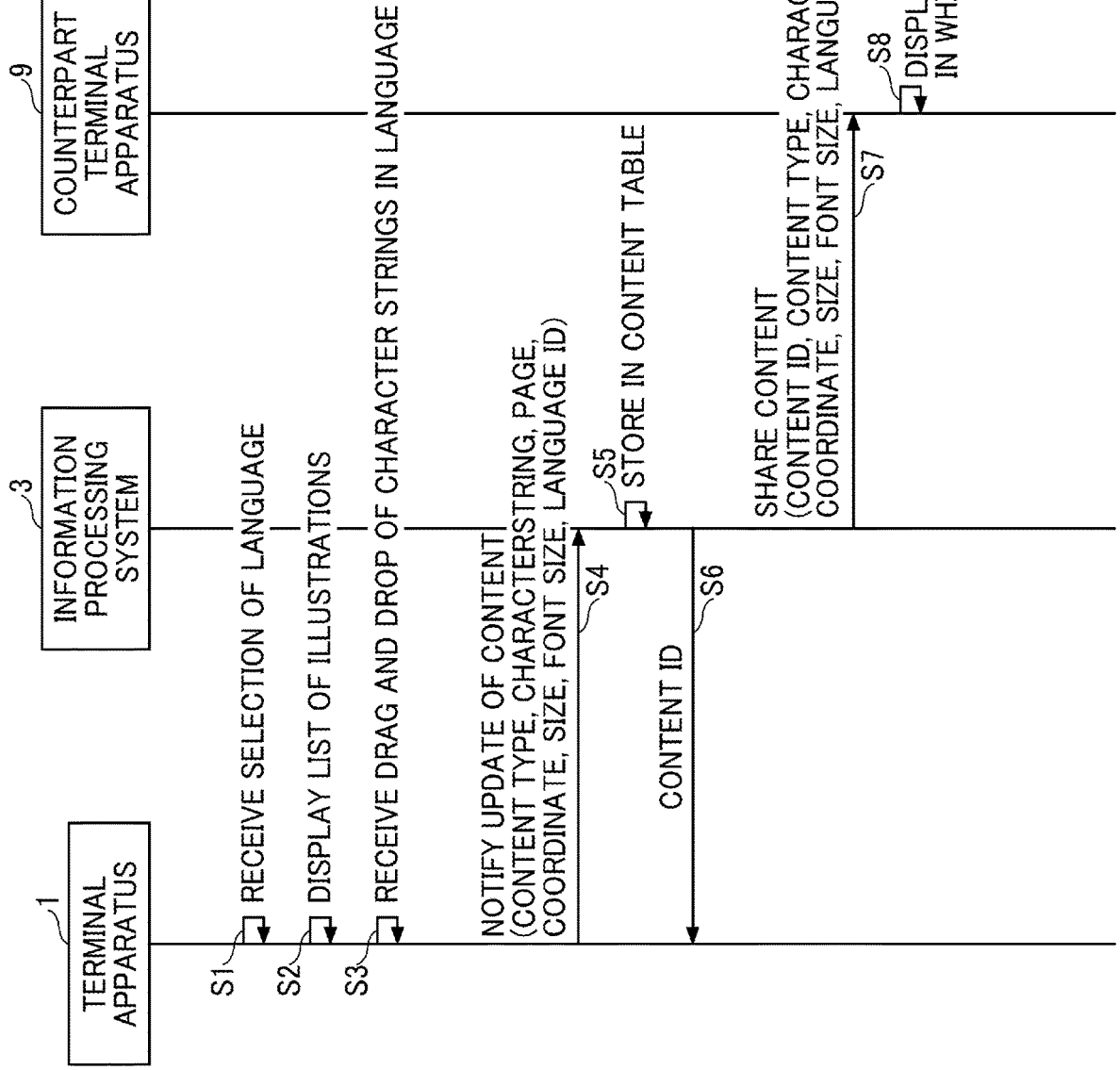
FIG. 15 is a sequence diagram illustrating processing of copying language information from the conversation log area to the whiteboard work area, performed by the terminal apparatus, in response to a user operation, according to an exemplary embodiment.

FIG. 15 is a sequence diagram illustrating processing of copying language information from the conversation log area 101 to the whiteboard work area 102, performed by the terminal apparatus 1, in response to a user operation, in the above-described example case of FIGS. 13A to 13D.

S1: As the user selects the language information (in this example, the language information 121) in the conversation log area 101, the operation input 18 receives the selection by the user.

S2: The morphological analyzer 14 performs morphological analysis on the language information 121, and decomposes the language information 121 into character strings. The morphological analysis does not have to be performed, such that the morphological analyzer 14 may extract only Chinese characters from sentences, if the language information is written in Japanese written in mixture of "Kana" characters and Chinese characters. The searching unit 15 searches the illustration storage unit 1002 for a keyword that matches each character string. The first display control unit 16 displays the illustration list 122, which lists illustrations associated with each keyword used for the search, near the selected language information 121.

S3: The user drags and drops a copy of a part of the character string 123 of the language information, to the whiteboard work area 102, as the character string 126. The operation input 18 receives the above-described user operation, and the second display control unit 17 displays the character string 126 at a destination where the user has dropped. The character string 126 is an example of content based on a user operation on the language information.

S4: The update notifying unit 19 detects that the status of the whiteboard work area 102 has been changed. The update notifying unit 19 transmits a content update notification (content type, character string 126, page, coordinates, size, font size, and language information ID) to the information processing system 3 via the first communication unit 11.

S5: The second communication unit 31 of the information processing system 3 receives the content update notification. The content manager 34 assigns a content ID to the copied content and stores the content ID in the content table together with items of the content update notification.

S6: The second communication unit 31 of the information processing system 3 transmits the content ID to the terminal apparatus 1.

S7: As a change has occurred in the content table, the content manager 34 transmits a content sharing request (content ID, content type, character string 126, page, coordinates, size, font size, and language information ID) to the counterpart terminal apparatus 9 participating in the same meeting.

S8: The first communication unit 11 of the counterpart terminal apparatus 9 receives the content sharing request. The second display control unit 17 displays the character string 126 at the position indicated by the coordinates, in a font having the font size being specified.

Full Text Copy of Language Information from Conversation Log Area to Whiteboard Work Area Next, referring to FIGS. 16A to 16D, an example display of content in the whiteboard work area 102 using language information in the conversation log area 101 is described according to the embodiment. FIGS. 16A to 16D are schematic diagrams illustrating processing of copying full text of language information from the conversation log area 101 to the whiteboard work area 102, performed by the terminal apparatus 1, in response to a user operation, according to the embodiment. In the description referring to FIG. 16, for simplicity, the processing that are different from the processing of FIG. 15 are described.

Figure 16A:
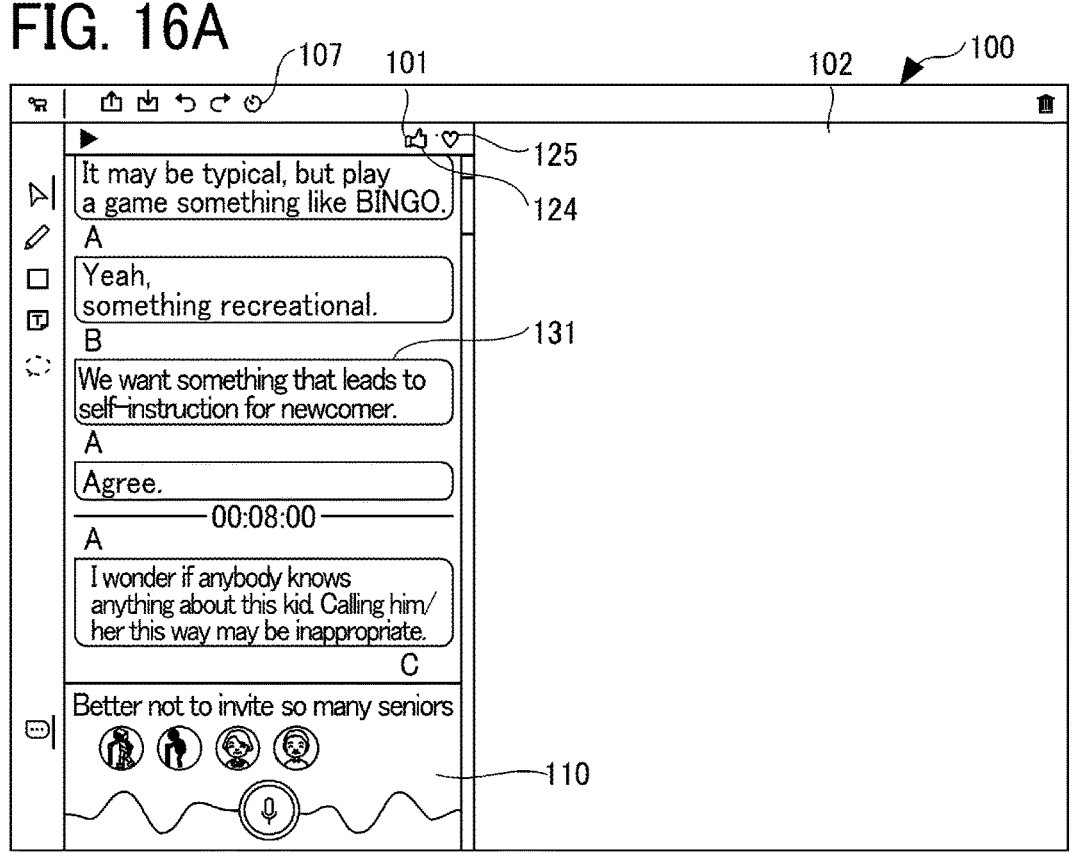
FIGS. 16A to 16D are schematic diagrams illustrating processing of copying full text of language information from the conversation log area to the whiteboard work area, performed by the terminal apparatus, in response to a user operation, according to an exemplary embodiment.
Figure 16B:
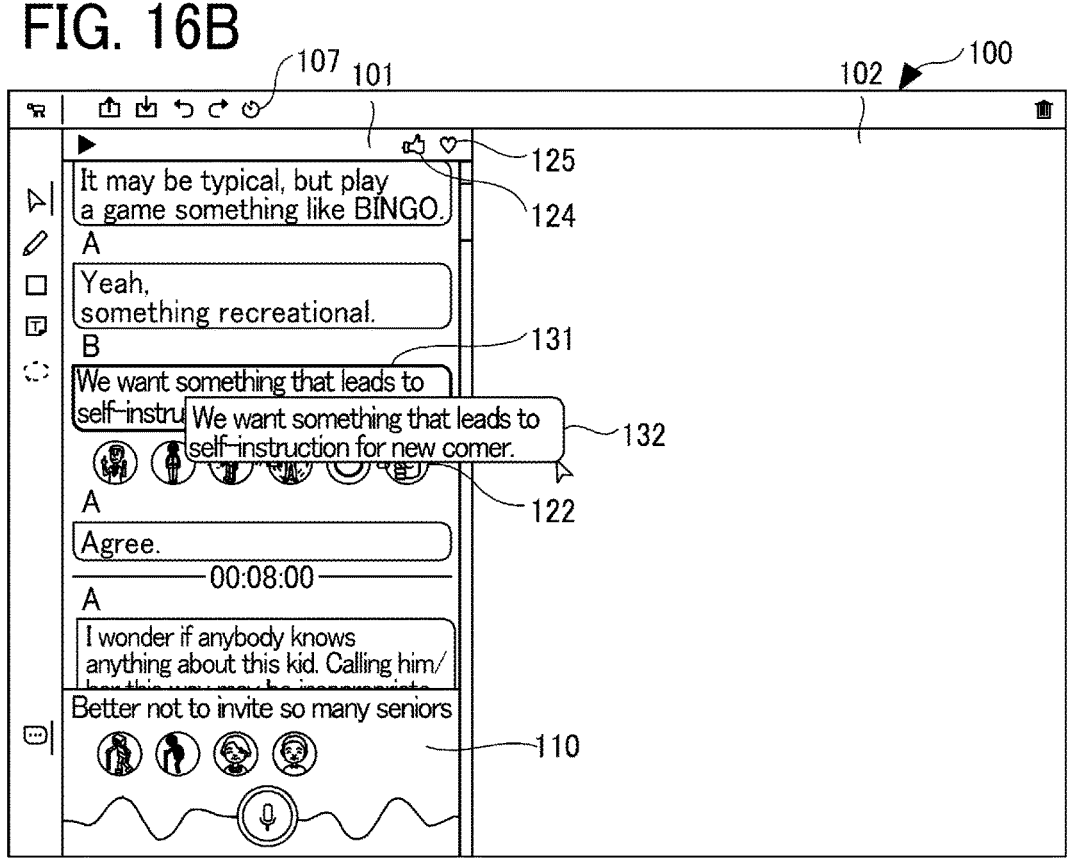

The illustration of FIG. 16A is the same as that of FIG. 13A. In FIG. 16B, the entire copy of one language information 131 (hereinafter referred to as language information 132) is dragged. In a case where the user hovers a mouse pointer, the first display control unit 16 does not move the language information in the conversation log area 101. This prevents the language information 131 to be copied, from moving, thus preventing operability from decreasing.

Figure 16C:
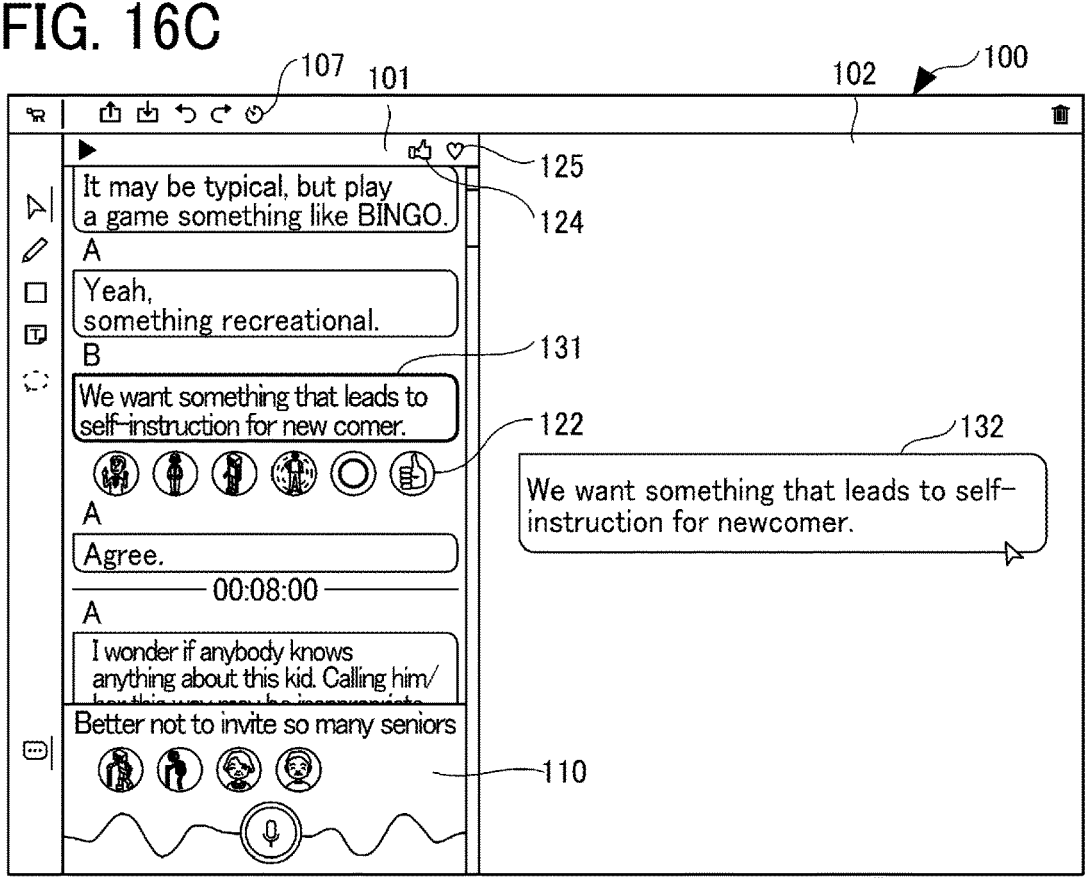
Figure 16D:
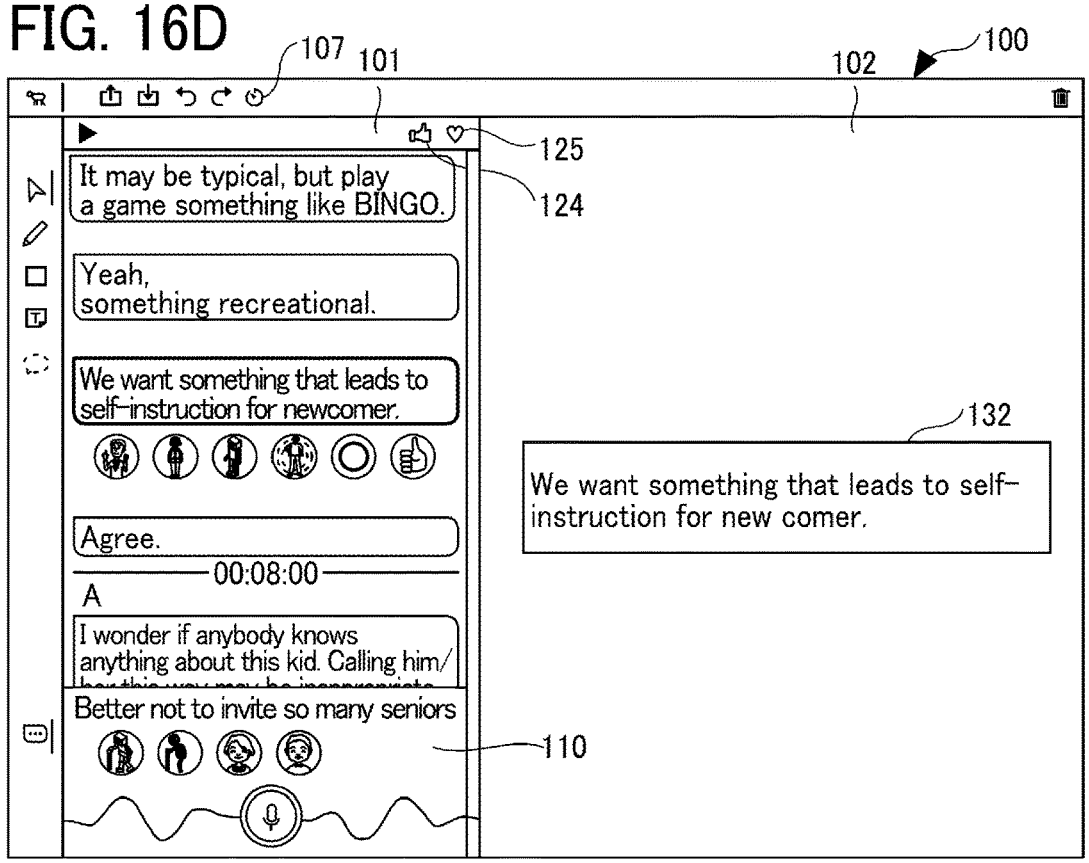

In FIG. 16C, one language information 132 is continuously dragged. FIG. 16D illustrates a state in which the user has dropped the language information 132. In this way, the user can copy the entire language information 131 in the conversation log area 101 to the whiteboard work area 102. As will be described later, since the user can also perform morphological analysis on the language information in the whiteboard work area 102, the user can use the entire character strings included in the language information 131, without dragging and dropping only a desired character string.

The processing of FIG. 16 may be the same as that of FIG. 15 except that the number of character strings copied to the whiteboard work area 102 are different.

Displaying Illustration Based on Language Information in Whiteboard Work Area

Figure 17C:
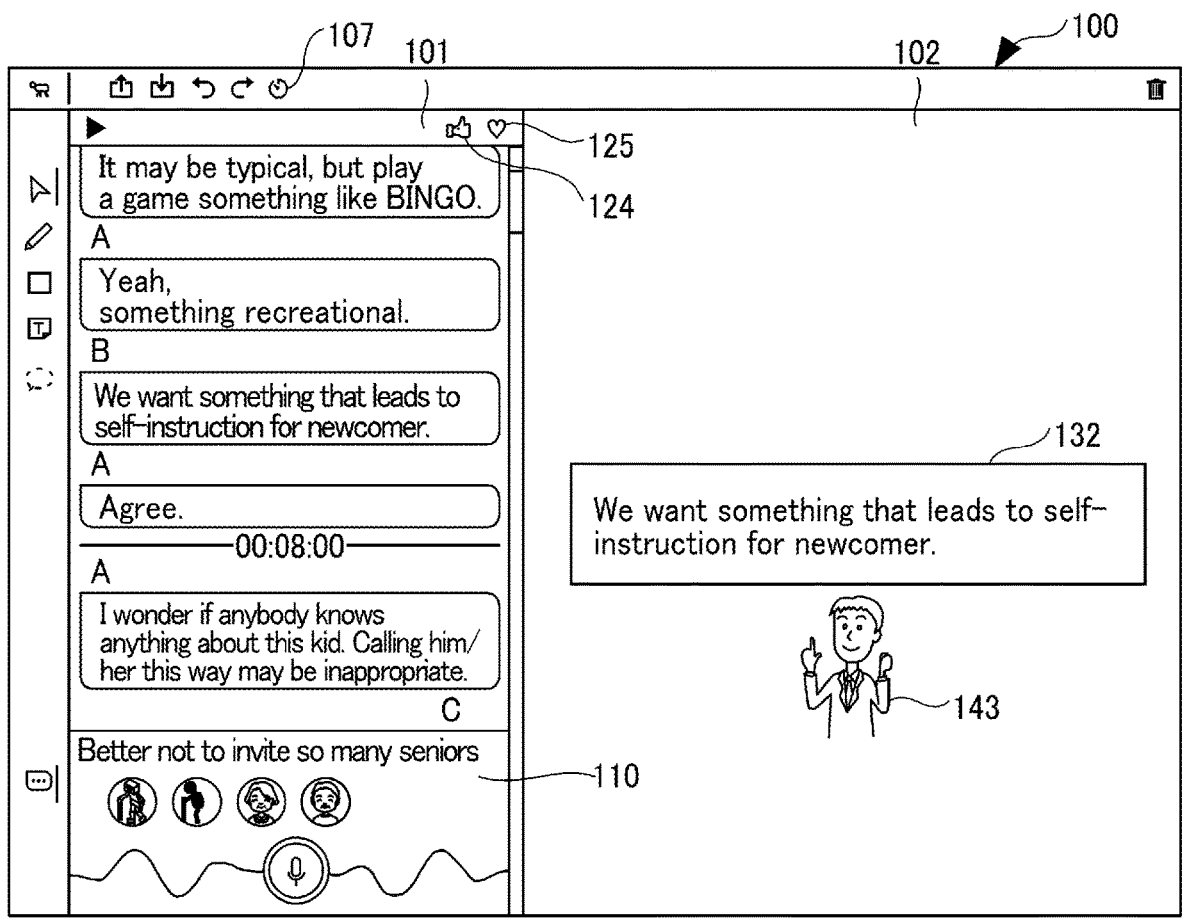

Referring next to FIGS. 17A to 17C, a display example of an illustration based on language information in the whiteboard work area 102 is described according to the embodiment. FIGS. 17A to 17C are diagrams illustrating a display example of an illustration, searched based on the language information copied to the whiteboard work area 102.

During discussions in the meeting, the user directly inputs language information into the whiteboard work area 102, or places language information selected from the conversation log area 101 in the whiteboard work area 102. If the illustration related to the language information is displayed along the language information, the content of the language information becomes easy to understand.

As illustrated in FIG. 17A, the user selects (taps or clicks) the language information 132 in the whiteboard work area 102. The selected language information 132 is decomposed into character strings one by one by morphological analysis. The character strings correspond to morphemes based on user-defined rules. The language information 121 may be decomposed into characters, such as only Chinese characters, if the language information 121 is written in Japanese. The searching unit 15 searches the illustration storage unit 1002 using the decomposed character strings.

As illustrated in FIG. 17B, the second display control unit 17 displays a list 142 of illustrations (illustration list 142) related to the language information and menu icons 141, near (in this example, below and above) the selected language information 132 in the whiteboard work area 102. The menu icons 141 include a user ID display icon 141a, an icon 141b for setting color of language information or a color of a frame, a language information centering icon 141c, a morphological analysis icon 141d, and a language information fixing icon 141e, etc. The above-described icons are merely examples.

The user can select an illustration to be displayed in the whiteboard work area 102 from the illustration list 142. As illustrated in FIG. 17C, the second display control unit 17 displays selected illustration 143. The size of the illustration 143 is assumed to be determined in advance, but can be changed as appropriate by the user.

By selecting the illustration 143 from the displayed illustration list 142, the user can smoothly add visual information to help convey the content during the meeting, without searching for a suitable illustration by himself or herself. The user can move the illustration 143 to another position, or rotate the illustration 143 by an arbitrary angle.

Figure 18:
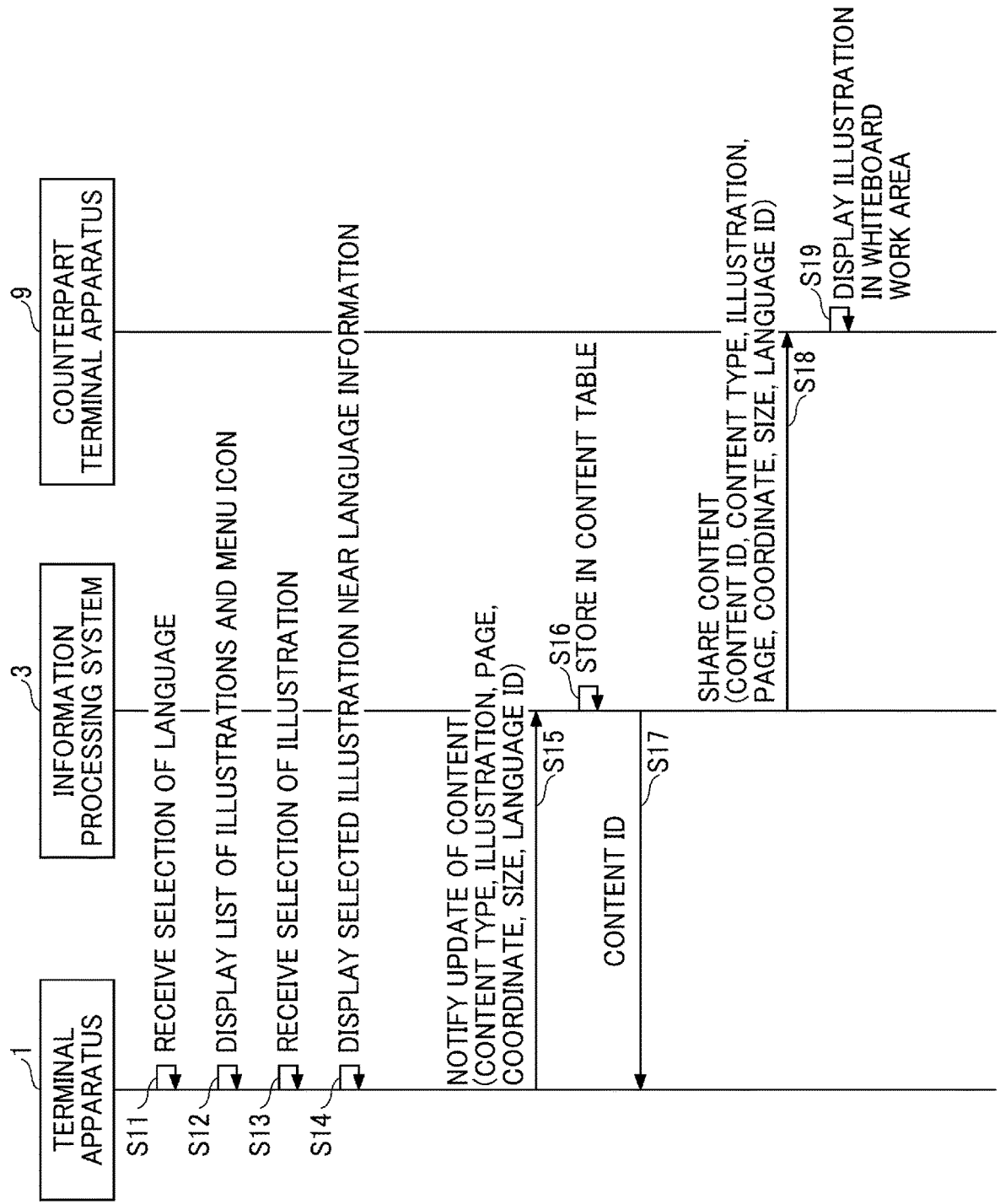
FIG. 18 is a sequence diagram illustrating processing of displaying an illustration based on language information of the whiteboard work area, performed by the terminal apparatus, in response to a user operation, according to an exemplary embodiment.

FIG. 18 is a sequence diagram illustrating processing of displaying an illustration based on language information of the whiteboard work area 102, performed by the terminal apparatus 1, in response to a user operation, in the above-described case referring to FIGS. 17A to 17C.

S11: As the user performs an operation on particular language information (in this example, the language information 132) in the whiteboard work area 102 to make a selection, the operation input 18 receives the selection by the user.

S12: The morphological analyzer 14 performs morphological analysis on the language information 132, and decomposes the language information 132 into character strings. The morphological analysis does not have to be performed, such that the morphological analyzer 14 may extract only Chinese characters from sentences, if the language information is written in Japanese written in mixture of "Kana" characters and Chinese characters. The searching unit 15 searches the illustration storage unit 1002 for a keyword that matches each character string. The second display control unit 17 displays the illustration list 142, which lists illustrations associated with each keyword used for the search, and the menu icons 141, near the selected language information 132.

S13: The user performs an operation on a particular illustration in the illustration list 142 to select the illustration. The operation input 18 receives the operation of selecting the illustration.

S14: The second display control unit 17 displays the selected illustration 143, near the language information 132 in the whiteboard work area 102. The illustration list 142 and the illustration 143 are examples of content based on a user operation on the language information.

S15: The update notifying unit 19 detects that the status of the whiteboard work area 102 has been changed. The update notifying unit 19 transmits a content update notification (content type, illustration, page, coordinates, size, and language information ID) to the information processing system 3 via the first communication unit 11.

S16: The second communication unit 31 of the information processing system 3 receives the content update notification. The content manager 34 assigns a content ID to the selected content, and stores the content ID in the content table together with items of the content update notification.

S17: The second communication unit 31 of the information processing system 3 transmits the content ID to the terminal apparatus 1.

S18: As a change has occurred in the content table, the content manager 34 transmits a request for sharing content (content ID, content type, illustration, page, coordinates, size, and language information ID) to the counterpart terminal apparatus 9 participating in the same meeting.

S19: The first communication unit 11 of the counterpart terminal apparatus 9 receives the request for sharing the content. The second display control unit 17 displays the illustration 143 at a position indicated by the coordinates being specified.

Decomposition of Language Information into Character Strings

Figure 19A:
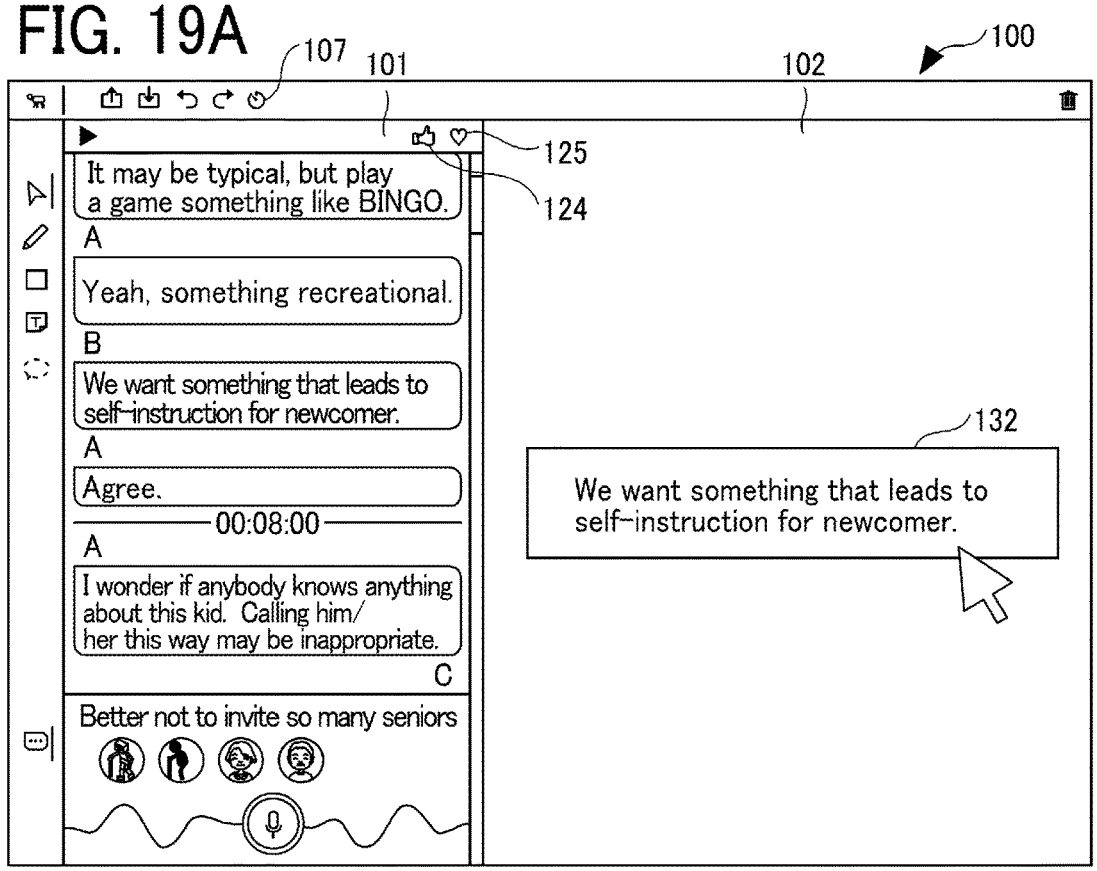
FIGS. 19A to 19C are diagrams for explaining decomposition of language information copied to the whiteboard work area into character strings.
Figure 19B:
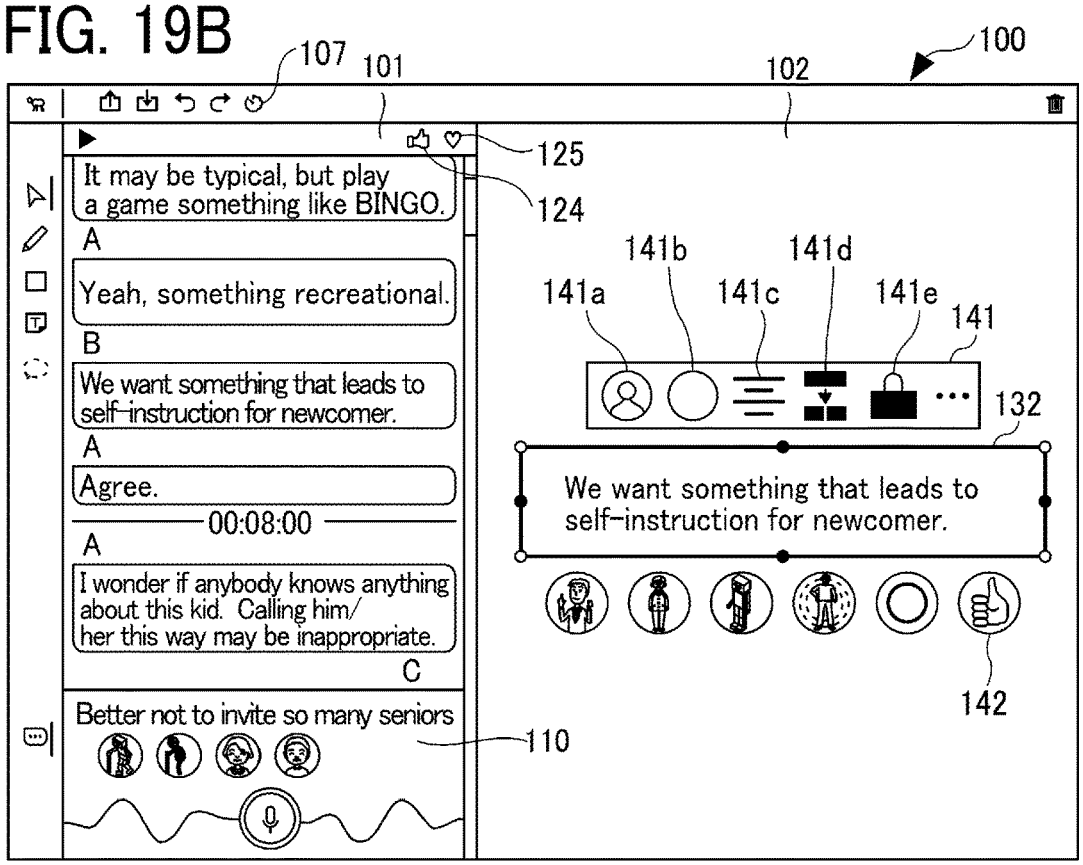
Figure 19C:
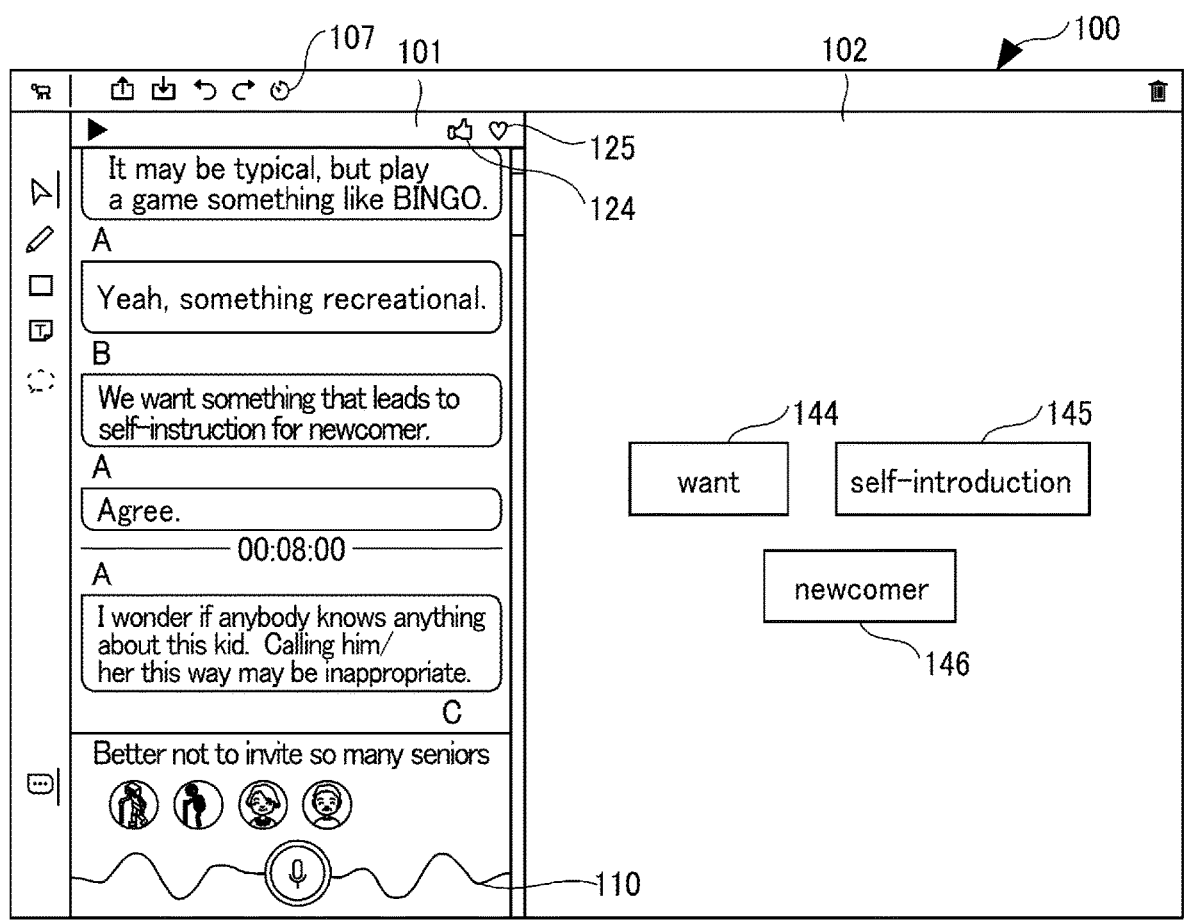

Next, referring to FIGS. 19A to 19C, an example of decomposition of language information into character strings, in the whiteboard work area 102, is described according to the embodiment. FIGS. 19A to 19C are diagrams for explaining decomposition of language information copied to the whiteboard work area 102 into character strings.

In copying the language information from the conversation log area 101 to the whiteboard work area 102, it is cumbersome for the user to perform operation of selecting and cutting out a part of the language information, while having conversations during the meeting. In view of this, the terminal apparatus 1 performs morphological analysis on the language information, decomposes the language information into character strings, and displays the character strings.

The screens illustrated in FIGS. 19A and 19B are substantially the same as those illustrated in FIGS. 17A and 17B. In FIG. 19B, the user presses the morphological analysis icon 141*d*. Accordingly, as illustrated in FIG. 19C, the morphological analyzer 14 performs morphological analysis on the language information 132 in the whiteboard work area 102. The second display control unit 17 deletes the language information 132 from the screen, and displays one or more character strings 144 to 146, based on a result of morphological analysis. The arrangement order of the character strings 141 to 146 is not limited to the one illustrated in FIG. 19C. The displayed character strings 144 to 146 are, for example, nouns and verbs. The character strings to be display may further include adjectives. It is preferable that the user can select a part of speech to be displayed. Further, the language information 132 may not be deleted from the screen.

The size of each of the character strings 144 to 146 may be the same as that of the original language information. Alternatively, the size of each of the character strings 144 to 146 may be determined according to the number of characters of the character strings 144 to 146. The display positions of the character strings 144 to 146 are arranged in the order of appearance of the character strings 144 to 146, with reference to the upper left corner of the circumscribed rectangle of the language information 132 as an origin. When a size of the character strings 144 to 146 being arranged exceeds a size determined by the circumscribed rectangle of the language information 132, such that the character strings 144 to 146 extend to the right by a certain amount or more, the second display control unit 17 makes a new row to display a part of the character string that does not fit.

The character strings 144 to 146 having been generated through decomposition as described above are still associated with the language information ID of the language information in the conversation log area 101.

In FIGS. 19A to 19C, the user presses the morphological analysis icon 141*d* to execute the morphological analysis on the language information 132 copied to the whiteboard work area 102. Alternatively, as the user selects one piece of language information in the conversation log area 101, the entire text (language information 132) may be placed in the whiteboard work area 102. The morphological analysis may be automatically executed on the entire language information 132 to decompose the language information 132 into character strings. That is, the user is able to instruct to decompose the language information 131 into the character strings 144 to 146, only by pressing the language information 131 in the conversation log area 101. In this case, the user may select whether to use the language information 132 or the character strings 144 to 146.

Furthermore, the second display control unit 17 can also automatically display illustrations of the character strings 144 to 146, which are displayed after decomposition, in the whiteboard work area 102. That is, the user is able to display illustrations of the character strings 144 to 146, only by pressing the language information 131 in the conversation log area 101.

Figure 20:
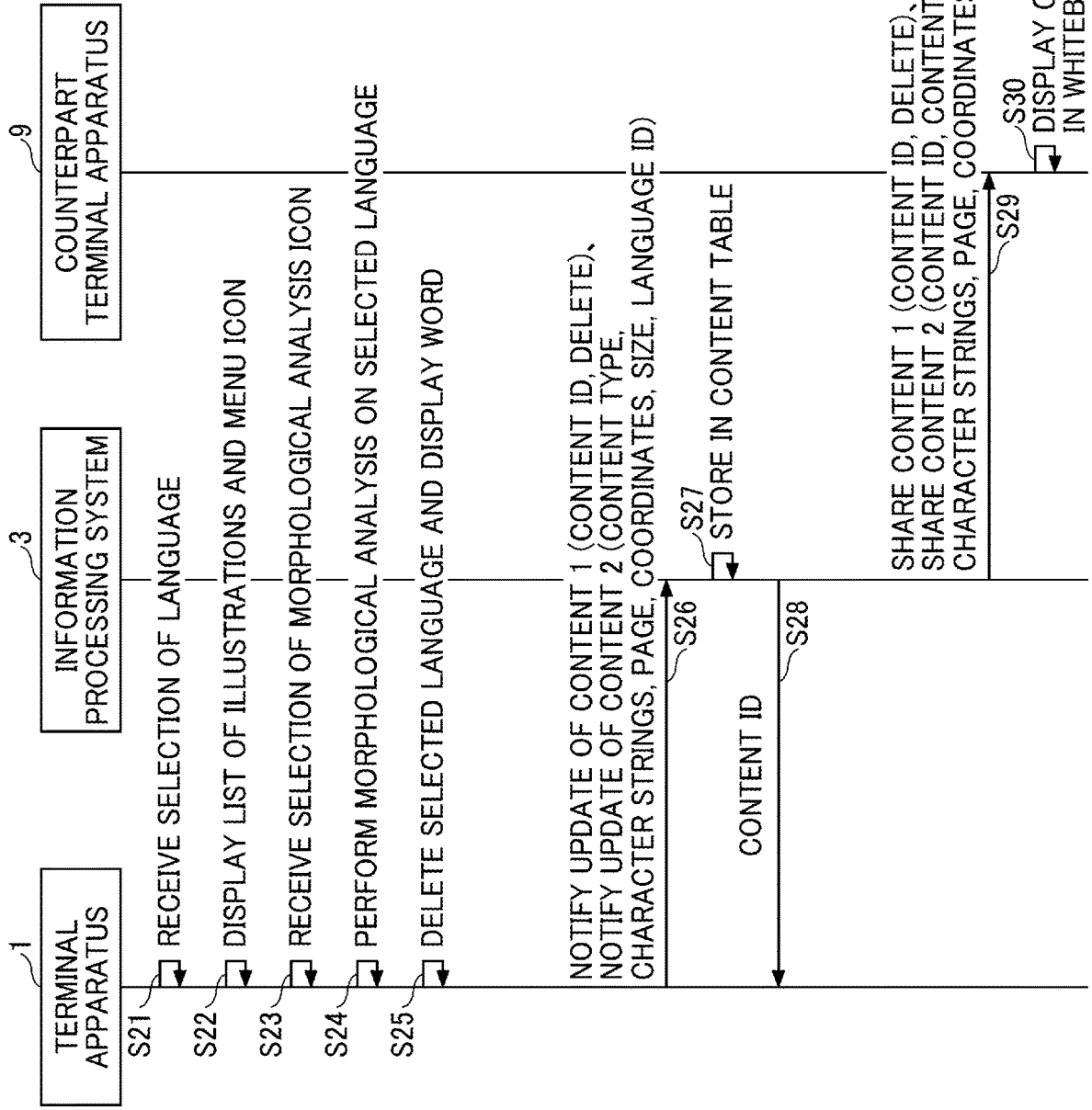
FIG. 20 is a sequence diagram illustrating processing of decomposing language information in the whiteboard work area into character strings, performed by the terminal apparatus, in response to a user operation, according to an exemplary embodiment.

FIG. 20 is a sequence diagram illustrating processing of decomposing language information in the whiteboard work area 102 into character strings, performed by the terminal apparatus 1, in response to a user operation, in the example case referring to FIGS. 19A to 19C.

S21: As the user selects the language information 132 in the whiteboard work area 102, the operation input 18 receives the selection by the user.

S22: The morphological analyzer 14 performs morphological analysis on the language information 132, and decomposes the language information 132 into words. In this example, a word is an example of morpheme. The morphological analysis does not have to be performed, such that the morphological analyzer 14 may extract only Chinese characters from sentences, if the language information is written in Japanese written in mixture of "Kana" characters and Chinese characters. The searching unit 15 searches the illustration storage unit 1002 for a keyword that matches each word. The second display control unit 17 displays the illustration list 142, which lists illustrations associated with each keyword used for the search, and the menu icons 141, near the selected language information 132.

S23: The user selects the morphological analysis icon 141*d* from the menu icons 141. The operation input 18 receives selection of the morphological analysis icon 141*d*.

S24: The morphological analyzer 14 executes morphological analysis on the selected language information 132.

S25: The second display control unit 17 deletes the selected language information 132 from the screen, and displays the character strings 144 to 146 in the whiteboard work area 102. At least one of the character strings 144 to 146 is an example of content based on a user operation on the language information.

S26: The update notifying unit 19 detects that the status of the whiteboard work area 102 has been changed. The update notifying unit 19 transmits a content update notification 1 that requests deletion of particular content (content ID, delete), and a content update notification 2 that requests to add particular content (content type, character strings 144 to 146, page, coordinates, size, font size, language information ID) to the information processing system 3 via the first communication unit 11.

S27: The second communication unit 31 of the information processing system 3 receives the content update notification. The content manager 34 deletes the content specified by the content ID in the content update notification 1. The content manager 34 further stores the contents, such as the character strings 144 to 146, in the content table, as specified by the content update notification 2.

S28: The second communication unit 31 of the information processing system 3 transmits the content IDs of the character strings 144 to 146 to the terminal apparatus 1.

S29: As a change has occurred in the content table, the content manager 34 transmits a content sharing request 1 (content ID, delete), and a content sharing request 2 (content ID, content type, character strings 144 to 146, page, coordinates, size, font size, language information ID), to reflect the change, to the counterpart terminal apparatus 9 participating in the same meeting.

S30: The first communication unit 11 of the counterpart terminal apparatus 9 receives the content sharing request. The second display control unit 17 deletes from the screen (not displays) the language information 132 specified by the content ID in the content sharing request 1. The second display control unit 17 displays the character strings 144 to 146 at the positions indicated by the coordinates, each in a font having the specified font size, according to the content sharing request 2.

Hierarchization of Contents

Figure 21A:
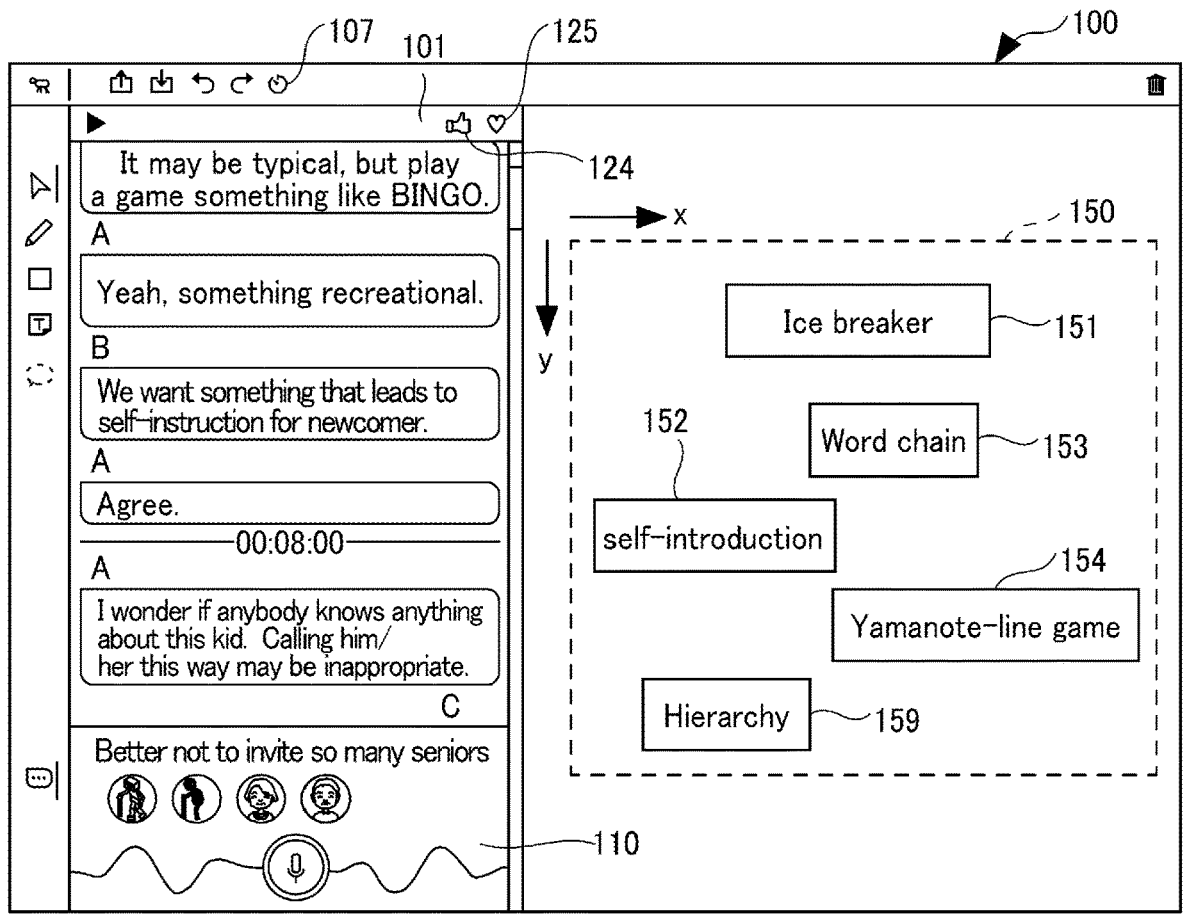
FIGS. 21A to 21C are diagrams for explaining hierarchization of a plurality of contents displayed in the whiteboard work area, according to an exemplary embodiment.
Figure 21B:
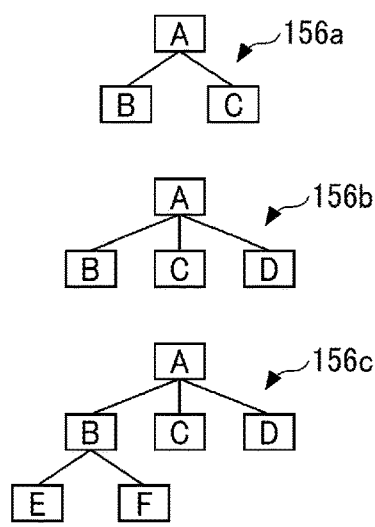
Figure 21C:
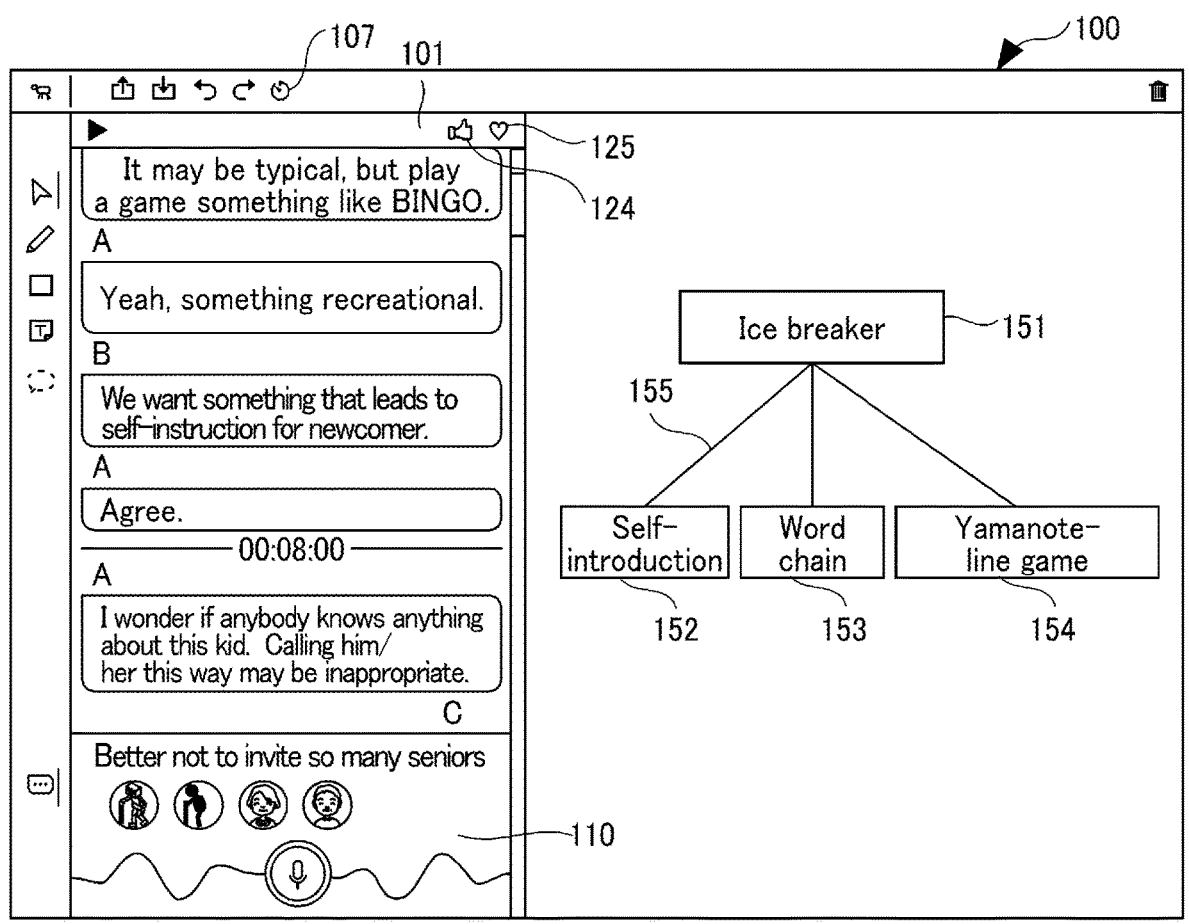

Next, referring to FIGS. 21A to 21C, hierarchization of a plurality of contents displayed in the whiteboard work area 102 is described according to the embodiment. FIGS. 21A to 21C are diagrams for explaining hierarchization of a plurality of contents displayed in the whiteboard work area 102.

In the meeting, a user may want to display information in hierarchy according to a certain rule. In such case, it is cumbersome for the user to manually arrange the information in hierarchy. In view of this, the hierarchization unit 20 arranges the contents based on the positional relationship between the plurality of contents, which are displayed in the whiteboard work area 102.

As illustrated in FIG. 21A, the user firstly makes a group based on contents 151 to 154 subjected to hierarchization, using the content selection tool 111. In FIG. 21A, the contents 151 to 154 subjected to hierarchization are character strings, but the contents subjected to hierarchization may be illustrations. Through grouping, a frame 150 and a hierarchy button 159 are displayed, and the user presses (taps or clicks) the hierarchy button 159. The user may further specify a hierarchical structure (such as the number of layers, the number of nodes).

FIG. 21B illustrates a list of hierarchical structures 156a to 156c, according to the embodiment. The user can select a desired one of the hierarchical structures 156a to 156c, and further edit, for example, to increase or decrease the number of nodes (A to F in FIG. 21B).

The hierarchization unit 20 arranges the plurality of selected contents 151 to 154 to the nodes of the hierarchical structure that is selected, respectively, based on the positional relationship between the grouped contents. Processing of hierarchization based on the positional relationship is described. In an example case of pyramid structure, the content 151 at the highest position (the y coordinate is small), among the contents 151 to 154, is placed at the node A, which is the top of the hierarchical structure. The remaining grouped contents are placed to the nodes of the hierarchical structure, respectively, in an order from the upper left to the lower right.

An example case where the hierarchical structure 156b in FIG. 21B is selected is described. The hierarchization unit 20 places the content 151 at the highest position in the whiteboard work area 102 of FIG. 21A, to the node A. The hierarchization unit 20 determines priorities of the remaining contents 152 to 154 based on the position coordinates (x, y) of the contents 152 to 154. For example, the hierarchization unit 20 gives a higher priority to the content with a total of the x coordinate and the y coordinate being smaller. The hierarchization unit 20 arranges the contents 152 to 154 to the nodes B, C, and D in descending order of priority.

FIG. 21C illustrates grouped contents 151 to 154 after hierarchization. Below the content 151, the contents 152 to 154 each being connected to the content 151 by a line 155 are aligned. As described above, the user can arrange the contents 151 to 154, each based on the language information copied from the conversation log area 101, in hierarchy, with simple operation.

Although the hierarchical structure is selected by the user in the description of FIG. 21B, the positional relationship between the grouped contents and the hierarchical structure may be modeled by machine learning. For example, a model may be generated using deep learning technique, as a model corresponding to the number of pieces of content. Specifically, in such model, coordinates of one piece of content are input, and a node position (a number or an ID indicating a node position) at which the content is placed by a user is output as a correct answer. This model outputs a probability of being placed at each node in response to input of coordinates of each content.

Figure 22:
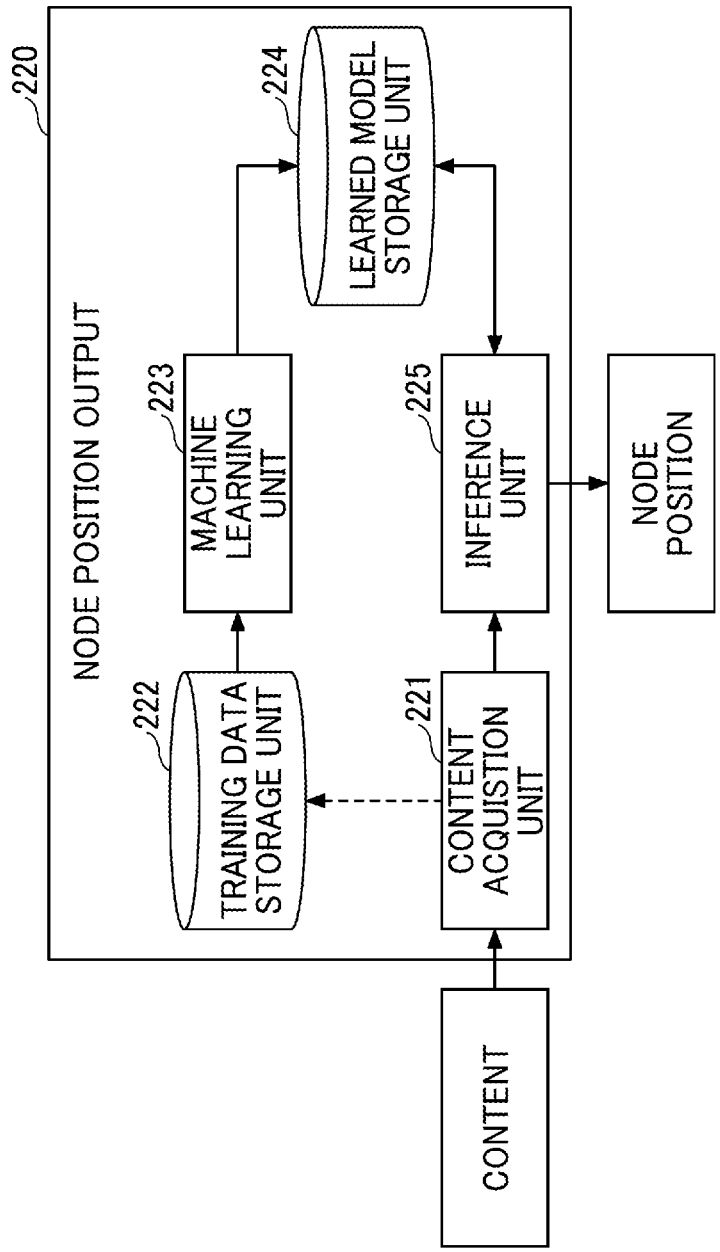
FIG. 22 is a block diagram illustrating a functional configuration of a node position output based on machine learning, according to an exemplary embodiment.

FIG. 22 is a block diagram illustrating a functional configuration of a node position output 220 based on machine learning, as described above. As illustrated in FIG. 22, the node position output 220 may include a content acquisition unit 221, a training data storage unit 222, a machine learning unit 223, a learned model storage unit 224, and an inference unit 225. Each of the functional units is described below.

The content acquisition unit 221 acquires the content, which has been moved from such as the language information displayed in the conversation log area 101, to the whiteboard work area 102, either automatically or in response to a user operation.

Learning Phase:

The training data storage unit 222 stores training data used for machine learning. The training data in the training data storage unit 222 includes content (input), a hierarchical structure, and a node position (output) in the hierarchical structure, which are acquired and accumulated by the content acquisition unit 221 for a certain period of time.

The machine learning unit 223 generates a learned model for deriving a node position to be output from the received content. Specifically, the machine learning unit 223 performs machine learning using training data, and generates a learned model. The training data is a set of received content data as input data, and a node position selected after the content is received as output data. The machine learning unit 223 further stores the generated learned model in the learned model storage unit 224.

The learned model storage unit 224 stores the learned model generated by the machine learning unit 223.

Inference Phase:

The inference unit 225 acquires the current content, and infers the node position where the content is placed. Specifically, the inference unit 225 acquires the content from the content acquisition unit 221. The inference unit 225 further inputs the content to the learned model in the learned model storage unit 224, and outputs the node position to be selected next.

In the learning phase described above, the machine learning unit 223 may acquire and learn user information such as a login ID of the user in addition to the content. In this case, the machine learning unit 223 can further learn the node position according to the user who has input the content.

If the terminal apparatus 1 includes the node position output 220, as a function of the hierarchization unit 20, the user of the terminal apparatus 1 can obtain, by selecting a particular content, a hierarchization result output based on learning of selection of the user. Further, a provider of the visual communication system 5 may previously perform learning, using the node position output 220, on input data by another particular user. The resultant learned model is provided to the user via the hierarchization unit 200, such that the user of the terminal apparatus 1 can obtain output of contents in hierarchy, which are appropriately generated based on the learning result that is previously prepared.

Figure 23:
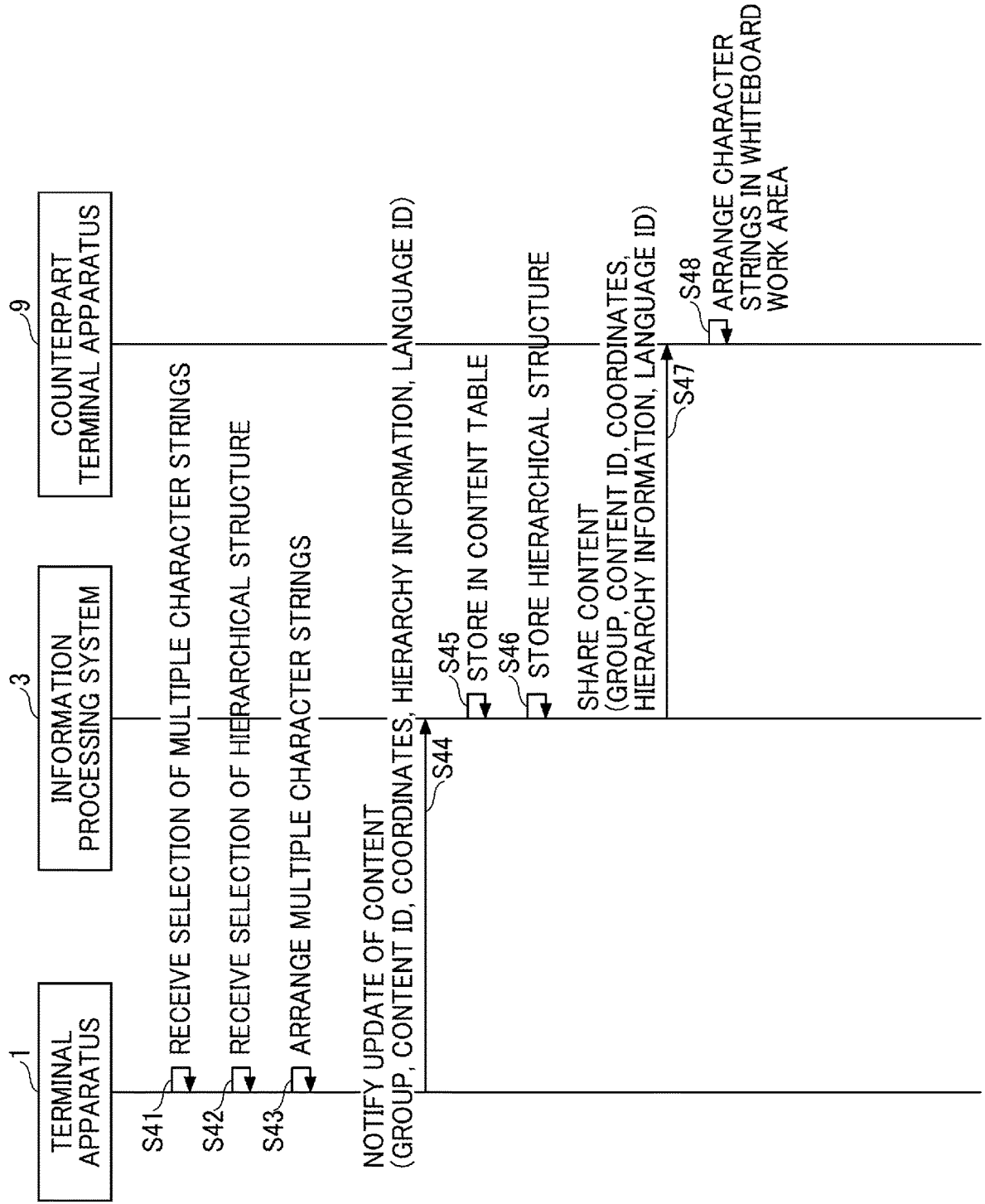
FIG. 23 is a sequence diagram illustrating hierarchization of language information in the whiteboard work area, performed by the terminal apparatus, in response to a user operation, according to an exemplary embodiment.

FIG. 23 is a sequence diagram illustrating hierarchization of language information in the whiteboard work area 102, performed by the terminal apparatus 1, in response to a user operation, according to the embodiment.

S41: When the user selects (groups) a plurality of contents 151 to 154 in the whiteboard work area 102, the operation input 18 receives the selection by the user.

S42: When the user presses the hierarchy button 159 and further selects a hierarchical structure, the operation input 18 receives the selection of hierarchical structure.

S43: The hierarchization unit 20 arranges the plurality of selected contents 151 to 154, for which the selection is received at S41, in hierarchy, in accordance with the hierarchical structure selected at S42. Accordingly, information regarding the hierarchization ("hierarchy information") is generated. The hierarchy information indicates how each content is hierarchized. In the example of FIG. 21C, the hierarchy information includes the following.

Vertex Node "Ice Breaker", Child Nodes of the Vertex Node "Self-Introduction", "Word Chain", "Yamanote-Line Game"

A case where the number of layers is three or more can be expressed in the same manner. Each content in the hierarchy information is actually represented by the content ID of each of the contents 151 to 154.

S44: The update notifying unit 19 detects a change in the status of the whiteboard work area 102. The update notifying unit 19 transmits a content update notification (grouping, content ID, coordinates, size, font size, hierarchy information, and language information ID) to the information processing system 3 via the first communication unit 11. Some information, such as size and font size, does not have to be provided. In this example, the grouping means information indicating that a plurality of contents, specified by the content IDs, are grouped.

S45: The second communication unit 31 of the information processing system 3 receives the content update notification. The content manager 34 stores, for each content, the coordinates of the content specified by the content ID in the content table.

S46: The content manager 34 stores the hierarchical structure, so that the state in which the contents are made in hierarchy is stored. The content manager 34 may set an ID to the hierarchy information.

S47: As a change has occurred in the content table, the content manager 34 transmits a request for sharing content (grouping, content ID, coordinates, hierarchy information, and language information ID) to the counterpart terminal apparatus 9 participating in the same meeting.

S48: The first communication unit 11 of the counterpart terminal apparatus 9 receives the request for sharing content. The second display control unit 17 arranges the plurality of character strings each identified with the content ID in hierarchy based on the hierarchy information, and displays the character strings at the positions each specified by the coordinates.

Reference to Conversation Log Area by Content of Whiteboard Work Area

Figure 24A:
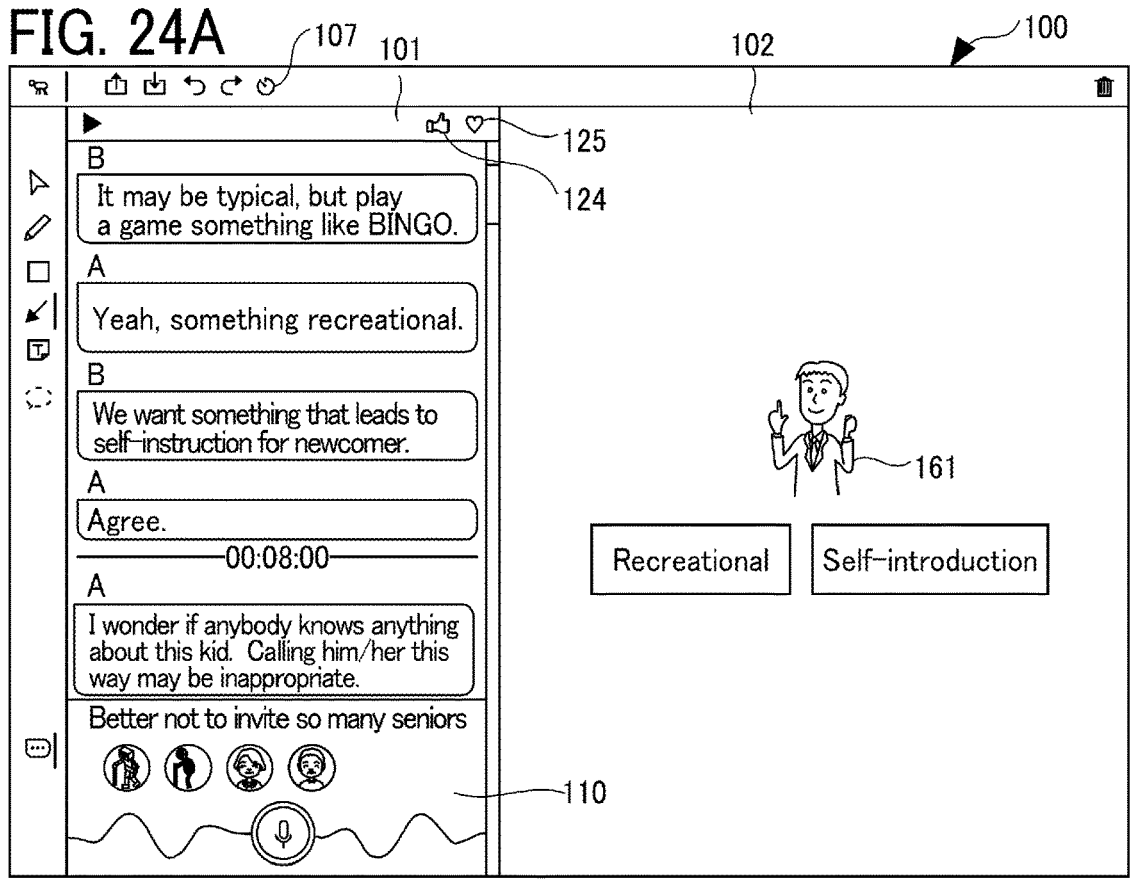
FIGS. 24A to 24C illustrate the language information in the conversation log area, which is highlighted when the content in the whiteboard work area is selected, according to an exemplary embodiment.
Figure 24B:
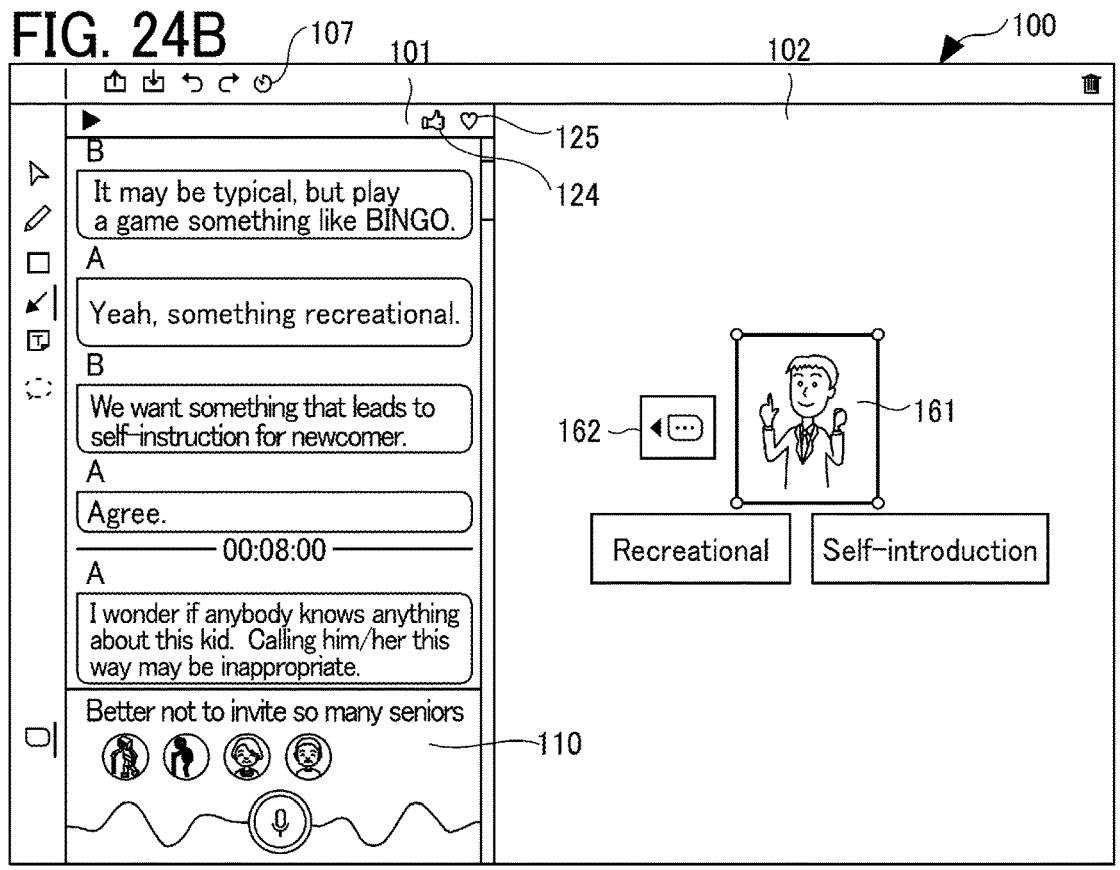
Figure 24C:
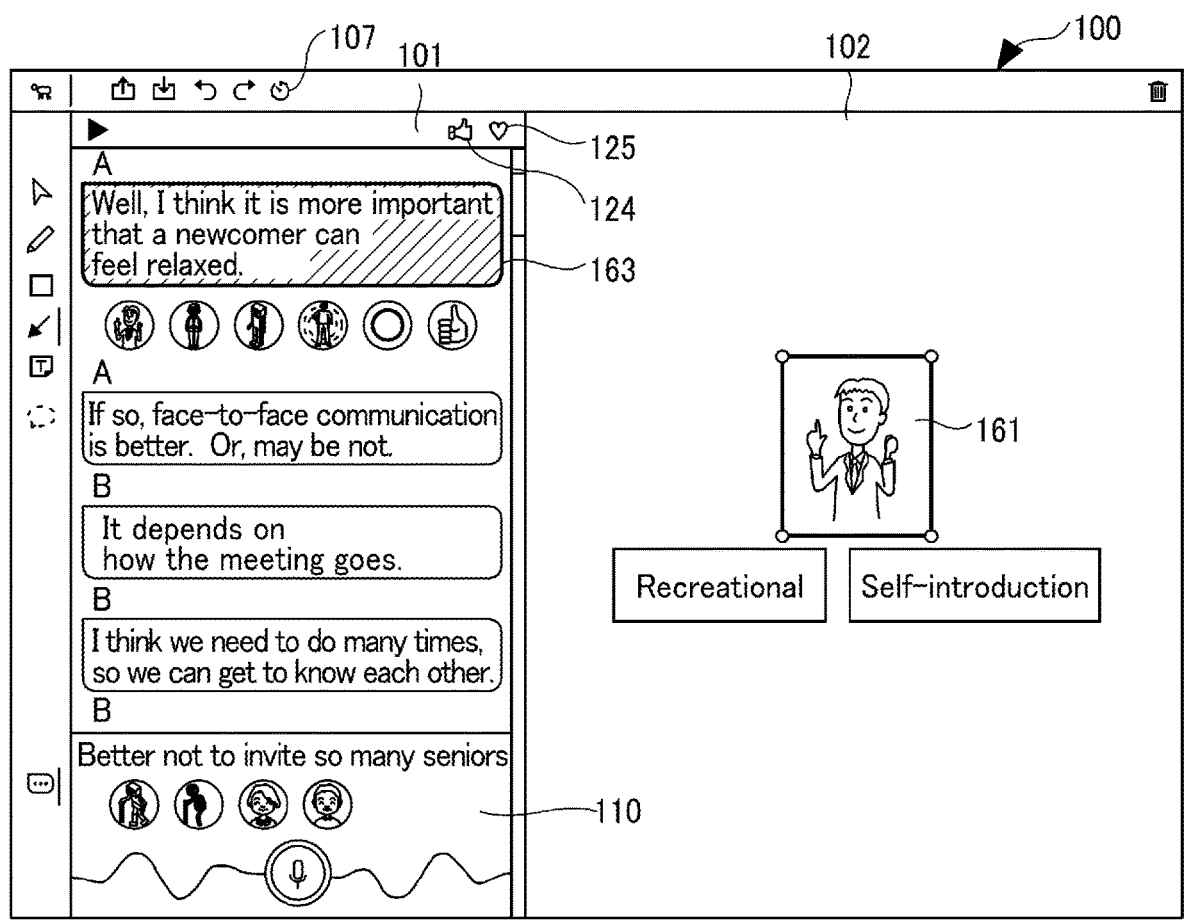

Next, referring to FIGS. 24A to 24C, processing of referring to the conversation log area 101 by the contents of the whiteboard work area 102 is described according to the embodiment. FIGS. 24A to 24C illustrate the language information in the conversation log area 101, which is highlighted when the content in the whiteboard work area 102 is selected.

As the discussion progresses, it would be helpful to review at which scene during the meeting each content in the whiteboard work area 102 was generated. The first display control unit 16 displays the language information associated with the content selected in the whiteboard work area 102, with emphasis in the conversation log area 101.

First, as illustrated in FIG. 24A, the user selects a particular content in the whiteboard work area 102. In this example, it is assumed that the user selects (taps or clicks) the illustration 161. Accordingly, as illustrated in FIG. 24B, the second display control unit 17 displays a related information check icon 162 near the illustration 161. The user presses the related information check icon 162. Accordingly, as illustrated in FIG. 24C, the first display control unit 16 displays the language information 163 having the language information ID of the selected illustration 161 in the conversation log area 101 with emphasis. If the language information 163 is scrolled out, the first display control unit 16 scrolls back to display the language information 163 in the vicinity of the center of the conversation log area 101 with emphasis.

The selected illustration 161 may not have a language information ID, if the user directly inputs the illustration 161 to the whiteboard work area 102. In such case, the first display control unit 16 displays the language information with emphasis, which has been input at the date and time closest to the time when the selected illustration 161 is input (or at the date and time during a certain period of time from the date and time when the selected illustration 161 is input).

In this example, displaying with emphasis means to display the characters in bold font, display the characters in different color, or scrolling a display area to make the corresponding characters visible.

Figure 25:
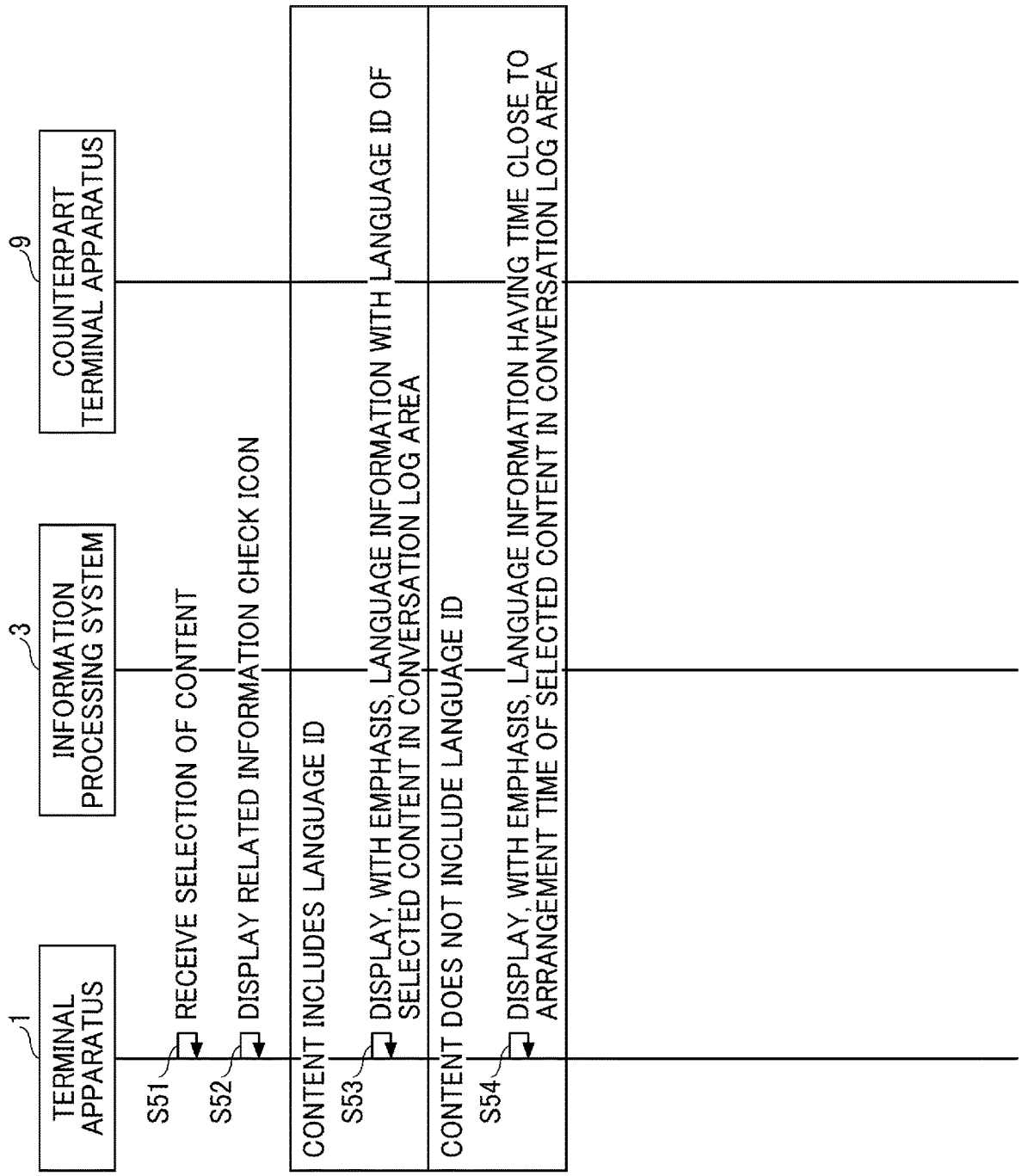
FIG. 25 is a sequence diagram illustrating processing of displaying the language information corresponding to the content in the whiteboard work area, with emphasis, performed by the terminal apparatus, in response to a user operation, according to an exemplary embodiment.

FIG. 25 is a sequence diagram illustrating processing of displaying the language information corresponding to the content in the whiteboard work area 102, with emphasis, performed by the terminal apparatus 1, in response to a user operation, in the example referring to FIGS. 24A to 24C.

S51: As the user selects the content (illustration 161) in the whiteboard work area 102, the operation input 18 receives the selection by the user.

S52: The second display control unit 17 displays the related information check icon 162 for the selected illustration 161.

S53: When the illustration 161 selected in the content table has the language information ID, the first display control unit 16 displays the language information 163 identified with the language information ID of the selected illustration 161, in the conversation log area 101, with emphasis.

S54: When the illustration 161 selected in the content table does not have the language information ID, the first display control unit 16 displays the language information associated with an input time, which is close to the time when the selected illustration 161 is input and displayed, in the conversation log area 101, with emphasis. The time that is close to the time when the selected content is input and displayed, may be an input time within a predetermined period of time from a time immediately before the time when the selected content is input and displayed. This is because the content derived from the language information in the conversation log area 101 is arranged in the whiteboard work area 102 only after the language information from which the content is derived is displayed. The predetermined period of time from the time immediately before the time when the selected content is input and displayed may be approximated as a time, at the maximum, from the time when one piece of language information is displayed to the time when such language information is scrolled out. For example, such predetermined period of time may be set to about ½ to ¼ of such maximum value.

In this example of displaying the language information with emphasis, the status of the conversation log area 101 is not shared with the counterpart terminal apparatus 9. If the status of the conversation log area 101 is shared, the language information may scroll, against the intension of the user viewing the conversation log area 101 at the counterpart terminal apparatus 9. Under some cases where a plurality of users are to review the meeting together, the status of the conversation log area 101 may be shared with the counterpart terminal apparatus 9 according to the settings by the user. That is, whether to share the status of the conversation log area 101 with emphasis, may be determined according to the user preference, or a preset condition.

Filtering Language Information in Conversation Log Area

The number of pieces of language information in the conversation log area 101 increases as the discussion progresses, and it becomes difficult to review. Therefore, the first display control unit 16 has a function of filtering the language information of the conversation log area 101. Examples of filtering method are as follows.

One method selects language information using a user name (or user ID) of a particular user, so that language information is selected based on a speaker who gives the language information.

Another method selects language information in the conversion log area 101, having a number of times of likes being pressed, which exceeds a certain number. Another method selects language information, which is registered in a preferred language table that stores language information preferred by a particular user. Another method selects language information, based on input time (utterance time) of the language information to the conversation log area 101.

Further, at the time of filtering, it is also effective that the second display control unit 17 limits the content to be displayed in the whiteboard work area 102 to only the content derived from the content in the conversation log area 101 having been selected as described above. The second display control unit 17 displays only the content associated with the language information ID of the filtered language information, and does not display the other content.

Alternatively, the second display control unit 17 may cause the content, which is not associated with the language information ID of the filtered language information, to be hardly recognizable, for example, by lowering saturation or transmittance of such content.

Figure 26:
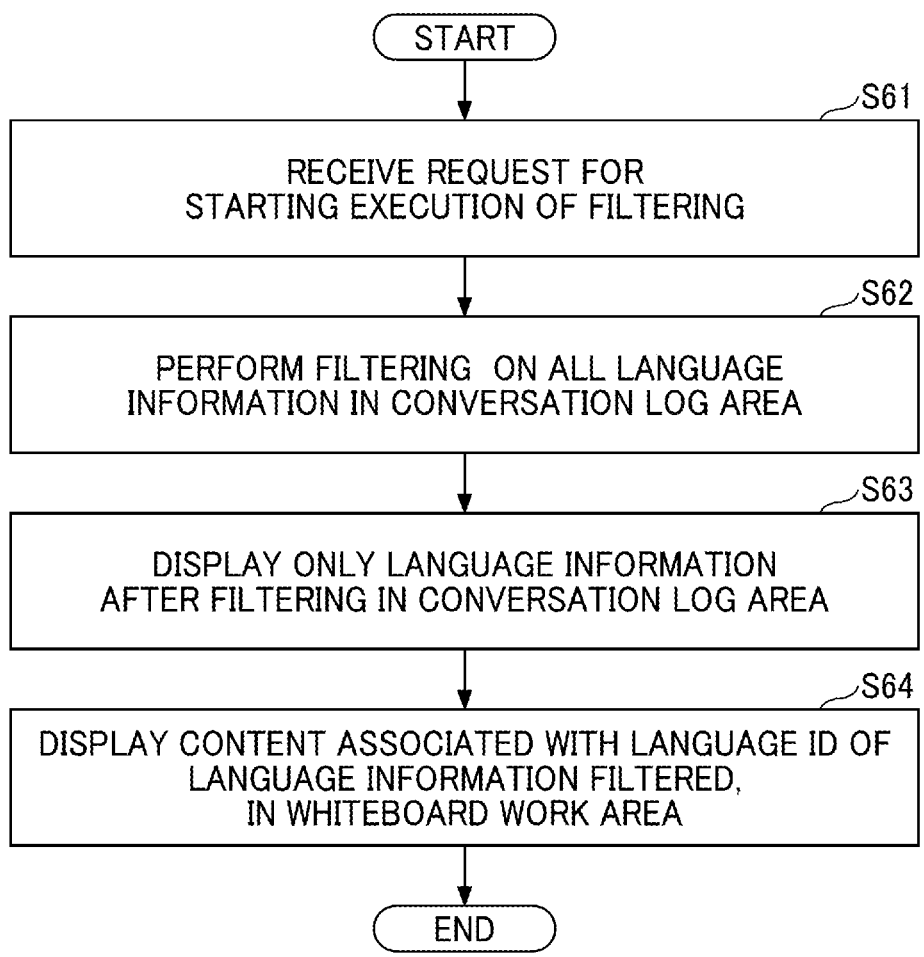
FIG. 26 is a flowchart illustrating processing of filtering language information in the conversation log area, performed by the terminal apparatus, according to an exemplary embodiment.

FIG. 26 is a flowchart illustrating processing of filtering language information in the conversation log area 101, performed by the terminal apparatus 1, according to the embodiment.

First, the operation input 18 of the terminal apparatus 1 receives a request for starting execution of filtering (S61). For example, the information display screen 100 may display, therein, a button for executing filtering. The operation input 18 also receives selection of a filtering method, for example, by a radio button or the like.

The filtering unit 23 performs filtering on all language information in the conversation log area 101 (S62).

The first display control unit 16 displays only the language information to which the filtering is applied, in the conversation log area 101 (S63). Language information that cannot be displayed in the conversation log area 101 can be displayed by scrolling.

The second display control unit 17 displays only the content associated with the language information ID of the filtered language information in the whiteboard work area 102 (S64).

In this way, even if the number of pieces of language information in the conversation log area 101 increases as the discussion progresses, the user can easily review the language information.

Translation of Language in Conversation Log Area

If the information processing system 3 translates the language information displayed in the conversation log area 101, communication can be facilitated between users who use different languages. For example, when participating in the meeting, the user configures his or her language to be used at the terminal apparatus 1, to cause the terminal apparatus 1 to transmit the configured language to the information processing system 3. As described above, the user may explicitly select the language. Alternatively, an application running on the terminal apparatus 1 may read the configured language of the terminal apparatus 1 (for example, the language set at an operating system).

When the user speaks in the meeting, the language information converted from the speech data is shared with the counterpart terminal apparatus 9. When the language used on the transmission side is different from the language used on the reception side, the translation unit 35 of the information processing system 3 translates the language information into a language that matches the language used by each user. The translation may be performed by the counterpart terminal apparatus 9 that receives the language information.

Figure 27:
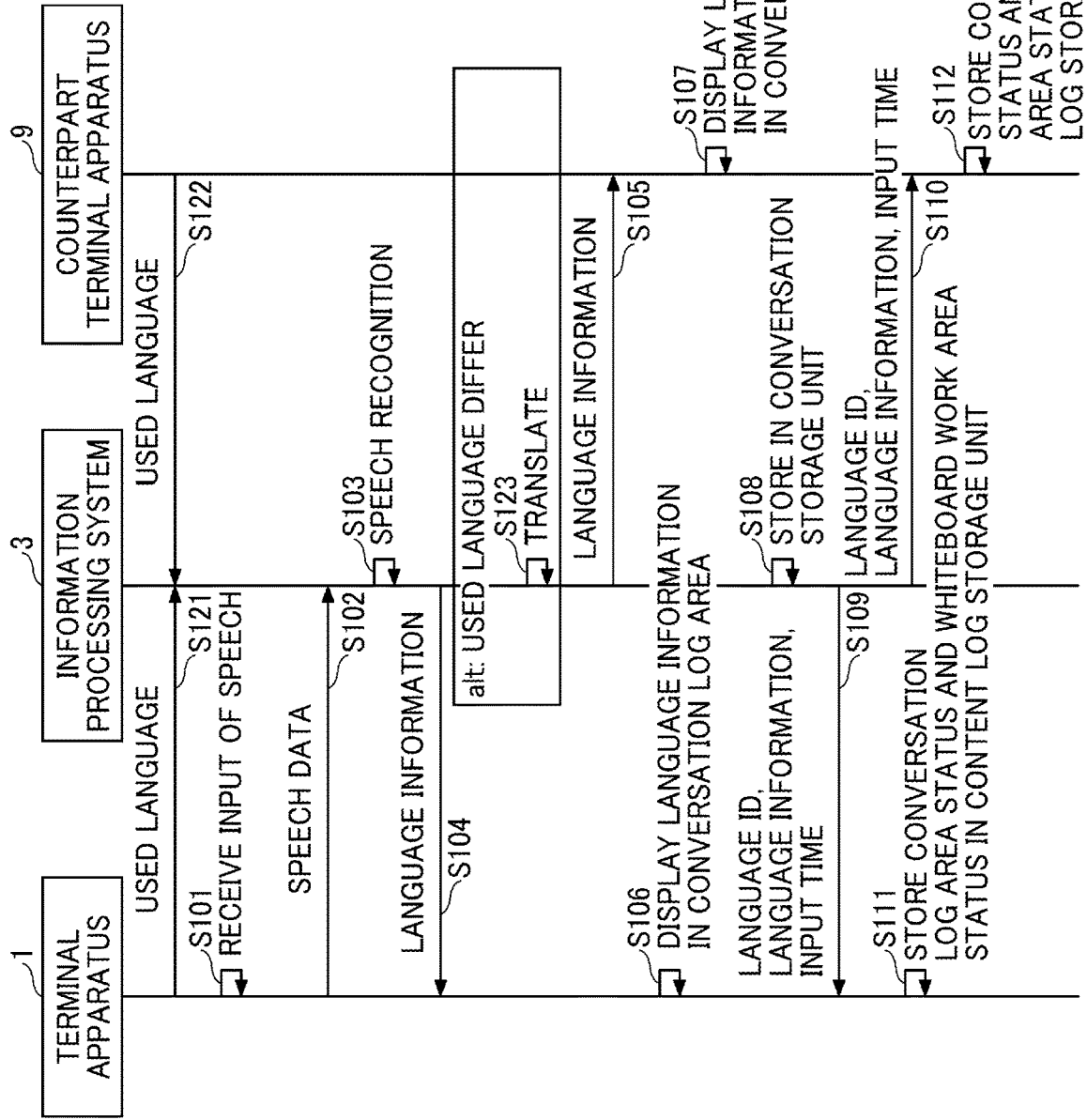
FIG. 27 is a sequence diagram illustrating processing of translating language information, and transmitting the translated language information to the counterpart terminal apparatus, performed by the information processing system, according to an exemplary embodiment.

FIG. 27 is a sequence diagram illustrating processing of translating language information, and transmitting the translated language information to the counterpart terminal apparatus 9, performed by the information processing system 3, according to the embodiment. In the following description of FIG. 27, differences from the processing of FIG. 12 are mainly described.

In FIG. 27, at steps S121 and S122, the terminal apparatus 1 and the counterpart terminal apparatus 9 each transmit the used language. At S123, the translation unit 35 determines whether or not the language used by the terminal apparatus 1 is different from the language used by the counterpart terminal apparatus 9. When the used languages are different, the translation unit 35 translates the language information from the used language of the terminal apparatus 1 to the used language of the counterpart terminal apparatus 9, and vice versa.

In this way, each user participating in the meeting can have the language information in his or her own language.

Playback of Discussions in Meeting

It would be convenient if the user can review the entire meeting at any desired time, such as at a break in the meeting or after the end of the meeting. When the user plays back the meeting for review, the terminal apparatus 1 displays, in the whiteboard work area 102, the content corresponding to the language information in the conversation log area 101 that transitions by the scrolling. The scrolling may be automatically performed or may be performed according to the user operation. As a result, the user can check a flow of discussions, or under which situations, each content is arranged in the whiteboard work area 102, only by scrolling the conversation log area 101 in chronological order from the beginning.

Figure 28A:
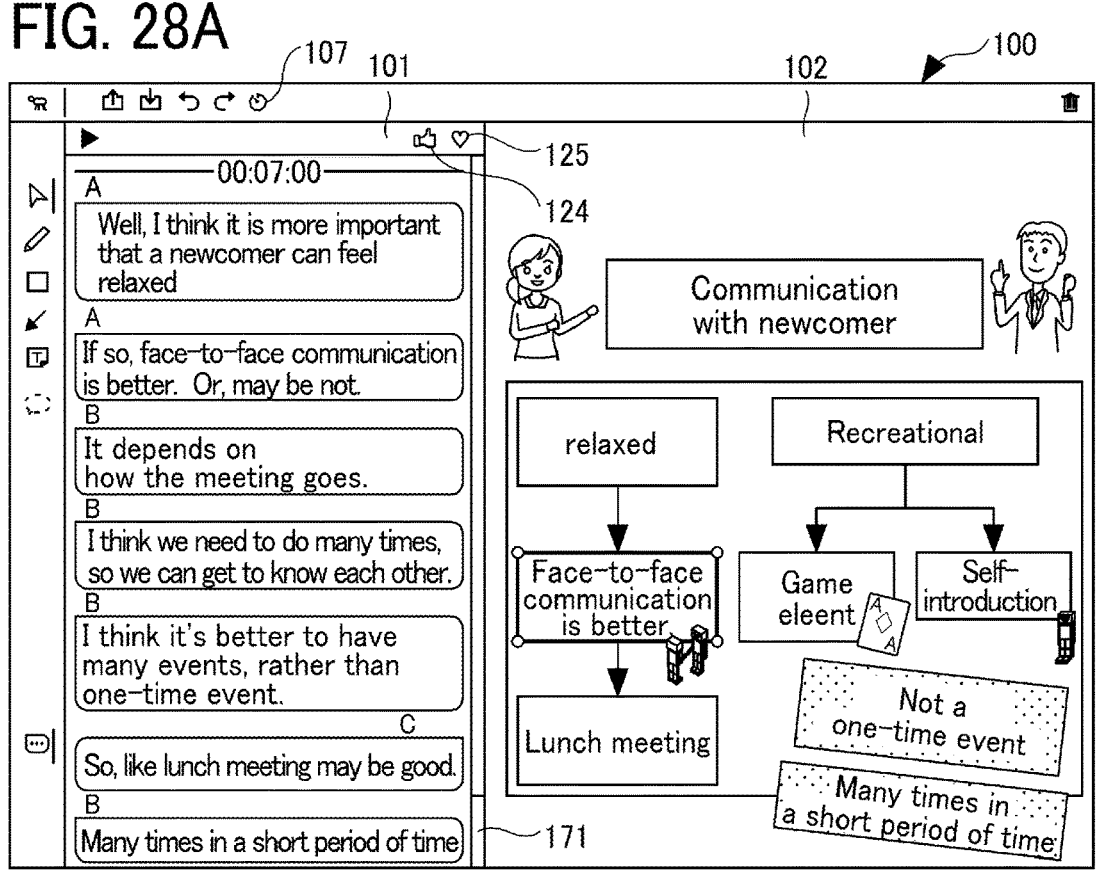
FIGS. 28A to 28C are diagrams for explaining processing to review the discussions in the meeting (meeting contents), when the discussion in the meeting are reproduced according to user operation, according to an exemplary embodiment.

In order to start reviewing, the user presses a review button 107 to execute a review mode, as illustrated in FIG. 28A. Alternatively, the mode may be automatically switched to a review mode when the user participates again in the meeting that has ended after the end of the meeting. For example, the user may access a link to the online meeting, after the meeting ends.

Figure 28B:
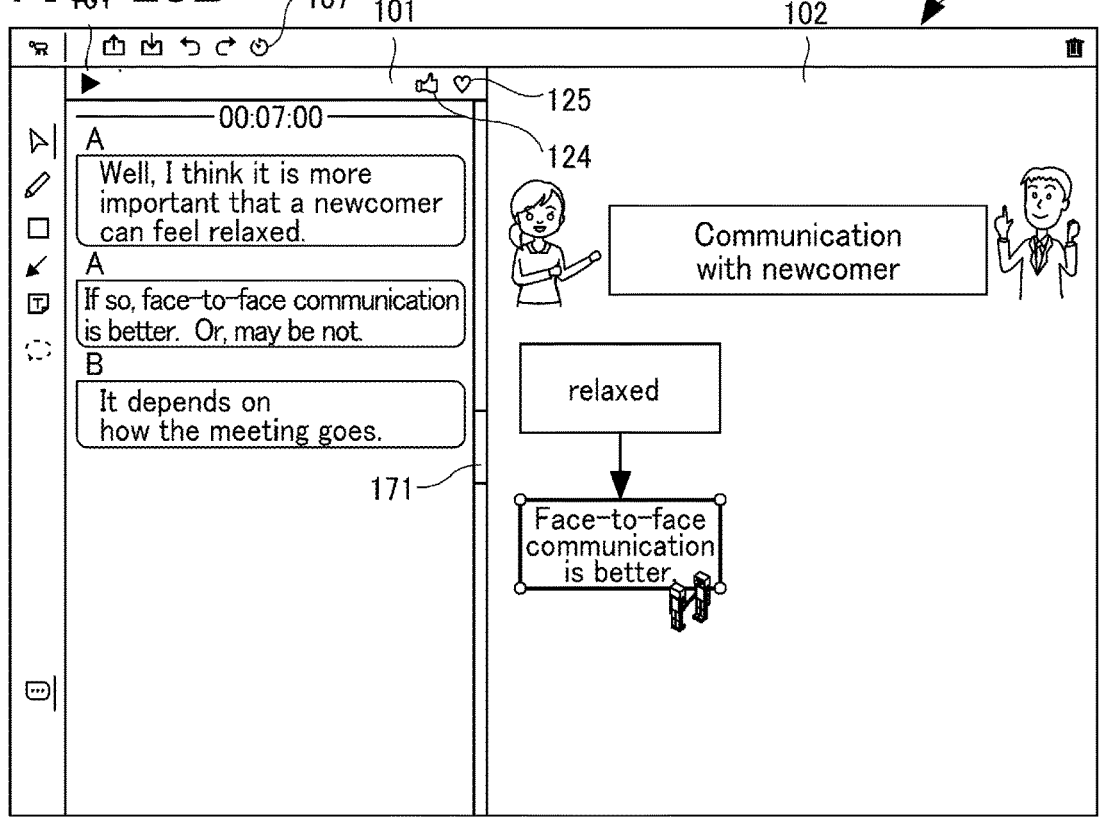
Figure 28C:
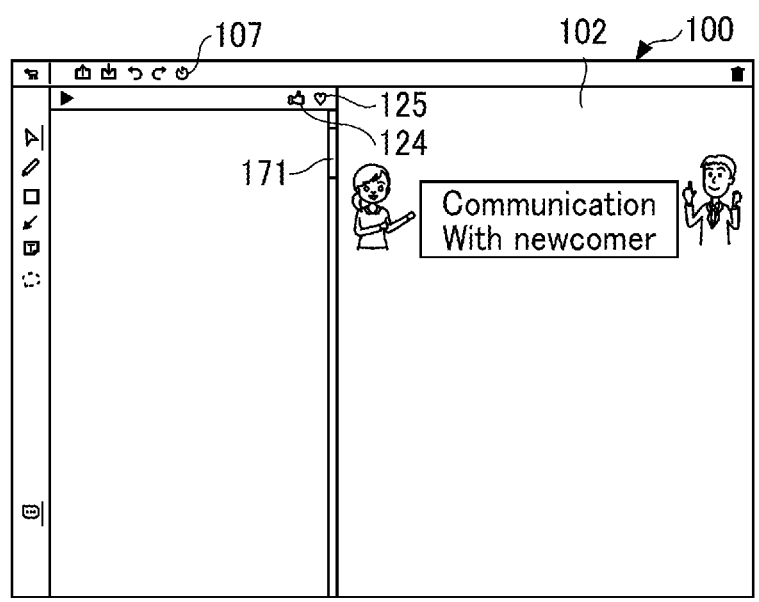

FIGS. 28A to 28C are diagrams for explaining processing to review the discussions (content) in the meeting, when the discussion in the meeting are reproduced according to user operation. FIG. 28A illustrates the information display screen 100 before the review button 107 is pressed.

In other words, FIG. 28A illustrates the information display screen 100, which reflects the end of the meeting. Pressing of the review button 107 initiates the review mode. The user can scroll the language information in the conversation log area 101 upward by operating a scroll bar 171. The playback unit 22 specifies, in the content display chorological table, the status of the conversation log area, which is determined by scroll of the user. The playback unit 22 then playbacks the status of the whiteboard work area, which corresponds to the status of the conversation log area, in the whiteboard work area. In this example, the reproduction means displaying the content of the status of the whiteboard work area.

In FIG. 28B, the user has scrolled the language information in the conversation log area 101 upward (in a direction going back in time). Therefore, the content in a state in which the time goes back from the time when the review button 107 is pressed, is displayed in the whiteboard work area 102. In FIG. 28C, the user further scrolls the language information in the conversation log area 101 upward (in the direction going back in time). Accordingly, the content in a status in which the time goes back far from the status illustrated in FIG. 28B is displayed in the whiteboard work area 102.

Figure 29A:
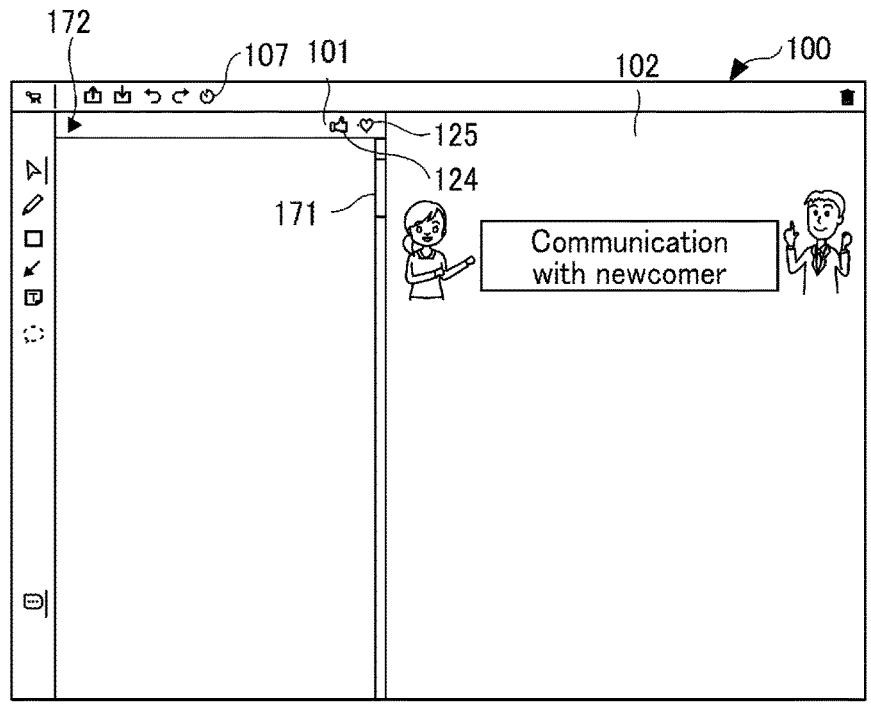
FIGS. 29A and 29B are diagrams for explaining processing to review the discussions in the meeting (meeting contents) when the discussions (meeting contents) in the meeting are automatically reproduced, according to an exemplary embodiment.
Figure 29B:
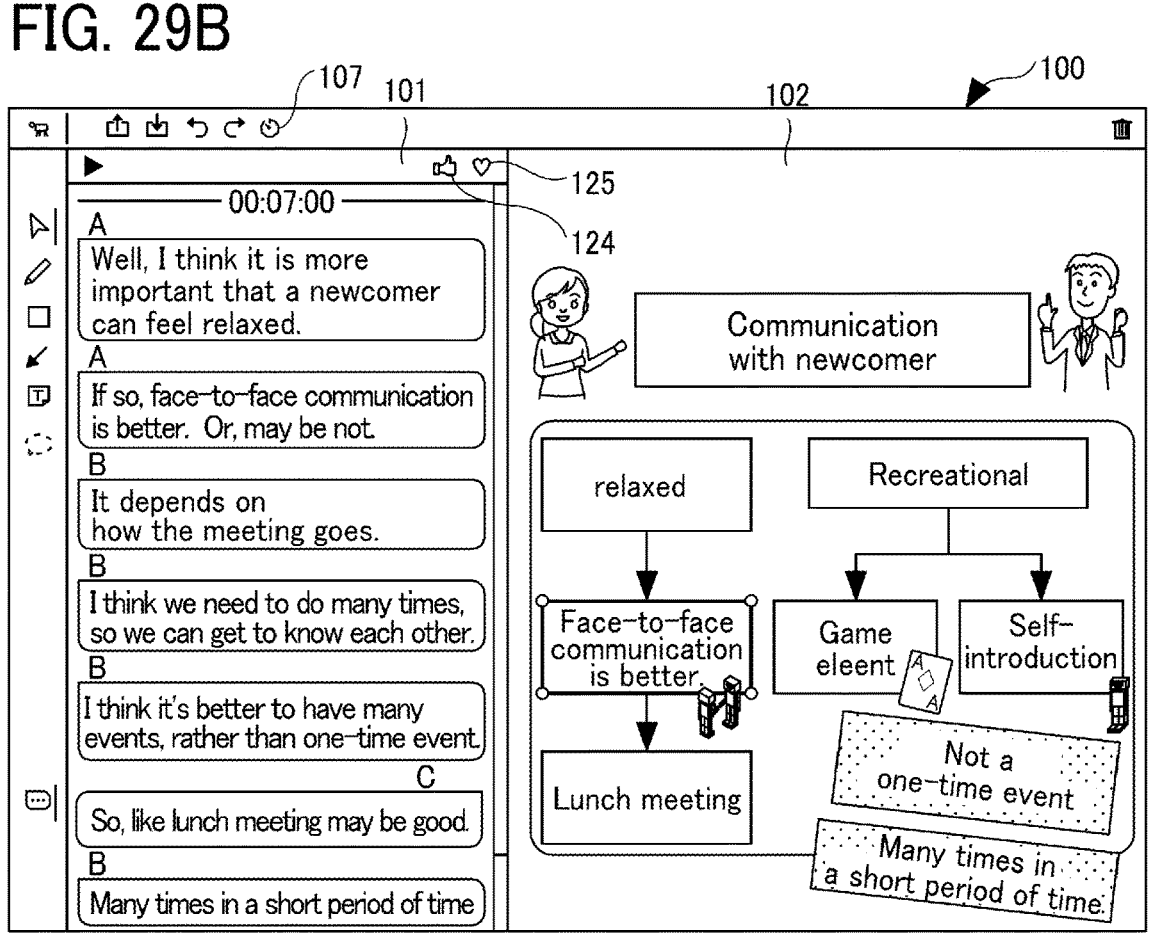

FIGS. 29A and 29B are diagrams for explaining processing to review the discussions (contents) in the meeting when the discussions (contents) in the meeting are automatically reproduced. When the user presses the review button 107, the terminal apparatus 1 displays an automatic playback button 172 on the information display screen 100. As illustrated in FIG. 29A, the conversation log area 101 displays language information at a predetermined timing, among language information displayed in chronological order. The predetermined timing may be the timing reflecting the oldest status, or the timing when the meeting starts for that day. If the predetermined timing reflects a start of the meeting, no language information is displayed. The same applies to the whiteboard work area 102. In the whiteboard work area 102, even if no language information is displayed in the conversation log area 101, content may be displayed. The user can review changes in the conversation log area 101 and the whiteboard work area 102 in chronological order, from a predetermined timing as illustrated in FIG. 29A.

When the automatic playback button 172 is pressed, the playback unit 22 moves the scroll bar 171 downward at a constant speed. Accordingly, as illustrated in FIG. 29B, the language information displayed in the conversation log area 101 changes. In operation, the playback unit 22 specifies the status of the conversation log area 101 in the content log table, and playbacks the status of the whiteboard work area 102 corresponding to the status of the conversation log area 101 in the whiteboard work area 102.

In FIGS. 28A to 28C and 29A to 29B, the content in the whiteboard work area is reproduced so as to correspond to scroll of the scroll bar 171. Alternatively, a slider bar independent of the scroll bar 171 may be displayed, which controls the content to be reproduced.

Figure 30:
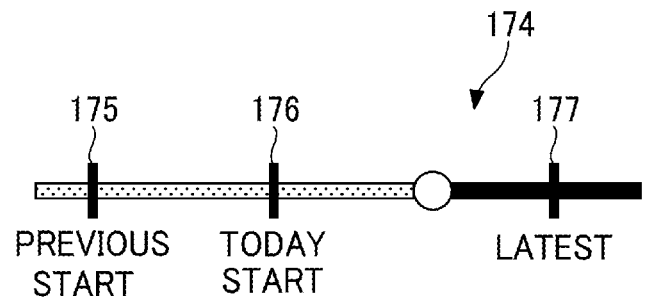
FIG. 30 is an illustration of an example slider bar.

FIG. 30 illustrates an example of a slider bar 174. The slider bar 174 is displayed, for example, at a lower portion of the whiteboard work area 102 in response to pressing of the review button 107. The slider bar 174 displays various points each indicating a specific timing, such as a previous start point 175, a today start point 176, and a latest point 177. When the user presses the today start point 176, the playback unit 22 playbacks the first status of the conversation log area 101 and the first status of the whiteboard work area 102, stored in the content log storage unit 1001. When the user presses the latest point 177, the playback unit 22 playbacks the last status of the conversation log area 101 and the last status of the whiteboard work area 102, stored in the content log storage unit 1001. When the user presses the previous start point 175, the playback unit 22 playbacks the status of the conversation log area 101 and the status of the whiteboard work area 102, both at the start of the previous meeting in the meeting management table.

Figure 31:
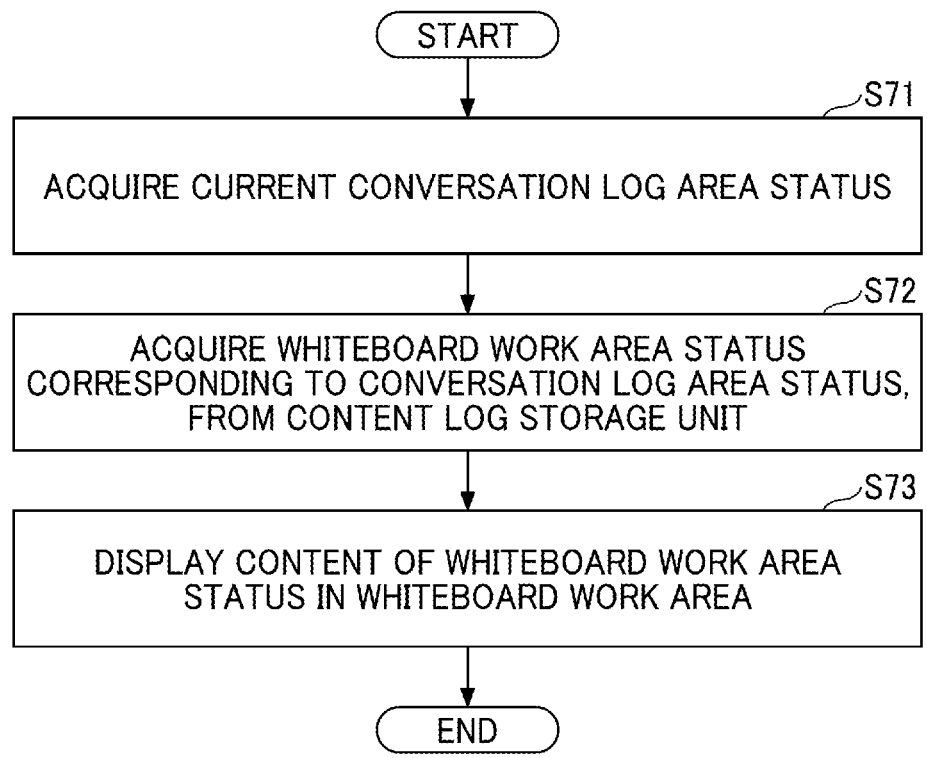
FIG. 31 is a flowchart illustrating processing of playing back the whiteboard work area, performed by the playback unit, when executing the review mode, according to an exemplary embodiment.

FIG. 31 is a flowchart illustrating processing of playing back the whiteboard work area, performed by the playback unit 22, when executing the review mode, according to the embodiment. The processing of FIG. 31 starts in response to pressing of the review button 107. The user may scroll the scroll bar 171 or press the automatic playback button 172.

The playback unit 22 acquires the current status of the conversation log area 101 (S71).

The playback unit 22 acquires the status of the whiteboard work area 102 corresponding to the status of the conversation log area 101 acquired at S71, from the content log storage unit 1001 (S72).

The playback unit 22 displays the content of the status of whiteboard work area 102, which is acquired, in the whiteboard work area (S73).

During execution of the review mode, the playback unit 22 repeatedly executes steps S71 to S73.

As described above, the visual communication system 5 of the present embodiment is able to display visual information such as an illustration in the whiteboard work area 102 based on language information converted from speech. The user can easily visualize the communication during the meeting, as the illustration is automatically displayed. That is, the user does not have to convert the content of conversation (speech content) into an illustration, draw the illustration in the whiteboard work area 102, or acquire the illustration from a network. Since the whiteboard work area 102 and the conversation log area 101 are displayed on the same screen, the user is able to instantly know a flow of communication in which each content in the whiteboard work area 102 is produced.

Other Application Examples

The above-described embodiments are illustrative and do not limit the present disclosure. Thus, numerous additional modifications and variations are possible in light of the above teachings within the scope of the present disclosure. Any one of the above-described operations may be performed in various other ways, for example, in an order different from the one described above.

In the above-described embodiment, the information display screen 100 is displayed on the display 506, however, the information display screen 100 may be displayed by a projector. In such case, the visual communication system 5 detects the coordinates of the pen tip for hand-drafting by ultrasonic waves. The pen emits an ultrasonic wave in addition to the light, and the terminal apparatus 1 calculates a distance based on an arrival time of the sound wave. The terminal apparatus 1 determines the position of the pen based on the direction and the distance, and a projector draws (projects) the trajectory of the pen based on stroke data.

The number of terminal apparatus 1 may be one. In this case, the user can use the terminal apparatus 1 as a tool for summarizing or recording his or her own idea, not during the meeting.

In the block diagram such as FIG. 4, functional units are divided into blocks in accordance with main functions of the terminal apparatus 1 and the information processing system 3, in order to facilitate understanding the operation by the terminal apparatus 1 and the information processing system 3. No limitation to a scope of the present disclosure is intended by how the processes are divided or by the name of the processes. The processes implemented by the terminal apparatus 1 and the information processing system 3 may be divided to a larger number of processes depending on the contents of processes. Alternatively, one unit of processing may be a group of divided processing.

The apparatuses or devices described in one or more embodiments are just one example of plural computing environments that implement the one or more embodiments disclosed herein. In some embodiments, the information processing system 3 includes multiple computing devices, such as a server cluster. The multiple computing devices are configured to communicate with one another through any type of communication link, including a network, a shared memory, etc., and perform processes disclosed herein.

Further, the information processing system 3 can be configured to share the processing steps disclosed in the embodiments described above, for example, the processing steps illustrated in FIG. 12, in various combinations. For example, a process executed by a predetermined unit may be executed by a plurality of information processing apparatuses included in the information processing system 3. The information processing system 3 may be integrated into one server device or may be divided into a plurality of devices.

Each of the functions of the described embodiments may be implemented by one or more processing circuits or circuitry. Here, the "processing circuit" in the present specification includes a processor programmed to execute each function by software such as a processor implemented by an electronic circuit, and a device such as an application specific integrated circuit (ASIC), a digital signal processor (DSP), a field programmable gate array (FPGA), or a conventional circuit module designed to execute each function described above.

The tables according to the above-described embodiments may be generated by machine learning.

In the present disclosure, the machine learning is defined as a technology that makes a computer to acquire human-like learning ability. In addition, the machine learning refers to a technology in which a computer autonomously generates an algorithm required for determination such as data identification from learning data loaded in advance and applies the generated algorithm to new data to make a prediction. Any suitable learning method is applied for machine learning, for example, any one of supervised learning, unsupervised learning, semi-supervised learning, reinforcement learning, and deep learning, or a combination of two or more those learning.

Further, in any one of the above-described embodiments, the language information is displayed in the conversion log area 101, and the content based on the language information is displayed in the whiteboard work area 102. In one or more other examples, the language information and the content based on the language information may be displayed differently, as long as the language information and the content based on the language information are displayed in different coordinate positions on the information display screen 100.

Further, the present disclosure describes the case where a plurality of items of language information is displayed. However, even when there is only one language information being displayed in the conversion log area 101, the user may select such language information for displayed in whiteboard work area 102. Similarly, the user may select all items of language information, displayed in the conversion log area 101, for display in the whiteboard work area 102.

Further, as described above, while the speech data is input based on utterances of the users at a plurality of terminal apparatuses participating in the conference, there may a case where only one user at the terminal apparatus may be speaking. In such case, the speech data based on utterances of the user who is speaking is input for display, at least during a time when the user is speaking.

Aspect 1

According to an exemplary embodiment, a communication system includes an information processing system that communicates with a terminal apparatus and another terminal apparatus via a network. The communication system includes: a converter that converts speech data based on speech input to each of the terminal apparatus and the other terminal apparatus into language information; and a first display control unit that displays the language information on an information display screen of the terminal apparatus in a chronological order; a second display control unit that displays, on the information display screen, content based on a user operation on the language information displayed on the information display screen; and a content manager that transmits the content displayed on the information display screen to the other terminal apparatus.

Aspect 2

The communication system according to Aspect 1 further includes an operation input unit that receives selection of the language information displayed in a first area of the information display screen. The second display control unit displays the content based on the language information for which the selection is received at the operation input unit, in a second area of the information display screen.

Aspect 3

In the communication system according to Aspect 2, the operation input unit receives an operation that instructs to display, in the second area, a part of or the entire language information displayed in the first area.

Aspect 4

In the communication system according to Aspect 3, the operation that instructs to display includes an operation of dragging and dropping the part of or the entire language information to a desired location in the second area, or an operation of clicking the part of or the entire language information.

Aspect 5

The communication system according to Aspect 2, further includes a searching unit that searches for an image using a character string included in the language information displayed in the first area for which the selection is received at the operation input unit. The first display control unit displays the image searched by the searching unit, in vicinity of the language information for which the selection is received at the operation input unit. The operation input unit receives an operation that instructs to display the displayed image in the second area.

Aspect 6

In the communication system according to Aspect 5, the operation that instructs to display includes an operation of dragging and dropping the image that is searched and displayed to a desired location in the second area, or an operation of clicking the image that is displayed in the first area.

Aspect 7

The communication system according to Aspect 3 further includes a searching unit that searches for an image using a character string included in the language information displayed in the second area. The second display control unit displays the image searched by the searching unit in vicinity of the language information displayed in the second area, and displays the image selected from the displayed image in the second area.

Aspect 8

In the communication system according to any one of Aspects 5 to 7, the images displayed in vicinity of the language information are arranged in an order of appearance of the character strings respectively associated with the displayed images.

Aspect 9

In the communication system according to Aspect 3, the second display control unit decomposes the language information displayed in the second area into a plurality of character strings, and arranges the plurality of character strings as separate contents, in response to a user operation. In this example, the part of or the entire language information that is selected may be decomposed.

Aspect 10

The communication system according to Aspect 6 further includes a hierarchization unit that hierarchizes the plurality of character strings arranged as separate contents, according to a specified hierarchical structure. The second display control unit displays the plurality of character strings, while connecting the plurality of character strings with a line, according to the specified hierarchical structure.

Aspect 11

The communication system according to Aspect 6 further includes a machine learning unit that generates a learned model, which converts the plurality of character strings arranged as separate contents according to the hierarchical structure.

The second display control unit displays the plurality of the character strings in the hierarchical structure, converted by the learned model.

Aspect 12

In the communication system according to Aspect 1, the contents arranged in the second area of the information display screen are associated with identification information of the language information, displayed in the first area of the information display screen.

When the operation input unit receives a selection of a particular content in the second area, the first display control unit highlights particular language information in the first area associated with identification information of the particular content for which the selection is received.

Aspect 13

In the communication system according to Aspect 8, when the identification information of the language information is not associated with the particular content in the second area, for which the selection is received by the operation input unit, the first display control unit displays, with emphasis, the language information in the first area having an input time within a predetermined period of time from a time when the selected content is arranged.

Aspect 14

The communication system according to any one of Aspects 1 to 8, further includes a filtering unit that selects the language information to be displayed in the first area of the information display screen, such that the number of language information displayed in the first area is reduced.

The first display control unit displays only the language information that is selected by the filtering unit in the first area.

Aspect 15

In the communication system according to Aspect 14, the filtering unit selects the language information displayed in the first area using information on a speaker of the language information displayed in the first area, the number of favorable responses to the language information displayed in the first area, the language information stored by a user as preferable language information, or an input time of the language information to the first area.

Aspect 16

In the communication system according to Aspect 15, the contents arranged in the second area of the information display screen based on the language information displayed in the first area are associated with identification information of the language information.

When the first display control unit displays only the language information selected by the filtering unit in the first area, the second display control unit arranges only the contents associated with the identification information of the language information displayed in the first area in the second area.

Aspect 17

In the communication system according to any one of Aspects 1 to 12, the language information displayed in the first area of the information display screen are shared between a plurality of terminal apparatuses including the terminal apparatus.

The communication system further includes a translation unit that translates the language information converted by the converter into a language set for the other terminal apparatus, when the language of the language information converted by the converter is different from the language set for the other terminal apparatus.

Aspect 18

The communication system according to any one of Aspects 1 to 13, includes: a log storage processor that stores a status of the first area of the information display screen, and a status of the second area of the information display screen, in association with each other in chorological order; and a playback unit that playbacks the status of the second area associated with the status of the first area.

Aspect 19

In the communication system according to Aspect 18, the playback unit automatically changes the status of the first area at a constant speed. The playback unit playbacks the status of the second area associated with the status of the first area that automatically changes.

Aspect 20

In the communication system according to Aspect 18, the playback unit playbacks the status of the second area associated with the status of the first area that is changed by scroll of the first area by the user.

Aspect 21

According to an exemplary embodiment, a non-transitory recording medium storing a plurality of instructions which, when executed by one or more processors at a terminal apparatus that communicates with an information processing system and another terminal apparatus via a network, cause the processors to perform the following method. The method includes: receiving, via the information processing system, language information converted from speech data input to the other terminal apparatus and received at a voice input unit, and content based on a user operation on the language information at the other terminal apparatus; displaying, on an information display screen of the terminal apparatus, the language information converted from speech data that is received at a voice input unit of the terminal apparatus, and the language information of the other terminal apparatus that is received, in a chronological order; and displaying the content that is received in the information display screen.

Aspect 22

According to an exemplary embodiment, a non-transitory recording medium storing a plurality of instructions which, when executed by one or more processors at an information processing system that communicates with a terminal apparatus and another terminal apparatus via a network, cause the processors to perform the following method. The method includes: converting speech data based on speech input to each of the terminal apparatus and the other terminal apparatus into language information; displaying the language information on an information display screen of the terminal apparatus in a chronological order; displaying, on the information display screen, content based on a user operation on the language information displayed on the information display screen; and transmitting the content displayed on the information display screen to the other terminal apparatus.

Aspect 23

According to an exemplary embodiment, a terminal apparatus communicates with an information processing system and another terminal apparatus via a network. The terminal apparatus includes a communication unit that receives, via the information processing system, language information converted from speech data input to the other terminal apparatus and received at a voice input unit, and content based on a user operation on the language information at the other terminal apparatus. The terminal apparatus further includes: a first display control unit that displays, on an information display screen of the terminal apparatus, the language information converted from speech data that is received at a voice input unit of the terminal apparatus, and the language information of the other terminal apparatus that is received, in a chronological order; and a second display control unit that displays the content that is received in the information display screen.

Aspect 24

According to an exemplary embodiment, an information processing system communicates with a terminal apparatus and another terminal apparatus via a network, includes: a converter that converts speech data based on speech input to each of the terminal apparatus and the other terminal apparatus into language information; a first display control unit that displays the language information on an information display screen of the terminal apparatus in a chronological order; and a content manager that transmits content displayed on the information display screen and for which a user operation is received, to the other terminal apparatus for display.

Aspect 25

According to an exemplary embodiment, an information processing method performed by a communication system including an information processing system that communicates with a terminal apparatus and another terminal apparatus via a network. The information processing method includes: converting speech data based on speech input to each of the terminal apparatus and the other terminal apparatus into language information; displaying the language information on an information display screen of the terminal apparatus in a chronological order; displaying, on the information display screen, content based on a user operation on the language information displayed on the information display screen; and transmitting the content displayed on the information display screen to the other terminal apparatus.

Aspect 26

According to an exemplary embodiment, a communication system includes: an information processing server including first circuitry; and a terminal apparatus configured to communicate with a counterpart terminal apparatus via the information processing server, the terminal apparatus including second circuitry. The first circuitry is configured to: convert speech data into language information, the speech data representing speech input to the terminal apparatus or speech input to the counterpart terminal apparatus; and transmit the language information each to the terminal apparatus and the counterpart terminal apparatus. The second circuitry is configured to: display the language information that is converted in a first area of an information display screen in a chronological order; and display, in a second area of the information display screen, content based on a user operation on particular language information of the language information displayed in the first area of the information display screen. The first circuitry is configured to transmit information on the content displayed on the information display screen to a counterpart terminal apparatus, to cause the counterpart terminal apparatus to display the content.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

The functionality of the elements disclosed herein may be implemented using circuitry or processing circuitry which includes general purpose processors, special purpose processors, integrated circuits, application specific integrated circuits (ASICs), digital signal processors (DSPs), field programmable gate arrays (FPGAs), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

The invention claimed is:

1. A communication system for controlling communication between a terminal apparatus and a counterpart terminal apparatus, comprising
circuitry configured to:
convert speech data into language information, the speech data representing speech input to the terminal apparatus or speech input to the counterpart terminal apparatus;
display the language information, that is converted, in real time on a first area of an information display screen at the terminal apparatus;
copy the language information, displayed in real time on the first area of the information display screen, in response to a user operation;
display the language information copied from the first area of the information display screen on a second area of the information display screen as a content displayed on the information display screen; and
transmit information on the content displayed on the information display screen to the counterpart terminal apparatus, to cause the counterpart terminal apparatus to display the content.

2. The communication system of claim 1, wherein the circuitry is further configured to
search for an image that matches a character string included in the language information displayed in the first area,
display the image that is searched in vicinity of the language information, and
receive the user operation that instructs to display the image that is searched and displayed, as the content to be displayed in the second area.

3. The communication system of claim 1, wherein the circuitry is further configured to:
search for one or more images that match one or more character strings included in the language information displayed in the second area,
display the one or more images that are searched in vicinity of the language information displayed in the second area, and
display an image based a particular image selected from the one or more images being displayed, in the second area.

4. The communication system of claim 2, wherein, when the image that is displayed in vicinity of the language information includes a plurality of images respectively associated with a plurality of character strings included in the language information,
the circuitry arranges the plurality of images in an order of arrangement of the character strings in the language information.

5. The communication system of claim 1, wherein the circuitry is further configured to
decompose the language information displayed in the second area into a plurality of character strings, and
arrange the plurality of character strings as contents to be displayed separately from each other, in response to a user operation.

6. The communication system of claim 5, wherein the circuitry is further configured to
display the plurality of character strings in hierarchy, while connecting the plurality of character strings with a line, according to a specified hierarchical structure.

7. The communication system of claim 6, wherein the circuitry is configured to
display the plurality of character strings in hierarchy, using a learned model for converting the plurality of character strings according to the specified hierarchical structure.

8. The communication system of claim 1, wherein
the content displayed on the information display screen includes a plurality of contents, and
in response to receiving a selection of a particular content of the plurality of contents,
the circuitry is configured to
acquire identification information that is associated with the particular content, and
display, with emphasis, language information identified with the identification information that is acquired.

9. The communication system of claim 8, wherein,
in a case where the identification information that is associated with the particular content is not acquired,
the circuitry is configured to display, with emphasis, language information having an input time within a predetermined period of time from a time when the particular content is displayed.

10. The communication system of claim 1, wherein the circuitry is further configured to
select the language information to be displayed on the information display screen, and
display only the language information that is selected.

11. The communication system of claim 10, wherein the circuitry is configured to select the language information to be displayed using at least one of:
information on speaker of the speech data from which the language information is generated;
a number of favorable responses to the language information;
information indicating whether the language information has been stored by a user as preferable language information; or
an input time of the language information to the information display screen.

12. The communication system of claim 11, wherein
the content displayed on the information display screen includes a plurality of contents, and
in a case where the circuitry displays only the language information having been selected,
the circuitry is configured to display only one or more contents each associated with identification information for identifying the language information having been selected for display.

13. The communication system of claim 1, wherein the circuitry is further configured to
translate the language information that is converted into a language set for the counterpart terminal apparatus, in a case where the language converted is different from the language set for the counterpart terminal apparatus.

14. The communication system of claim 1, wherein
the circuitry is further configured to:
store, in a memory, a status of the first area of the information display screen, and a status of the second area of the information display screen, in association with each other in a chronological order; and
playback a moving image based on the status of the second area associated with the first area.

15. The communication system of claim 14, wherein the circuitry is configured to
automatically change the status of the first area at a constant speed, such that the status of the second area changes according to the status of the first area that automatically changes.

16. The communication system of claim 15, wherein the circuitry is configured to
change the status of the second area according to the status of the first area that changes according to a scroll operation of the first area by a user.

17. An information processing system comprising circuitry configured to:
convert speech data into language information, the speech data representing speech input to a terminal apparatus or speech input to a counterpart terminal apparatus, the terminal apparatus and the counterpart terminal apparatus being configured to communicate via a network;
display the language information, that is converted, in real time on a first area of an information display screen of the terminal apparatus;
copy the language information, displayed in real time on the first area of the information display screen, in response to a user operation;
display the language information copied from the first area of the information display screen on a second area of the information display screen as a content displayed on the information display screen; and
transmit information on the content displayed on the information display screen to the counterpart terminal apparatus, to cause the counterpart terminal apparatus to display the content.

18. An information processing method comprising:
converting speech data into language information, the speech data representing speech input to a terminal apparatus or speech input to a counterpart terminal apparatus, the terminal apparatus and the counterpart terminal apparatus being configured to communicate via a network;
displaying the language information, that is converted, in real time on a first area of an information display screen of the terminal apparatus;
copying the language information, displayed in real time on the first area of the information display screen, in response to a user operation;
displaying the language information copied from the first area of the information display screen on a second area of the information display screen as a content displayed on the information display screen; and
transmitting information on the content displayed on the information display screen to the counterpart terminal apparatus, to cause the counterpart terminal apparatus to display the content.

19. The communication system of claim 1, wherein the circuitry is configured to copy the language information, displayed in real time on the first area of the information display screen, in response to a drag-and-drop operation or a click operation with respect to at least part of the language information displayed on the first area as the user operation.

20. The communication system of claim 1, wherein the circuitry is configured to transmit the information on the content displayed on the information display screen to the counterpart terminal apparatus each time the content displayed on the information display screen is changed by displaying the language information copied from the first area to the second area.

* * * * *